United States Patent
Breed et al.

(10) Patent No.: US 6,445,988 B1
(45) Date of Patent: *Sep. 3, 2002

(54) SYSTEM FOR DETERMINING THE OCCUPANCY STATE OF A SEAT IN A VEHICLE AND CONTROLLING A COMPONENT BASED THEREON

(75) Inventors: David S. Breed, Boonton Township, Morris County, NJ (US); Wilbur E. DuVall, Kimberling City, MO (US); Wendell C. Johnson, Signal Hill, CA (US); Jeffrey L. Morin, Lincoln Park; Kunhong Xu, Rochester Hills, both of MI (US); Michael E. Kussul, Kyiv (UA)

(73) Assignee: Automotive Technologies International Inc., Denville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/853,118

(22) Filed: May 10, 2001

Related U.S. Application Data

(63) Continuation-in-part of application No. 09/474,147, filed on Dec. 29, 1999, which is a continuation-in-part of application No. 09/382,406, filed on Aug. 24, 1999, which is a continuation-in-part of application No. 08/919,823, filed on Aug. 28, 1997, now Pat. No. 5,943,295, which is a continuation-in-part of application No. 08/798,029, filed on Feb. 6, 1997, now abandoned.
(60) Provisional application No. 60/136,163, filed on May 27, 1999.

(51) Int. Cl.[7] .................................................. G06F 7/00
(52) U.S. Cl. ...................... 701/45; 180/268; 180/271; 280/735
(58) Field of Search .............................. 701/45, 46, 47, 701/49; 180/268, 271, 273; 318/286, 466, 467, 468; 280/734, 735

(56) References Cited

U.S. PATENT DOCUMENTS

| 3,275,975 A | 9/1966 | King .............................. 180/98 |
| 4,691,569 A | 9/1987 | Sato et al. ..................... 73/596 |
| 4,881,270 A | 11/1989 | Knecht et al. ................. 382/17 |

(List continued on next page.)

FOREIGN PATENT DOCUMENTS

| GB | 2289332 | 11/1995 | |
| JP | 3-42337 | 2/1991 | ................. 180/273 |
| WO | 98/33685 | 8/1998 | |
| WO | 99/14083 | 3/1999 | |

OTHER PUBLICATIONS

"Analysis of Hidden Units in a Layered Network Trained to Classify Sonar Targets", R. Paul Gorman et al., Neural Networks, vol. 1, pp. 75–89, 1988.

(List continued on next page.)

Primary Examiner—Gertrude Arthur
(74) Attorney, Agent, or Firm—Brian Roffe

(57) ABSTRACT

System for determining the occupancy of a seat in a vehicle using pattern recognition technologies and techniques that apply to any combination of transducers that provide information about seat occupancy, for example, weight sensors, capacitive sensors, inductive sensors, ultrasonic, optical, electromagnetic, motion, infrared and radar sensors. A processor is coupled to the transducers for receiving data therefrom and processes the data to obtain an output indicative of the seat's current occupancy state. A combination neural network is resident in the processor and is created from data sets, each representing a different occupancy state of the seat and being formed from data from the transducers while the seat is in that occupancy state. The combination neural network produces the output indicative of the current occupancy state of the seat upon inputting a data set representing the current occupancy state of the seat and being formed from data from the transducers.

78 Claims, 50 Drawing Sheets

U.S. PATENT DOCUMENTS

| | | | |
|---|---|---|---|
| 4,906,940 A | 3/1990 | Greene et al. | 382/16 |
| 5,008,946 A | 4/1991 | Ando | 382/2 |
| 5,031,154 A | 7/1991 | Watanabe | 367/8 |
| 5,071,160 A | 12/1991 | White et al. | 280/735 |
| 5,074,583 A | 12/1991 | Fujita et al. | 280/735 |
| 5,118,134 A | 6/1992 | Mattes et al. | 280/735 |
| 5,181,254 A | 1/1993 | Schweizer et al. | 382/11 |
| 5,214,744 A | 5/1993 | Schweizer et al. | 395/21 |
| 5,235,339 A | 8/1993 | Morrison et al. | 342/159 |
| 5,298,732 A | 3/1994 | Chen | 250/203.4 |
| 5,305,012 A | 4/1994 | Faris | 345/7 |
| 5,330,226 A | 7/1994 | Gentry et al. | 280/735 |
| 5,366,241 A | 11/1994 | Kithil | 280/735 |
| 5,390,136 A | 2/1995 | Wang | 364/754 |
| 5,398,185 A | 3/1995 | Omura | 364/424.05 |
| 5,413,378 A | 5/1995 | Steffens, Jr. et al. | 280/735 |
| 5,454,591 A | 10/1995 | Mazur et al. | 280/735 |
| 5,482,314 A * | 1/1996 | Corrado et al. | 280/735 |
| 5,490,069 A | 2/1996 | Gioutsos et al. | 364/424.05 |
| 5,585,625 A | 12/1996 | Spies | 250/221 |
| 5,602,734 A | 2/1997 | Kithil | 364/424.055 |
| 5,605,348 A | 2/1997 | Blackburn et al. | 280/735 |
| 5,626,359 A | 5/1997 | Steffens, Jr. et al. | 280/735 |
| 5,636,864 A | 6/1997 | Hori | 280/735 |
| 5,653,462 A | 8/1997 | Breed et al. | 280/735 |
| 5,684,701 A | 11/1997 | Breed | 364/424.055 |
| 5,691,693 A | 11/1997 | Kithil | 340/439 |
| 5,702,123 A | 12/1997 | Takahashi et al. | 280/735 |
| 5,722,686 A | 3/1998 | Blackburn et al. | 280/735 |
| 5,782,485 A | 7/1998 | Takeda et al. | 280/735 |
| 5,802,479 A | 9/1998 | Kithil et al. | 701/45 |
| 5,829,782 A | 11/1998 | Breed et al. | 280/735 |
| 5,844,486 A | 12/1998 | Kithil et al. | 340/573 |
| 5,845,000 A | 12/1998 | Breed et al. | 382/100 |
| 5,890,085 A | 3/1999 | Corrado et al. | 701/47 |
| 5,943,295 A | 8/1999 | Varga et al. | 367/99 |
| 5,948,031 A | 9/1999 | Jinno et al. | 701/45 |
| 5,954,360 A | 9/1999 | Griggs, III et al. | 280/735 |
| 6,007,095 A | 12/1999 | Stanley | 280/735 |
| 6,027,138 A | 2/2000 | Tanaka et al. | 280/735 |
| 6,029,105 A | 2/2000 | Schweizer | 701/45 |
| 6,078,854 A * | 6/2000 | Breed et al. | 701/49 |
| 6,081,757 A * | 6/2000 | Breed et al. | 701/45 |

OTHER PUBLICATIONS

Learned Classification of Sonar Targets Using a Massively Parrallel Network, R. Paul Gorman et al., IEEE Transactions on Acoustics, Speech and Signal Processing, vol. 36, No. 7, Jul., 1988, pp1135–1140.

"How Airbags Work", David S. Breed, Presented at the Canadian Association of Road Safety Professionals, Oct. 19, 1992–Oct. 20, 1992.

* cited by examiner

Subject Classification

| Class | Instances | Weight Category | State |
|---|---|---|---|
| ES | Empty Seat | <10 lb | Empty |
| FFA | Normally Seated Adult | >05 lb | Enable |
| FFC | Normally Seated Child | <10,105> lb | Enable |
| FFC | Normally Positioned Forward Facing Child Seat | <10,45> lb | Enable |
| OOP | Out-of-position Adult | >105 lb | Disable |
| OOP | Out-of-position Child | <105 lb | Disable |
| OOP | Out-of-position Forward Facing Child Seat | <10,45> lb | Disable |
| RFS | Rearward Facing Child Seat | <10,45> lb | Disable |
| RFS | Rearward Facing Infant Seat | <10,45> lb | Disable |

*FIG. 18*

Categorization of Human Subjects

| | Weight Range kg (lb) | Height Range m (in) | | | |
|---|---|---|---|---|---|
| | | <0.95,1.15> (<3'1",3'9">) | <1.10,1.30> (<3'7",4'3">) | <1.25,1.45> (<4'1",4'9">) |
| Child | <11,25>(<24,55>) | C11 | C12 | C13 |
| | <22,36> (<48,79>) | C21 | C22 | C23 |
| | <33,47> (<73,103>) | C31 | C32 | C33 |
| | | <1.45, 1.65> (<49,55'5') | <1.60,1.80> (<53,51 1 5') | <1.75, 1.95> (<59,65'5') |
| Adult | <45,70>('<99,154>) | A11 | A12 | A13 |
| | <65,90> (<143,198>) | A21 | A22 | A23 |
| | <85,110> (<187,242>) | A31 | A32 | A33 |

All Human Subjects are to wear light clothes (typically slacks and T-shirt) on entry. Other types of clothing to be provided by ATI

Child Surrogates

| Doll | Baby=0.50m (approx. 20") | Infant=0.75m (approx. 30") | Child=1.20m (approx. 48") |
|---|---|---|---|

*FIG. 19*

Rearward Facing Infant Seats

| Designation | Child Seat | Attributes |
|---|---|---|
| Training | Arriva | base, hood |
| Independent | Assura565 | hood |
| Training | Baby-Safe | - |
| Training | Century 590 | base, hood |
| Training | Evenflo Discovery | base, Tbar |
| Training | Evenflo Joyride (new) | hood |
| Independent | Evenflo Joyride (old) | - |
| Training | GerryGuard | base |
| Validation | Kolcraft Travelabout | base, Tbar |
| Training | Rock-n-Ride | - |
| Training | TLC | - |

*FIG. 20*

Rearward Facing Child Seat

| Designation | Child Seat | Attributes |
|---|---|---|
| Training | Century1000 | - |
| Validation | Century 2000 STE | - |
| Training | CenturyOvation | - |
| Training | Century Smartmove 5T | table |
| Training | Champion | table |
| Training | Fisher Price Child Seat | table |
| Training | Touriva | - |
| Training | Ultara | table |
| Training | Vario Exclusive | table |

*FIG. 21*

Forward Facing Child and Booster Seats

| Designation | Child Seat | Attributes |
|---|---|---|
| Training | Century1000 | - |
| Validation | Century 2000 STE | - |
| Training | CenturyOvation | - |
| Validation | Century Smartmove 5T | table |
| Training | Champion | table |
| Validation | Fisher Price Booster | - |
| Training | Fisher Price Child Seat | table |
| Training | Gerry Booster | table |
| Training | Touriva | - |
| Training | Ultara | table |
| Training | Vario Exclusiv | table |

*FIG. 22*

Vehicle Configuration Series

| Config | Seat Track (+/- .05") | | | | | | | | | | Seatback Recline (+/- 2°) | | | | | | | | | | Windows | | | | | | | | | |
|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 | 9 | 10 | 1 | 2 | 3 | 4 | 5 | 6 | 7 | 8 | 9 | 10 |
| A | 1 | 0 | 3 | 2 | 2 | 4 | 4 | 6 | 6 | 6 | 0 | 18 | 4 | 12 | 20 | 2 | 20 | 0 | 8 | 16 | D | D | D | U | D | D | U | U | D | D |
| B | 0 | 1 | 2 | 3 | 3 | 5 | 5 | 7 | 7 | 7 | 2 | 20 | 0 | 8 | 16 | 0 | 18 | 4 | 12 | 20 | U | U | U | D | U | U | D | D | U | U |
| C | 1 | 0 | 3 | 2 | 4 | 4 | 5 | 6 | 6 | 6 | 5 | 15 | 4 | 16 | 0 | 15 | 20 | 2 | 10 | 18 | U | D | D | D | U | U | D | D | U | U |
| D | 0 | 1 | 2 | 3 | 5 | 5 | 4 | 7 | 7 | 7 | 4 | 16 | 5 | 15 | 2 | 10 | 18 | 0 | 15 | 20 | U | D | D | U | D | D | U | U | D | D |
| E | 1 | 0 | 3 | 2 | 2 | 2 | 4 | 4 | 6 | 6 | 0 | 8 | 16 | 4 | 12 | 20 | 2 | 20 | 0 | 18 | D | D | U | D | D | D | U | U | D | D |
| F | 0 | 1 | 0 | 3 | 3 | 3 | 5 | 5 | 7 | 7 | 4 | 12 | 20 | 0 | 8 | 16 | 0 | 18 | 2 | 20 | U | U | D | U | U | U | D | D | U | U |
| G | 1 | 0 | 2 | 2 | 2 | 4 | 4 | 4 | 6 | 6 | 4 | 16 | 2 | 20 | 2 | 10 | 18 | 0 | 15 | 20 | U | D | D | U | D | D | U | D | U | U |
| H | 0 | 1 | 3 | 3 | 3 | 5 | 5 | 5 | 7 | 7 | 2 | 20 | 4 | 16 | 0 | 15 | 20 | 2 | 10 | 18 | D | U | U | D | U | U | D | U | D | D |

*FIG. 23A*

| Con fig | Visor | | | | | | | | | | Convertible Top | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 | 9 | 10 |
| A | U | D | U | D | S | U | D | U | D | S | U | U | U | U | U | D | D | D | D | D |
| B | D | U | D | U | S | D | U | D | U | S | D | D | D | D | D | U | U | U | U | U |
| C | U | D | S | U | D | U | D | S | U | D | D | D | D | D | D | U | U | U | U | U |
| D | D | U | S | D | U | D | U | S | D | U | U | U | U | U | U | D | D | D | D | D |
| E | D | U | D | S | D | U | D | S | U | D | U | U | U | U | U | D | D | D | D | D |
| F | U | D | U | S | D | U | D | S | U | D | D | D | D | D | D | U | U | U | U | U |
| G | D | S | U | U | D | U | D | U | S | D | D | D | D | D | D | U | U | U | U | U |
| H | U | S | U | D | U | D | U | D | S | U | U | U | U | U | U | D | D | D | D | D |

*FIG. 23B*

Sequence for Child Seat Training Data Collection:

Start object in center of the seat. Trainer has both hands on the steering wheel;

With a smooth motion, push the object fully outboard, then pull it fully inboard, then push it to center position, then put hands back on the steering wheel;

With a smooth motion, rotate the object 45 degrees outboard, the rotate 45 degrees inboard, then rotate back to center, then put hands back on the steering wheel;

Sequence for Out-of-Position Forward Facing Child Seat Training Data Collection

Start with object in the center line, leaning onto the Instrument Panel;

With a smooth motion, push the object fully outboard, then pull it fully inboard, then push it to the center;

Repeat this sequence with a 1 50 mm (6") gap between the object and the Instrument Panel; Apply small (+/- 10°) rotations.

Repeat this sequence with a 300 mm (12") gap between the object and the Instrument Panel; Apply small (+/- 10°) rotations.

*FIG. 23C*

Sequence for Human Subject Training Data Collection:
Lean forward and outboard such that head and/or shoulders touch the Fire line;
Gently traverse inboard while carefully following the Fire line until the center of the vehicle is reached;
Lean halfway back towards the seatback and traverse outboard up against the side window. Rotate torso while doing so;
Lean back into the seat and traverse inboard towards the center. Rotate torso while doing so;
Sit back in the seat; "operate" radio controls, glove box, window, or seat controls; assume a brace posture;
Do *not* cross the Fire line with head and/or shoulders at any time.

Sequence for Out-of-Position Human Subject Training Data Collection:
Lean forward and outboard such that head and/or shoulders touch the Instrument Panel;
Gently traverse inboard towards the center console;
Move back 150 mm (6") and gently traverse back to the most outboard position;
Move back 300 mm (12") and gently traverse back to the center console;
"Operate" radio controls and glovebox while head and/or shoulders remain in front of the Fire line.

*FIG. 23D*

Network Training Set Collection Matrix (Vehicle E)
Rev 1.1

| # | Class | Subject/Object | Attributes | Actions | Config | Belt | Conditions |
|---|---|---|---|---|---|---|---|
| 1 | ES | None | None | Motions of track and recline | (A) | N.A. | Ambient |
| 2 | FFA | A22 | Medium Clothes, Magazine | Motions in safe seating area | B | Yes | Ambient |
| 3 | OOP | A22 | Medium Clothes | Motions in NFZ | C | No | Ambient |
| 4 | FFC | Century 1000 | Infant Doll | Motions in safe seating area | D | No | Ambient |
| 5 | RFS | Century 1000 | Baby Doll | Motions in entire seating area | E | No | Ambient |
| 6 | ES | None | Beaded Cover | Motions of track and recline | (F) | N.A. | Ambient |
| 7 | FFA | A11 | Medium Clothes | Motions in safe seating area | G | Yes | Ambient |
| 8 | OOP | Touriva | Infant Doll, Blanket | Motions in NFZ | H | No | Ambient |
| 9 | FFC | Touriva | Infant Doll, Blanket | Motions in safe seating area | A | No | Ambient |
| 10 | RFS | Century 590 | Baby Doll, Hood | Motions in entire seating area | B | No | Ambient |
| 11 | ES | None | Fabric Cover | Motions of track and recline | (C) | N.A. | Ambient |
| 12 | FFA | A33 | Medium Clothes, Newspaper | Motions in safe seating area | D | No | Ambient |
| 13 | OOP | A33 | Medium Clothes | Motions in NFZ | E | Yes | Ambient |
| 14 | FFC | C22 | Medium Clothes | Motions in safe seating area | F | No | Ambient |
| 15 | RFS | Touriva | Baby Doll, Blanket | Motions in entire seating area | G | No | Ambient |
| 16 | ES | None | Blanket | Motions of track and recline | (H) | N.A. | Ambient |
| 17 | FFA | A21 | Heavy Clothes | Motions in safe seating area | A | No | Ambient |
| 18 | OOP | C11 | Heavy Clothes | Motions in NFZ (standing) | B | No | Ambient |
| 19 | FFC | C11 | Heavy Clothes | Motions in safe seating area | C | No | Ambient |

FIG. 24A

| 20 | RFS | TLC | Baby Doll | Motions in entire seating area | D | No | Ambient |
| 21 | ES | None | None | Motions of track and recline | (E) | N.A. | Solar Heat |
| 22 | FFA | A12 | Light Clothes, Magazine | Motions in safe seating area | F | Yes | Solar Heat |
| 23 | OOP | A12 | Light Clothes | Motions in NFZ | G | No | Solar Heat |
| 24 | FFC | Champion | Infant Doll | Motions in safe seating area | H | No | Solar Heat |
| 25 | RFS | Champion | Baby Doll | Motions in entire seating area | A | No | Solar Heat |
| 26 | ES | None | Beaded Cover | Motions of track and recline | (B) | N.A. | Solar Heat |
| 27 | FFA | A23 | Light Clothes | Motions in safe seating area | C | Yes | Solar Heat |
| 28 | OOP | Vario Exclusive | Child Doll | Motions in NFZ | D | No | Solar Heat |
| 29 | FFC | Vario Exclusive | Child Doll, Blanket | Motions in safe seating area | E | No | Solar Heat |
| 30 | RFS | Joyride (new) | Baby Doll | Motions in entire seating area | F | No | Solar Heat |
| 31 | ES | None | Fabric Cover | Motions of track and recline | (G) | N.A. | Solar Heat |
| 32 | FFA | A32 | Light Clothes, Newspaper | Motions in safe seating area | H | No | Solar Heat |
| 33 | OOP | A32 | Light Clothes | Motions in NFZ | A | Yes | Solar Heat |
| 34 | FFC | C33 | Light Clothes | Motions in safe seating area | B | No | Solar Heat |
| 35 | RFS | Ultara | Baby Doll, Blanket | Motions in entire seating area | C | No | Solar Heat |
| 36 | ES | None | Blanket | Motions of track and recline | (D) | N.A. | Solar Heat |
| 37 | FFA | A22 | Medium Clothes | Motions in safe seating area | E | No | Solar Heat |
| 38 | OOP | C21 | Medium Clothes | Motions in NFZ | F | No | Solar Heat |
| 39 | FFC | C21 | Medium Clothes | Motions in safe seating area | G | No | Solar Heat |
| 40 | RFS | Arriva | Baby Doll, Hood | Motions in entire seating area | H | No | Solar Heat |
| 41 | ES | None | Handbag | Motions of track and recline | (H) | N.A. | Ambient |
| 42 | FFA | A11 | Heavy Clothes, Magazine | Motions in safe seating area | G | Yes | Ambient |

*FIG. 24B*

| | | | | | | |
|---|---|---|---|---|---|---|
| 43 | OOP | A11 | Heavy Clothes | Motions in NFZ | F | No | Ambient |
| 44 | FFC | Gerry Booster | Infant Doll | Motions in safe seating area | E | No | Ambient |
| 45 | RFS | Fisher Price CS | Baby Doll | Motions in entire seating area | D | No | Ambient |
| 46 | ES | None | Beaded Cover, Handbag | Motions of track and recline | (C) | N.A. | Ambient |
| 47 | FFA | A33 | Heavy Clothes | Motions in safe seating area | B | Yes | Ambient |
| 48 | OOP | Ultara | Infant Doll, Blanket | Motions in NFZ | A | No | Ambient |
| 49 | FFC | Ultara | Infant Doll, Blanket | Motions in safe seating area | H | No | Ambient |
| 50 | RFS | Baby Safe | Baby Doll, Handle up | Motions in entire seating area | G | No | Ambient |
| 51 | ES | None | Fabric Cover, Handbag | Motions of track and recline | (F) | N.A. | Ambient |
| 52 | FFA | A21 | Heavy Clothes, Newspaper | Motions in safe seating area | E | No | Ambient |
| 53 | OOP | A21 | Heavy Clothes | Motions in NFZ | D | Yes | Ambient |
| 54 | FFC | C12 | Heavy Clothes | Motions in safe seating area | C | No | Ambient |
| 55 | RFS | Vario Exclusive | Baby Doll, Blanket | Motions in entire seating area | B | No | Ambient |
| 56 | ES | None | Blanket, Handbag | Motions of track and recline | (A) | N.A. | Ambient |
| 57 | FFA | A12 | Rain Clothes | Motions in safe seating area | H | No | Ambient |
| 58 | OOP | C23 | Rain Clothes | Motions in NFZ | G | No | Ambient |
| 59 | FFC | C23 | Rain Clothes | Motions in safe seating area | F | No | Ambient |
| 60 | RFS | Rock'n'Ride | Baby Doll | Motions in entire seating area | E | No | Ambient |
| 61 | ES | None | None | Motions of track and recline | (D) | N.A. | Air Conditioner |
| 62 | FFA | A23 | Light Clothes, Magazine | Motions in safe seating area | C | Yes | Air Conditioner |

*FIG. 24C*

| # | | | | | | | |
|---|---|---|---|---|---|---|---|
| 63 | OOP | A23 | Light Clothes | Motions in NFZ | B | No | Air Conditioner |
| 64 | FFC | Century Ovation | Infant Doll | Motions in safe seating area | A | No | Air Conditioner |
| 65 | RFS | Century Ovation | Baby Doll | Motions in entire seating area | H | No | Air Conditioner |
| 66 | ES | None | Beaded Cover | Motions of track and recline | (G) | N.A. | Air Conditioner |
| 67 | FFA | A32 | Light Clothes | Motions in safe seating area | F | Yes | Air Conditioner |
| 68 | OOP | Fisher Price CS | Child Doll | Motions in NFZ | E | No | Air Conditioner |
| 69 | FFC | Fisher Price CS | Child Doll, Blanket | Motions in safe seating area | D | No | Air Conditioner |
| 70 | RFS | Gerry Guard | Baby Doll | Motions in entire seating area | C | No | Air Conditioner |
| 71 | ES | None | Fabric Cover | Motions of track and recline | (B) | N.A. | Air Conditioner |
| 72 | FFA | A22 | Light Clothes, Newspaper | Motions in safe seating area | A | No | Air Conditioner |
| 73 | OOP | A22 | Light Clothes | Motions in NFZ | H | Yes | Air Conditioner |
| 74 | FFC | C32 | Light Clothes | Motions in safe seating area | G | No | Air Conditioner |
| 75 | RFS | Smartmove 5T | Baby Doll, Blanket | Motions in entire seating area | F | No | Air Conditioner |
| 76 | ES | None | Blanket | Motions of track and recline | (E) | N.A. | Air Conditioner |
| 77 | FFA | A11 | Medium Clothes | Motions in safe seating area | D | No | Air Conditioner |
| 78 | OOP | C22 | Medium Clothes | Motions in NFZ | C | No | Air Conditioner |
| 79 | FFC | C22 | Medium Clothes | Motions in safe seating area | B | No | Air Conditioner |
| 80 | RFS | Discovery | Baby Doll, Handle up | Motions in entire seating area | A | No | Air Conditioner |
| 81 | ES | None | Pizza Box | Motions of track and recline | (B) | N.A. | Ambient |
| 82 | FFA | A33 | Rain Clothes, Magazine | Motions in safe seating area | A | Yes | Ambient |
| 83 | OOP | A33 | Rain Clothes | Motions in NFZ | D | Yes | Ambient |
| 84 | FFC | Champion | Infant Doll | Motions in safe seating area | C | No | Ambient |

*FIG. 24D*

| | | | | | | |
|---|---|---|---|---|---|---|
| 85 | RFS | Champion | Baby Doll | Motions in entire seating area | F | No | Ambient |
| 86 | ES | None | Beaded Cover, Pizza Box | Motions of track and recline | (E) | N.A. | Ambient |
| 87 | FFA | A21 | Rain Clothes | Motions in safe seating area | H | Yes | Ambient |
| 88 | OOP | Vario Exclusive | Child Doll, Blanket | Motions in NFZ | G | No | Ambient |
| 89 | FFC | Vario Exclusive | Child Doll, Blanket | Motions in safe seating area | B | No | Ambient |
| 90 | RFS | Joyride (new) | Baby Doll, Hood | Motions in entire seating area | A | No | Ambient |
| 91 | ES | None | Fabric Cover, Pizza Box | Motions of track and recline | (D) | N.A. | Ambient |
| 92 | FFA | A12 | Rain Clothes, Newspaper | Motions in safe seating area | C | No | Ambient |
| 93 | OOP | A12 | Rain Clothes | Motions in NFZ | F | No | Ambient |
| 94 | FFC | C23 | Rain Clothes | Motions in safe seating area | E | No | Ambient |
| 95 | RFS | Ultara | Baby Doll, Blanket | Motions in entire seating area | H | No | Ambient |
| 96 | ES | None | Blanket, Pizza Box | Motions of track and recline | (G) | N.A. | Ambient |
| 97 | FFA | A23 | Light Clothes | Motions in safe seating area | B | No | Ambient |
| 98 | OOP | C32 | Light Clothes | Motions in NFZ | A | No | Ambient |
| 99 | FFC | C32 | Light Clothes | Motions in safe seating area | D | No | Ambient |
| 100 | RFS | Arriva | Baby Doll, Hood | Motions in entire seating area | C | No | Ambient |
| 101 | ES | None | None | Motions of track and recline | (F) | N.A. | Car Heat |
| 102 | FFA | A32 | Light Clothes, Magazine | Motions in safe seating area | E | Yes | Car Heat |
| 103 | OOP | A32 | Light Clothes | Motions in NFZ | H | Yes | Car Heat |
| 104 | FFC | Century 1000 | Infant Doll | Motions in safe seating area | G | No | Car Heat |
| 105 | RFS | Century 1000 | Baby Doll | Motions in entire seating area | B | No | Car Heat |
| 106 | ES | None | Beaded Cover | Motions of track and recline | (A) | N.A. | Car Heat |

*FIG. 24E*

| | | | | | | |
|---|---|---|---|---|---|---|
| 107 | FFA | A22 | Rain Clothes | Motions in safe seating area | D | Yes | Car Heat |
| 108 | OOP | Vario Exclusive | Inflant Doll | Motions in NFZ | C | No | Car Heat |
| 109 | FFC | Touriva | Inflant Doll, Blanket | Motions in safe seating area | F | No | Car Heat |
| 110 | RFS | Century 590 | Baby Doll | Motions in entire seating area | E | No | Car Heat |
| 111 | ES | None | Fabric Cover | Motions of track and recline | (H) | N.A. | Car Heat |
| 112 | FFA | A11 | Light Clothes, Newspaper | Motions in safe seating area | G | No | Car Heat |
| 113 | OOP | A11 | Light Clothes | Motions in NFZ | B | No | Car Heat |
| 114 | FFC | C32 | Light Clothes | Motions in safe seating area | A | No | Car Heat |
| 115 | RFS | Touriva | Baby Doll, Blanket | Motions in entire seating area | D | No | Car Heat |
| 116 | ES | None | Blanket | Motions of track and recline | (C) | N.A. | Car Heat |
| 117 | FFA | A33 | Heavy Clothes | Motions in safe seating area | F | No | Car Heat |
| 118 | OOP | C22 | Heaby Clothes | Motions in NFZ | E | No | Car Heat |
| 119 | FFC | C22 | Heavy Clothes | Motions in safe seating area | H | No | Car Heat |
| 120 | RFS | TLC | Baby Doll | Motions in entire seating area | G | No | Car Heat |
| 121 | ES | None | Attaché Case (flat) | Motions of track and recline | (G) | N.A. | Ambient |
| 122 | FFA | A21 | Heavy Clothes, Magazine | Motions in safe seating area | H | Yes | Ambient |
| 123 | OOP | A21 | Heavy Clothes | Motions in NFZ | E | Yes | Ambient |
| 124 | FFC | Century Ovation | Inflant Doll | Motions in safe seating area | F | No | Ambient |
| 125 | RFS | Century Ovation | Baby Doll | Motions in entire seating area | C | No | Ambient |
| 126 | ES | None | Beaded Cover, Attache Case | Motions of track and recline | (D) | N.A. | Ambient |
| 127 | FFA | A12 | Rain Clothes | Motions in safe seating area | A | Yes | Ambient |
| 128 | OOP | Fisher Price CS | Inflant Doll, Blanket | Motions in NFZ | B | No | Ambient |

FIG. 24F

| | | | | | | |
|---|---|---|---|---|---|---|
| 129 | FFC | Fisher Price CS | Infant Doll | Motions in safe seating area | G | No | Ambient |
| 130 | RFS | Gerry Guard | Baby Doll, Handle up | Motions in entire seating area | H | No | Ambient |
| 131 | ES | None | Fabric Cover, Attaché Case | Motions of track and recline | (E) | N.A. | Ambient |
| 132 | FFA | A23 | Heavy Clothes, Newspaper | Motions in safe seating area | F | No | Ambient |
| 133 | OOP | A23 | Heavy Clothes | Motions in NFZ | C | No | Ambient |
| 134 | FFC | C11 | Heavy Clothes | Motions in safe seating area | D | No | Ambient |
| 135 | RFS | Smartmove 5T | Baby Doll, Blanket | Motions in entire seating area | A | No | Ambient |
| 136 | ES | None | Blanket, Attaché Case | Motions of track and recline | (B) | N.A. | Ambient |
| 137 | FFA | A32 | Rain Clothes | Motions in safe seating area | G | No | Ambient |
| 138 | OOP | C33 | Rain Clothes | Motions in NFZ | H | No | Ambient |
| 139 | FFC | C33 | Rain Clothes | Motions in safe seating area | E | No | Ambient |
| 140 | RFS | Discovery | Baby Doll, Handle up | Motions in entire seating area | F | No | Ambient |
| 141 | ES | None | Hand Bag | Motions of track and recline | (C) | N.A. | Solar Heat |
| 142 | FFA | A22 | Medium Clothes, Magazine | Motions in safe seating area | D | Yes | Solar Heat |
| 143 | OOP | A22 | Heavy Clothes | Motions in NFZ | A | Yes | Solar Heat |
| 144 | FFC | Gerry Booster | Child Doll | Motions in safe seating area | B | No | Solar Heat |
| 145 | RFS | Fisher Price CS | Baby Doll | Motions in entire seating area | G | No | Solar Heat |
| 146 | ES | None | Beaded Cover, Hand Bag | Motions of track and recline | (H) | N.A. | Solar Heat |

*FIG. 24G*

| 147 | FFA | A11 | Medium Clothes | Motions in safe seating area | E | Yes | Solar Heat |
| 148 | OOP | Vario Exclusive | Inflant Doll | Motions in NFZ | F | No | Solar Heat |
| 149 | FFC | Ultara | Inflant Doll, Blanket | Motions in safe seating area | C | No | Solar Heat |
| 150 | RFS | Baby Safe | Baby Doll | Motions in entire seating area | D | No | Solar Heat |
| 151 | ES | None | Fabric Cover, Hand Bag | Motions of track and recline | (A) | N.A. | Solar Heat |
| 152 | FFA | A33 | Medium Clothes, Newspaper | Motions in safe seating area | B | No | Solar Heat |
| 153 | OOP | A33 | Medium Clothes | Motions in NFZ | G | No | Solar Heat |
| 154 | FFC | C33 | Medium Clothes | Motions in safe seating area | H | No | Solar Heat |
| 155 | RFS | Vario Exclusive | Baby Doll, Blanket | Motions in entire seating area | E | No | Solar Heat |
| 156 | ES | None | Blanket, Hand Bag | Motions of track and recline | (F) | N.A. | Solar Heat |
| 157 | FFA | A21 | Light Clothes | Motions in safe seating area | C | No | Solar Heat |
| 158 | OOP | C21 | Light Clothes | Motions in NFZ | D | No | Solar Heat |
| 159 | FFC | C21 | Light Clothes | Motions in safe seating area | A | No | Solar Heat |
| 160 | RFS | Rock'n'Ride | Baby Doll | Motions in entire seating area | B | No | Solar Heat |

*FIG. 24H*

Network Independent Test Set Collection Matrix (Vehicle E)
Rev 1.1 (Under Construction)

| # | Class | Subject/Object | Attributes | Actions | Config. | Belt | Conditions |
|---|---|---|---|---|---|---|---|
| 1 | ES | | | Motions of track and recline | (A) | N.A. | Ambient |
| 2 | FFA | | | Motions in safe seating area | B | Yes | Ambient |
| 3 | OOP | | | Motions in NFZ | C | No | Ambient |
| 4 | FFC | | | Motions in safe seating area | D | No | Ambient |
| 5 | RFS | | | Motions in entire seating area | E | No | Ambient |
| 6 | ES | | | Motions of track and recline | (F) | N.A. | Ambient |
| 7 | FFA | | | Motions in safe seating area | G | Yes | Ambient |
| 8 | OOP | | | Motions in NFZ | H | No | Ambient |
| 9 | FFC | | | Motions in safe seating area | A | No | Ambient |
| 10 | RFS | | | Motions in entire seating area | B | No | Ambient |
| 11 | ES | | | Motions of track and recline | (C) | N.A. | Ambient |
| 12 | FFA | | | Motions in safe seating area | D | No | Ambient |
| 13 | OOP | | | Motions in NFZ | E | Yes | Ambient |
| 14 | FFC | | | Motions in safe seating area | F | No | Ambient |
| 15 | RFS | | | Motions in entire seating area | G | No | Ambient |
| 16 | ES | | | Motions of track and recline | (H) | N.A. | Ambient |
| 17 | FFA | | | Motions in safe seating area | A | No | Ambient |
| 18 | OOP | | | Motions in NFZ (standing) | B | No | Ambient |
| 19 | FFC | | | Motions in safe seating area | C | No | Ambient |
| 20 | RFS | | | Motions in entire seating area | D | No | Ambient |

*FIG. 25*

CHARACTERISTICS OF THE DATA SETS

| DATA SET | CONFIGURATIONS | SETUPS | VECTORS |
|---|---|---|---|
| TRAINING | 130 | 1300 | 650,000 |
| INDEPENDENT TEST | 130 | 1300 | 195,000 |
| VALIDATION | 100 | 100 | 15,000 |

*FIG. 26*

DISTRIBUTION OF MAIN TRAINING SUBJECTS

| OCCUPANCY | REPRESENTATION |
|---|---|
| EMPTY SEAT | 10 % |
| HUMAN OCCUPANT | 32 % |
| CHILD SEAT | 58 % |

*FIG. 27*

| CHILD SEAT DISTRIBUTION | |
|---|---|
| CHILD SEAT CONFIGURATION | REPRESENTATION |
| FORWARD FACING CHILD SEAT | 40 % |
| FORWARD FACING CHILD SEAT OUT OF-POSITION | 4 % |
| REARWARD FACING CHILD SEAT | 27 % |
| REARWARD FACING INFANT SEAT | 29 % |

*FIG. 28*

DISTRIBUTION OF ENVIRONMENTAL CONDITIONS

| ENVIRONMENTAL CONDITION | REPRESENTATION |
|---|---|
| AMBIENT | 56 % |
| STATIC HEAT (SOLAR LAMP) | 25 % |
| DYNAMIC HEAT (CAR HEAT) | 13 % |
| DYNAMIC COOLING (CAR A C) | 6 % |

*FIG. 29*

| VALIDATION DATA DISTRIBUTION | |
|---|---|
| OCCUPANCY | REPRESENTATION |
| EMPTY SEAT | 8 % |
| HUMAN OCCUPANT | 39 % |
| CHILD SEAT | 53 % |

*FIG. 30*

HUMAN SUBJECT DISTRIBUTION

| HUMAN OCCUPANT | REPRESENTATION | NORMALLY SEATED | OUT-OF-POSITION |
|---|---|---|---|
| CHILD AGE 3 | 15 % | 50 % | 50 % |
| CHILD AGE 6 | 15 % | 50 % | 50 % |
| ADULT 5TH PERCENTILE FEMALE | 23 % | 67 % | 33 % |
| ADULT 50TH PERCENTILE MALE | 23 % | 67 % | 33 % |
| ADULT 95TH PERCENTILE MALE | 23 % | 67 % | 33 % |

*FIG. 31*

CHILD SEAT DISTRIBUTION

| CHILD SEAT CONFIGURATION | REPRESENTATION |
|---|---|
| FORWARD FACING CHILD SEAT | 11% |
| FORWARD FACING BOOSTER SEAT | 11% |
| REARWARD FACING CHILD SEAT | 38% |
| REARWARD FACING INFANT SEAT | 40% |

*FIG. 32*

DISTRIBUTION OF ENVIRONMENTAL CONDITIONS

| ENVIRONMENTAL CONDITION | REPRESENTATION |
|---|---|
| AMBIENT | 63 % |
| STATIC HEAT (SOLAR LAMP) | 13 % |
| DYNAMIC HEAT (CAR HEAT) | 12 % |
| DYNAMIC COOLING (CAR AIR CONDITIONER) | 12 % |

*FIG. 33*

| TRANS-DUCER | STARTING POINT | | | END POINT | | |
|---|---|---|---|---|---|---|
| | SAMPLE | TIME (MS) | DISTANCE (MM) | SAMPLE | TIME (MS) | DISTANCE (MM) |
| A | 5 | 0.83 | 142 | 29 | 4.84 | 822 |
| B | 3 | 0.50 | 85 | 35 | 5.84 | 992 |
| C | 7 | 1.17 | 198 | 34 | 5.67 | 964 |
| H | 2 | 0.33 | 57 | 32 | 5.34 | 907 |

TRANSDUCER VOLUME

FIG. 34

BASELINE NETWORK PERFORMANCE

| | |
|---|---|
| SELF TEST SUCCESS RATE | 95.3 % |
| INDEPENDENT TEST SUCCESS RATE | 94.5 % |
| VALIDATION TEST SUCCESS RATE | 92.7 % |

*FIG. 35*

PERFORMANCE PER OCCUPANCY SUBSET

| OCCUPANCY | INDEPENDENT TEST |
|---|---|
| EMPTY SEAT | 96.1% |
| NORMALLY SEATED ADULT | 92.1% |
| REARWARD FACING CHILD/INFANT SEAT | 94.1% |
| FORWARD FACING CHILD SEAT | 96.9% |
| OUT-OF-POSITION HUMAN/FFCS | 93.0% |

*FIG. 36*

PERFORMANCE PER ENVIRONMENTAL CONDITIONS SUBSET

| ENVIRONMENTAL CONDITION | INDEPENDENT TEST |
|---|---|
| AMBIENT | 95.4 % |
| LONG TERM HEAT (LAMP HEAT) | 95.2 % |
| SORT TERM HEATING/COOLING (HVAC) | 93.5 % |

*FIG. 37*

NORMALIZATION STUDY RESULTS

| NORMALIZATION METHOD | SELF TEST | INDEPENDENT TEST | VALIDATION TEST |
|---|---|---|---|
| A. WHOLE VECTOR (BASE) | 95.3 % | 94.5 % | 92.7 % |
| B. PER CHANNEL | 94.9 % | 93.8 % | 90.3 % |
| C. FIXED RANGE [0,4095] | 95.6 % | 90.3 % | 88.3 % |

*FIG. 39*

LOW THRESHOLD FILTER STUDY RESULTS

| THRESHOLD LEVEL | SELF TEST | INDEPENDENT TEST | VALIDATION TEST |
|---|---|---|---|
| NONE (BASE) | 95.3 % | 94.5 % | 92.7 % |
| 5% OF 4095 | 95.3 % | 94.4 % | 91.9 % |
| 10% OF 4095 | 95.3 % | 94.3 % | 92.5 % |
| 20% OF 4095 | 95.1 % | 94.2 % | 86.4 % |

*FIG. 40*

SYSTEM FOR DETERMINING THE OCCUPANCY STATE OF A SEAT IN A VEHICLE AND CONTROLLING A COMPONENT BASED THEREON

CROSS REFERENCE TO RELATED APPLICATIONS

This application is continuation-in-part of U.S. patent application Ser. No. 09/474,147 filed Dec. 29, 1999 which in turn is a continuation-in-part of U.S. patent application Ser. No. 09/382,406 filed Aug. 24, 1999 which is a continuation-in-part of U.S. patent application Ser. No. 08/919,823 filed Aug 28, 1997, now U.S. Pat. No. 5,943,295, which in turn is a continuation-in-part of U.S. patent application Ser. No. 08/798,029 filed Feb. 6, 1997, now abandoned.

This application claims priority under 35 U.S.C. §119(e) of U.S. provisional patent application Ser. No. 60/136,163 filed May 27, 1999 through U.S. patent application Ser. No. 09/474,147.

This application is related to, on the grounds that it contains common disclosure with: (i) U.S. Pat. No. 5,653,462 entitled "Vehicle Occupant Position and Velocity Sensor" filed Jul. 21, 1995, which is a continuation of U.S. patent application Ser. No. 08/040,978 filed Mar. 31, 1993, now abandoned, which in turn is a continuation of U.S. patent application Ser. No. 07/878,571 filed May 5, 1992, now abandoned; (ii) U.S. Pat. No. 5,829,782 entitled "Vehicle Interior Identification and Monitoring System" filed May 9, 1994; (iii) U.S. Pat. No. 5,845,000 entitled "Optical Identification and Monitoring System Using Pattern Recognition for Use with Vehicles" filed Jun. 7, 1995; (iv) U.S. Pat. No. 5,822,707 entitled "Automatic Vehicle Seat Adjuster" filed Jun. 7, 1995; (v) U.S. Pat. No. 5,748,473 entitled "Automatic Vehicle Seat Adjuster" filed Jun. 7, 1995; and (vi) U.S. Pat. No. 5,835,613 entitled "Optical Identification and Monitoring System Using Pattern Recognition for use with Vehicles" filed Jun. 7, 1995, which are all incorporated by reference herein.

FIELD OF THE INVENTION

The present invention relates generally to the field of determining the occupancy state of the vehicle which entails sensing, detecting, monitoring and/or identifying various objects, and parts thereof, which are located within the passenger compartment of the vehicle. The occupancy state is a broad or narrow description of the state or condition of one or more occupying items in the vehicle. Thus, a determination of the occupancy state may include a determination of the type or class of any occupying items, the size of any occupying items, the position of any occupying item including the orientation of occupying items, the identification of any occupying items and/or the status of any occupying items (whether the occupying items are conscious or unconscious). The determination of the occupancy state is used to control a vehicular component.

In particular, the present invention relates to an efficient and highly reliable system for evaluating the occupancy of a vehicle by detecting the presence and optionally orientation of objects in the seats of the passenger compartment, e.g., a rear facing child seat (RFCS) situated in the passenger compartment in a location where it may interact with a deploying occupant protection apparatus, such as an airbag, and/or for detecting an out-of-position occupant. The system permits the control and selective suppression of deployment of the occupant protection apparatus when the deployment may result in greater injury to the occupant than the crash forces themselves. This is accomplished in part through a specific placement of transducers of the system, the use of a pattern recognition system, possibly a trained neural network and combinations of neural networks called modular neural, voting or ensemble neural networks, and/or a novel analysis of the signals from the transducers.

BACKGROUND OF THE INVENTION

1. Prior Art on Sensing of Out-of-position Occupants and Rear Facing Child Seats Whereas thousands of lives have been saved by airbags, a large number of people have also been injured, some seriously, by the deploying airbag, and thus significant improvements to the airbag system are necessary. As discussed in detail in one or more of the patents and patent applications cross-referenced above, for a variety of reasons, vehicle occupants may be too close to the airbag before it deploys and can be seriously injured or killed as a result of any deployment thereof. Also, a child in a rear facing child seat which is placed on the right front passenger seat is in danger of being seriously injured if the passenger airbag deploys. For these reasons and, as first publicly disclosed in Breed, D. S. "How Airbags Work" presented at the International Conference on Seatbelts and Airbags in 1993, in Canada, occupant position sensing and rear facing child seat detection is required in order to minimize the damages caused by deploying airbags. It also may be required in order to minimize the damage caused by the deployment of other types of occupant protection and/or restraint devices which might be installed in the vehicle.

Initially, these systems will solve the out-of-position occupant and the rear facing child seat problems related to current airbag systems and prevent unneeded and unwanted airbag deployments when a front seat is unoccupied. However, airbags are now under development to protect rear seat occupants in vehicle crashes and all occupants in side impacts. A system is therefore needed to detect the presence of occupants, determine if they are out-of-position, defined below, and to identify the presence of a rear facing child seat in the rear seat. Future automobiles are expected to have eight or more airbags as protection is sought for rear seat occupants and from side impacts. In addition to eliminating the disturbance and possible harm of unnecessary airbag deployments, the cost of replacing these airbags will be excessive if they all deploy in an accident needlessly.

Inflators now exist which will adjust the amount of gas flowing to or from the airbag to account for the size and position of the occupant and for the severity of the accident. The vehicle identification and monitoring system (VIMS) discussed in U.S. Pat. Nos. 5,829,782, and 5,943,295 among others, will control such inflators based on the presence and position of vehicle occupants or of a rear facing child seat. The instant invention is concerned with the process of adapting the vehicle interior monitoring systems to a particular vehicle model and achieving a high system accuracy and reliability as discussed in greater detail below as well as the resulting pattern recognition system architecture.

The automatic adjustment of the deployment rate of the airbag based on occupant identification and position and on crash severity has been termed "smart airbags". Central to the development of smart airbags is the occupant identification and position determination systems described in the above-referenced patents and patent applications and to the methods described herein for adapting those systems to a particular vehicle model. To complete the development of smart airbags, an anticipatory crash detecting system such as disclosed in U.S. patent application Ser. No. 08/247,760 filed May 23, 1994 is also desirable. Prior to the implementation of anticipatory crash sensing, the use of a neural network smart crash sensor which identifies the type of crash and thus its severity based on the early part of the crash acceleration signature should be developed and thereafter implemented. U.S. Pat. No. 5,684,701 (Breed) describes a crash sensor based on neural networks. This crash sensor, as with all other crash sensors, determines whether or not the crash is of sufficient severity to require deployment of the airbag and, if so, initiates the deployment. A neural network based on a smart airbag crash sensor could also be designed to identify the crash and categorize it with regard to severity thus permitting the airbag deployment to be matched not only to the characteristics and position of the occupant but also the severity and timing of the crash itself as described in more detail in U.S. Pat. No. 5,943,295 referenced above.

The need for an occupant out-of-position sensor has also been observed by others and several methods have been described in certain U.S. patents for determining the position of an occupant of a motor vehicle. However, no patents have been found that describe the methods of adapting such sensors to a particular vehicle model to obtain high system accuracy or to a resulting architecture combination of pattern recognition algorithms. Each of these systems will be discussed below and have significant limitations.

In White et al. (U.S. Pat. No. 5,071,160), for example, a single acoustic sensor and detector is described and, as illustrated, is disadvantageously mounted lower than the steering wheel. White et al. correctly perceive that such a sensor could be defeated, and the airbag falsely deployed, by an occupant adjusting the control knobs on the radio and thus they suggest the use of a plurality of such sensors. White et al. does not disclose where the such sensors would be mounted, other than on the instrument panel below the steering wheel, or how they would be combined to uniquely monitor particular locations in the passenger compartment and to identify the object(s) occupying those locations. The adaptation process to vehicles is not described nor is a combination of pattern recognition algorithms.

Mattes et al. (U.S. Pat. No. 5,118,134) describe a variety of methods for measuring the change in position of an occupant including ultrasonic, active or passive infrared radiation, microwave radar sensors, and an electric eye. The use of these sensors is to measure the change in position of an occupant during a crash and they use that information to assess the severity of the crash and thereby decide whether or not to deploy the airbag. They are thus using the occupant motion as a crash sensor. No mention is made of determining the out-of-position status of the occupant or of any of the other features of occupant monitoring as disclosed in the above-referenced patents and/or patent applications. It is interesting to note that nowhere does Mattes et al. discuss how to use a combination of ultrasonic sensors/transmitters to identify the presence of a human occupant and then to find his/her location in the passenger compartment or any pattern recognition algorithm let alone a combination of such algorithms.

The object of an occupant out-of-position sensor is to determine the location of the head and/or chest of the vehicle occupant in the passenger compartment relative to the occupant protection apparatus, such as an airbag, since it is the impact of either the head or chest with the deploying airbag which can result in serious injuries. Both White et al. and Mattes et al. disclose only lower mounting locations of their sensors which are mounted in front of the occupant such as on the dashboard or below the steering wheel. Both such mounting locations are particularly prone to detection errors due to positioning of the occupant's hands, arms and legs. This would require at least three, and preferably more, such sensors and detectors and an appropriate logic circuitry, or pattern recognition system, which ignores readings from some sensors if such readings are inconsistent with others, for the case, for example, where the driver's arms are the closest objects to two of the sensors. The determination of the proper transducer mounting locations, aiming and field angles and pattern recognition system architectures for a particular vehicle model are not disclosed in either White et al. or Mattes et al. and are part of the vehicle model adaptation process described herein.

White et al. also describe the use of error correction circuitry, without defining or illustrating the circuitry, to differentiate between the velocity of one of the occupant's hands, as in the case where he/she is adjusting the knob on the radio, and the remainder of the occupant. Three ultrasonic sensors of the type disclosed by White et al. might, in some cases, accomplish this differentiation if two of them indicated that the occupant was not moving while the third was indicating that he or she was moving. Such a combination, however, would not differentiate between an occupant with both hands and arms in the path of the ultrasonic transmitter at such a location that they were blocking a substantial view of the occupant's head or chest. Since the sizes and driving positions of occupants are extremely varied, trained pattern recognition systems, such as neural networks and combinations thereof, are required when a clear view of the occupant, unimpeded by his/her extremities, cannot be guaranteed. White et al. do not suggest the use of such neural networks.

Fujita et al., in U.S. Pat. No. 5,074,583, describe another method of determining the position of the occupant but do not use this information to control and suppress deployment of an airbag if the occupant is out-of-position, or if a rear facing child seat is present. In fact, the closer that the occupant gets to the airbag, the faster the inflation rate of the airbag is according to the Fujita et al. patent, which thereby increases the possibility of injuring the occupant. Fujita et al. do not measure the occupant directly but instead determine his or her position indirectly from measurements of the seat position and the vertical size of the occupant relative to the seat. This occupant height is determined using an ultrasonic displacement sensor mounted directly above the occupant's head.

It is important to note that in all cases in the above-cited prior art, except those assigned to the current assignee of the instant invention, no mention is made of the method of determining transducer location, deriving the algorithms or other system parameters that allow the system to accurately identify and locate an object in the vehicle. In contrast, in one implementation of the instant invention, the return ultrasonic echo pattern over several milliseconds corresponding to the entire portion of the passenger compartment volume of interest is analyzed from multiple transducers and sometimes combined with the output from other transducers, providing distance information to many points on the items occupying the passenger compartment.

Many of the teachings of this invention are based on pattern recognition technologies as taught in numerous textbooks and technical papers. Central to the diagnostic teachings of this invention are the manner in which the diagnostic module determines a normal pattern from an abnormal pattern and the manner in which it decides what data to use from the vast amount of data available. This is accomplished using pattern recognition technologies, such as artificial neural networks, and training. The theory of neural networks including many examples can be found in several books on the subject including: *Techniques And Application Of Neural Networks*, edited by Taylor, M. and Lisboa, P., Ellis Horwood, West Sussex, England, 1993; *Naturally Intelligent Systems*, by Caudill, M. and Butler, C., MIT Press, Cambridge Mass., 1990; J. M. Zaruda, *Introduction to Artificial Neural Systems*, West publishing Co., N.Y., 1992 and, *Digital Neural Networks*, by Kung, S. Y., PTR Prentice Hall, Englewood Cliffs, N.J., 1993, Eberhart, R., Simpson, P. and Dobbins, R., *Computational Intelligence PC Tools*, Academic Press, Inc., 1996, Orlando, Fla., all of which are included herein by reference. The neural network pattern recognition technology is one of the most developed of pattern recognition technologies. The invention described herein uses combinations of neural networks to improve the pattern recognition process.

Other patents describing occupant sensor systems include U.S. Pat. No. 5,482,314 (Corrado et al.) and U.S. Pat. No. 5,890,085 (Corrado et al.). These patents describe a system for sensing the presence, position and type of an occupant in a seat of a vehicle for use in enabling or disabling a related airbag activator. A preferred implementation of the system includes two or more different but collocated sensors which provide information about the occupant and this information is fused or combined in a microprocessor circuit to produce an output signal to the airbag controller. According to Corrado et al., the fusion process produces a decision as to whether to enable or disable the airbag with a higher reliability than a single phenomena sensor or non-fused multiple sensors. By fusing the information from the sensors to make a determination as to the deployment of the airbag, each sensor has only a partial effect on the ultimate deployment determination. The sensor fusion process is a crude pattern recognition process based on deriving the fusion "rules" by a trial and error process rather than by training.

The sensor fusion method of Corrado et al. requires that information from the sensors be combined prior to processing by an algorithm in the microprocessor. This combination could be found to unnecessarily complicate the processing of the data from the sensors and other data processing methods might provide better results. For example, as discussed more fully below, it has been found to be advantageous to use a more efficient pattern recognition algorithm such as a combination of neural networks or fuzzy logic algorithms which are arranged to receive a separate stream of data from each sensor, without that data being combined with data from the other sensors (as in done in Corrado et al.) prior to analysis by the pattern recognition algorithms. In this regard, it is critical to appreciate that sensor fusion is a form of pattern recognition but is not a neural network and that significant and fundamental differences exist between sensor fusion and neural networks. Thus, some embodiments of the invention described below differ from that of Corrado et al. because they include a microprocessor which is arranged to accept only a separate stream of data from each sensor such that the stream of data from the sensors are not combined with one another. Further, the microprocessor processes each separate stream of data independent of the processing of the other streams of data (i.e., without the use of any fusion matrix as in Corrado et al.).

2. Definitions

The use of pattern recognition, or more particularly how it is used, is central to the instant invention. In the above-cited prior art, except in that assigned to the current assignee of the instant invention, pattern recognition which is based on training, as exemplified through the use of neural networks, is not mentioned for use in monitoring the interior passenger compartment or exterior environments of the vehicle. Thus, the methods used to adapt such systems to a vehicle are also not mentioned.

"Pattern recognition" as used herein will generally mean any system which processes a signal that is generated by an object (e.g., representative of a pattern of returned or received impulses, waves or other physical property specific to and/or characteristic of and/or representative of that object) or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The signals processed are generally a series of electrical signals coming from transducers that are sensitive to acoustic (ultrasonic) or electromagnetic radiation (e.g., visible light, infrared radiation, capacitance or electric and magnetic fields), although other sources of information are frequently included. Pattern recognition systems generally involve the creation of a set of rules that permit the pattern to be recognized. These rules can be created by fuzzy logic systems, statistical correlations, or through sensor fusion methodologies as well as by trained pattern recognition systems such as neural networks.

A trainable or a trained pattern recognition system as used herein generally means a pattern recognition system which is taught to recognize various patterns constituted within the signals by subjecting the system to a variety of examples. The most successful such system is the neural network used either singly or as a combination of neural networks. Thus, to generate the pattern recognition algorithm, test data is first obtained which constitutes a plurality of sets of returned waves, or wave patterns, from an object (or from the space in which the object will be situated in the passenger compartment, i.e., the space above the seat) and an indication of the identify of that object. A number of different objects are tested to obtain the unique wave patterns from each object. As such, the algorithm is generated, and stored in a computer processor, and which can later be applied to provide the identity of an object based on the wave pattern being received during use by a receiver connected to the processor and other information. For the purposes here, the identity of an object sometimes applies to not only the object itself but also to its location and/or orientation in the passenger compartment. For example, a rear facing child seat is a different object than a forward facing child seat and an out-of-position adult is a different object than a normally seated adult.

To "identity" as used herein will generally mean to determine that the object belongs to a particular set or class. The class may be one containing, for example, all rear facing child seats, one containing all human occupants, or all human occupants not sitting in a rear facing child seat depending on the purpose of the system. In the case where a particular person is to be recognized, the set or class will contain only a single element, i.e., the person to be recognized.

An "object" in a vehicle or an "occupying item" of a seat may be a living occupant such as a human or a dog, another living organism such as a plant, or an inanimate object such as a box or bag of groceries or an empty child seat.

"Out-of-position" as used for an occupant will generally mean that the occupant, either the driver or a passenger, is sufficiently close to the occupant protection apparatus (airbag) prior to deployment that he or she is likely to be more seriously injured by the deployment event itself than by the accident. It may also mean that the occupant is not positioned appropriately in order to attain beneficial, restraining effects of the deployment of the airbag. An occupant is too close to the airbag when the occupant's head or chest is closer than some distance, such as about 5 inches, from the deployment door of the airbag module. The actual distance value where airbag deployment should be suppressed depends on the design of the airbag module and is typically farther for the passenger airbag than for the driver airbag.

"Transducer" as used herein will generally mean the combination of a transmitter and a receiver. In come cases, the same device will serve both as the transmitter and receiver while in others two separate devices adjacent to each other will be used. In some cases, a transmitter is not used and in such cases transducer will mean only a receiver. Transducers include, for example, capacitive, inductive, ultrasonic, electromagnetic (antenna, CCD, CMOS arrays), weight measuring or sensing devices.

"Adaptation" as used here will generally represent the method by which a particular occupant sensing system is designed and arranged for a particular vehicle model. It includes such things as the process by which the number, kind and location of various transducers is determined. For pattern recognition systems, it includes the process by which the pattern recognition system is designed and then taught to recognize the desired patterns. In this connection, it will usually include (1) the method of training, (2) the makeup of the databases used for training, testing and validating the particular system, or, in the case of a neural network, the particular network architecture chosen, (3) the process by which environmental influences are incorporated into the system, and (4) any process for determining the pre-processing of the data or the post processing of the results of the pattern recognition system. The above list is illustrative and not exhaustive. Basically, adaptation includes all of the steps that are undertaken to adapt transducers and other sources of information to a particular vehicle to create the system which accurately identifies and determines the location of an occupant or other object in a vehicle.

A "combination neural network" as used herein will generally apply to any combination of two or more neural networks that are either connected together or that analyze all or a portion of the input data. A combination neural network can be used to divide tasks in solving a particular occupant problem. For example, one neural network can be used to identify an object occupying a passenger compartment of an automobile and a second neural network can be used to determine the position of the object or its location with respect to the airbag, for example, within the passenger compartment. In another case, one neural network can be used merely to determine whether the data is similar to data upon which a main neural network has trained or whether there is something radically different about this data and therefore that the data should not be analyzed.

With respect to a comparative analysis performed by neural networks to that perform by the human mind, once the human mind has identified that the object observer is a tree, the mind does not try to determine whether it is the black bear or a grizzly. Further observation on the tree might center on whether it is a pine tree, an oak tree etc. Thus the human mind appears to operate in some manner like a hierarchy of neural networks. Similarly, neural networks for analyzing the occupancy of the vehicle can be structured such that higher order networks are used to determine, for example, whether there is an occupying item of any kind present. This could be followed by the neural network that, knowing that there is information on the item, attempts to categorize the item into child seats and human adults etc., i.e., determine the type of item Once it has decided that a child seat is present, then another neural network can be used to determine whether the child seat is rear facing or forward facing. Once the decision has been made that the child seat is facing rearward, the position of the child seat relative to the airbag, for example, can be handled by still another neural network. The overall accuracy of the system can be substantially improved by breaking the pattern recognition process down into a larger number of smaller pattern recognition problems.

In some cases, the accuracy of the pattern recognition process can be improved if the neural network has data indicating its own recent decisions. Thus, for example, if the neural network system had determined that a forward facing adult was present, then that information can be used as input into another neural network, biasing any results toward the forward facing human compared to a rear facing child seat, for example. Similarly, for the case when an occupant is being tracked in his or her forward motion during a crash, for example, the location of the occupant at the previous calculation time step can be valuable information to determining the location of the occupant from the current data. There is a limited distance an occupant can move in 10 milliseconds, for example. In this latter example, feedback of the decision of the neural network tracking algorithm becomes important input into the same algorithm for the calculation of the position of the occupant at the next time step.

What has been described above is generally referred to as modular neural networks with and without feedback. Actually, the feedback does not have to be from the output to the input of the same neural network. The feedback from a downstream neural network could be input to an upstream neural network, for example.

The neural networks can be combined in other ways, for example in a voting situation. Sometimes the data upon which the system is trained is sufficiently complex or imprecise that different views of the data will give different results. For example, a subset of transducers may be used to train one neural network and another subset to train a second neural network etc. The decision can then be based on a voting of the parallel neural networks, known as an ensemble neural networks. In the past, neural networks have usually only been used in the form of a single neural network algorithm for identifying the occupancy state of an automobile. This invention is primarily advancing the state of the art and using combination neural networks wherein two or more neural networks are combined to arrive at a decision.

In the description herein on anticipatory sensing, the term "approaching" when used in connection with the mention of an object or vehicle approaching another will generally mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The "target" vehicle is the vehicle which is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

Also, for the purposes herein, a "wave sensor" or "wave transducer" is generally any device, which senses either ultrasonic or electromagnetic waves . An electromagnetic wave sensor, for example, includes devices that sense any portion of the electromagnetic spectrum from ultraviolet down to a few hertz. The most commonly used kinds of electromagnetic wave sensors include CCD and CMOS arrays for sensing visible and/or infrared waves, millimeter wave and microwave radar, and capacitive or electric and magnetic field monitoring sensors that rely on the dielectric constant of the object occupying a space but also rely on the time variation of the field, expressed by waves, to determine a change in state. In this regard, reference is made to, for example, U.S. patents by Kithil et al. U.S. Pat. Nos. 5,366,241, 5,602,734, 5,691,693, 5,802,479 and 5,844,486 and Jinno et al. U.S. Pat. No. 5,948,031 which are included herein by reference.

3. Pattern Recognition Prior Art

Japanese Patent No. 3-42337 (A) to Ueno describes a device for detecting the driving condition of a vehicle driver comprising a light emitter for irradiating the face of the driver and a means for picking up the image of the driver and storing it for later analysis. Means are provided for locating the eyes of the driver and then the irises of the eyes and then determining if the driver is looking to the side or sleeping. Ueno determines the state of the eyes of the occupant rather than determining the location of the eyes relative to the other parts of the vehicle passenger compartment. Such a system can be defeated if the driver is wearing glasses, particularly sunglasses, or another optical device which obstructs a clear view of his/her eyes. Pattern recognition technologies such as neural networks are not used. The method of finding the eyes is described but not a method of adapting the system to a particular vehicle model.

U.S. Pat. No. 5,008,946 to Ando uses a complicated set of rules to isolate the eyes and mouth of a driver and uses this information to permit the driver to control the radio, for example, or other systems within the vehicle by moving his eyes and/or mouth. Ando uses natural light and illuminates only the head of the driver. He also makes no use of trainable pattern recognition systems such as neural networks, nor is there any attempt to identify the contents of the vehicle nor of their location relative to the vehicle passenger compartment. Rather, Ando is limited to control of vehicle devices by responding to motion of the driver's mouth and eyes. As with Ueno, a method of finding the eyes is described but not a method of adapting the system to a particular vehicle model.

U.S. Pat. No. 5,298,732 to Chen also concentrates on locating the eyes of the driver so as to position a light filter between a light source such as the sun or the lights of an oncoming vehicle, and the driver's eyes. Chen does not explain in detail how the eyes are located but does supply a calibration system whereby the driver can adjust the filter so that it is at the proper position relative to his or her eyes. Chen references the use of an automatic equipment for determining the location of the eyes but does not describe how this equipment works. In any event, in Chen, there is no mention of monitoring the position of the occupant, other that the eyes, determining the position of the eyes relative to the passenger compartment, or identifying any other object in the vehicle other than the driver's eyes. Also, there is no mention of the use of a trainable pattern recognition system. A method for finding the eyes is described but not a method of adapting the system to a particular vehicle model.

U.S. Pat. No. 5,305,012 to Faris also describes a system for reducing the glare from the headlights of an oncoming vehicle. Faris locates the eyes of the occupant by using two spaced apart infrared cameras using passive infrared radiation from the eyes of the driver. Faris is only interested in locating the driver's eyes relative to the sun or oncoming headlights and does not identify or monitor the occupant or locate the occupant, a rear facing child seat or any other object for that matter, relative to the passenger compartment or the airbag. Also, Faris does not use trainable pattern recognition techniques such as neural networks. Faris, in fact, does not even say how the eyes of the occupant are located but refers the reader to a book entitled Robot Vision (1991) by Berthold Horn, published by MIT Press, Cambridge, Mass. Also, Faris uses the passive infrared radiation rather than illuminating the occupant with ultrasonic or electromagnetic radiation as in some implementations of the instant invention. A method for finding the eyes of the occupant is described but not a method of adapting the system to a particular vehicle model.

The use of neural networks, or neural fuzzy systems, and particular combination neural networks, as the pattern recognition technology and the methods of adapting this to a particular vehicle, such as the training methods, is important to this invention since it makes the monitoring system robust, reliable and accurate. The resulting systems are easy to implement at a low cost making them practical for automotive applications. The cost of the ultrasonic transducers, for example, is expected to be less than about $1 in quantities of one million per year and CMOS cameras, currently less than $5 each in similar quantities. Similarly, the implementation of the techniques of the above-referenced patents requires expensive microprocessors while the implementation with neural networks and similar trainable pattern recognition technologies permits the use of low cost microprocessors typically costing less than about $5 in quantities of one million per year.

The present invention uses sophisticated software that develops trainable pattern recognition algorithms such as neural networks and combination neural networks. Usually the data is preprocessed, as discussed below, using various feature extraction techniques and the results post-processed to improve system accuracy. A non-automotive example of such a pattern recognition system using neural networks on sonar signals is discussed in two papers by Gorman, R. P. and Sejnowski, T. J. "Analysis of Hidden Units in a Layered Network Trained to Classify Sonar Targets", Neural Networks, Vol. 1. pp. 75–89, 1988, and "Learned Classification of Sonar Targets Using a Massively Parallel Network", IEEE Transactions on Acoustics, Speech, and Signal Processing, Vol. 36, No. 7, July 1988. Examples of feature extraction techniques can be found in U.S. Pat. No. 4,906,940 entitled "Process and Apparatus for the Automatic Detection and Extraction of Features in Images and Displays" to Green et al. Examples of other more advanced and efficient pattern recognition techniques can be found in U.S. Pat. No. 5,390,136 entitled "Artificial Neuron and Method of Using Same" and U.S. Pat. No. 5,517,667 entitled "Neural Network That Does Not Require Repetitive Training" to Wang, S. T.. Other examples include U.S. Pat. No. 5,235,339 (Morrison et al.), U.S. Pat. No. 5,214,744 (Schweizer et al), 5,181,254 (Schweizer et al), and U.S. Pat. No. 4,881,270 (Knecht et al). All of the references herein are included herein by reference.

4. Ultrasonics and Optics

Both laser and non-laser optical systems in general are good at determining the location of objects within the two dimensional plane of the image and a pulsed laser radar system in the scanning mode can determine the distance of each part of the image from the receiver by measuring the time of flight through range gating techniques. Distance can also be determined by using modulated electromagnetic radiation and measuring the phase difference between the transmitted and received waves. It is also possible to determine distance with the non-laser system by focusing, or stereographically if two spaced apart receivers are used and, in some cases, the mere location in the field of view can be used to estimate the position relative to the airbag, for example. Finally, a recently developed pulsed quantum well diode laser also provides inexpensive distance measurements as discussed in U.S. provisional patent application Ser. No. 60/114,507, filed Dec. 31, 1998, which is included herein by reference as if the entire contents were copied here.

Acoustic systems are additionally quite effective at distance measurements since the relatively low speed of sound permits simple electronic circuits to be designed and minimal microprocessor capability is required. If a coordinate system is used where the z-axis is from the transducer to the occupant, acoustics are good at measuring z dimensions while simple optical systems using a single CCD or CMOS arrays are good at measuring x and y dimensions. The combination of acoustics and optics, therefore, permits all three measurements to be made from one location with low cost components as discussed in commonly assigned U.S. Pat. Nos. 5,845,000 and 5,835,613 cross-referenced above.

One example of a system using these ideas is an optical system which floods the passenger seat with infrared light coupled with a lens and a receiver array, e.g., CCD or CMOS array, which receives and displays the reflected light and an analog to digital converter (ADC) which digitizes the output of the CCD or CMOS and feeds it to an Artificial Neural Network (ANN) or other pattern recognition system for analysis. This system uses an ultrasonic transmitter and receiver for measuring the distances to the objects located in the passenger seat. The receiving transducer feeds its data into an ADC and from there the converted data is directed into the ANN. The same ANN can be used for both systems thereby providing full three-dimensional data for the ANN to analyze. This system, using low cost components, will permit accurate identification and distance measurements not possible by either system acting alone. If a phased array system is added to the acoustic part of the system, the optical part can determine the location of the driver's ears, for example, and the phased array can direct a narrow beam to the location and determine the distance to the occupant's ears.

Although the use of ultrasound for distance measurement has many advantages, it also has some drawbacks. First, the speed of sound limits the rate at which the position of the occupant can be updated to approximately 10 milliseconds, which though sufficient for most cases, is marginal if the position of the occupant is to be tracked during a vehicle crash. Second, ultrasound waves are diffracted by changes in air density that can occur when the heater or air conditioner is operated or when there is a high-speed flow of air past the transducer. Third, the resolution of ultrasound is limited by its wavelength and by the transducers, which are high Q tuned devices. Typically, the resolution of ultrasound is on the order of about 2 to 3 inches. Finally, the fields from ultrasonic transducers are difficult to control so that reflections from unwanted objects or surfaces add noise to the data.

Ultrasonics alone can be used in several configurations for monitoring the interior of a passenger compartment of an automobile as described in the above-referenced patents and patent applications and in particular in U.S. Pat. No. 5,943, 295. Using the teachings of this invention, the optimum number and location of the ultrasonic and/or optical transducers can be determined as part of the adaptation process for a particular vehicle model.

In the cases of the instant invention, as discussed in more detail below, regardless of the number of transducers used, a trained pattern recognition system, as defined above, is used to identify and classify, and in some cases to locate, the illuminated object and its constituent parts.

5. Applications

The applications for this technology are numerous as described in the patents and patent applications listed above. However, the main focus of the instant invention is the process and resulting apparatus of adapting the system in the patents and patent applications referenced above and using combination neural networks for the detection of the presence of an occupied child seat in the rear facing position or an out-of-position occupant and the detection of an occupant in a normal seating position. The system is designed so that in the former two cases, deployment of the occupant protection apparatus (airbag) may be controlled and possibly suppressed, and in the latter case, it will be controlled and enabled.

One preferred implementation of a first generation occupant sensing system, which is adapted to various vehicle models using the teachings presented herein, is an ultrasonic occupant position sensor. This system uses a Combination Artificial Neural Network (CANN) to recognize patterns that it has been trained to identify as either airbag enable or airbag disable conditions. The pattern is obtained from four ultrasonic transducers that cover the front passenger seating area. This pattern consists of the ultrasonic echoes bouncing off of the objects in the passenger seat area. The signal from each of the four transducers consists of the electrical image of the return echoes, which is processed by the electronics. The electronic processing comprises amplification, logarithmic compression rectification, and demodulation (band pass filtering), followed by discretization (sampling) and digitization of the signal. The only software processing required, before this signal can be fed into the combination artificial neural network, is normalization (i.e., mapping the input to numbers between 0 and 1). Although this is a fair amount of processing, the resulting signal is still considered "raw", because all information is treated equally.

OBJECTS AND SUMMARY OF THE INVENTION

In general, it is an object of the present invention to provide a new and improved system for identifying the presence, position and/or orientation of an object in a vehicle.

It is another broad object of the present invention to provide a system for accurately detecting the presence of an occupied rear-facing child seat in order to prevent an occupant protection apparatus, such as an airbag, from deploying, when the airbag would impact against the rear-facing child seat if deployed.

It is yet another broad object of the present invention to provide a system for accurately detecting the presence of an out-of-position occupant in order to prevent one or more deployable occupant protection apparatus such as airbags from deploying when the airbag(s) would impact against the head or chest of the occupant during its initial deployment phase causing injury or possible death to the occupant.

This invention is a system designed to identify, locate and monitor occupants, including their parts, and other objects in the passenger compartment and in particular an occupied child seat in the rear facing position or an out-of-position occupant, by illuminating the contents of the vehicle with ultrasonic or electromagnetic radiation, for example, by transmitting radiation waves from a wave generating apparatus into a space above the seat, and receiving radiation modified by passing through the space above the seat using two or more transducers properly located in the vehicle passenger compartment, in specific predetermined optimum locations. More particularly, this invention relates to a system including a plurality of transducers appropriately located and mounted and which analyze the received radiation from any object which modifies the waves, or which analyze a change in the received radiation caused by the presence of the object (e.g., a change in the dielectric constant), in order to achieve an accuracy of recognition heretofore not possible. Outputs from the receivers are analyzed by appropriate computational means employing trained pattern recognition technologies, and in particular combination neural networks, to classify, identify and/or locate the contents, and/or determine the orientation of, for example, a rear facing child seat. In general, the information obtained by the identification and monitoring system is used to affect the operation of some other system, component or device in the vehicle and particularly the passenger and/or driver airbag systems, which may include a front airbag, a side airbag, a knee bolster, or combinations of the same. However, the information obtained can be used for controlling or affecting the operation of a multitude of other vehicle systems.

When the vehicle interior monitoring system in accordance with the invention is installed in the passenger compartment of an automotive vehicle equipped with a occupant protection apparatus, such as an inflatable airbag, and the vehicle is subjected to a crash of sufficient severity that the crash sensor has determined that the protection apparatus is to be deployed, the system has determined (usually prior to the deployment) whether a child placed in the child seat in the rear facing position is present and if so, a signal has been sent to the control circuitry that the airbag should be controlled and most likely disabled and not deployed in the crash. It must be understood though that instead of suppressing deployment, it is possible that the deployment may be controlled so that it might provide some meaningful protection for the occupied rear-facing child seat. The system developed using the teachings of this invention also determines the position of the vehicle occupant relative to the airbag and controls and possibly disables deployment of the airbag if the occupant is positioned so that he/she is likely to be injured by the deployment of the airbag. As before, the deployment is not necessarily disabled but may be controlled to provide protection for the out-of-position occupant.

Principle objects and advantages of the methods in accordance with the invention are:

1. To provide a reliable system for recognizing the presence of a rear-facing child seat on a particular seat of a motor vehicle.

2. To provide a reliable system for recognizing the presence of a human being on a particular seat of a motor vehicle.

3. To provide a reliable system for determining the position, velocity or size of an occupant in a motor vehicle.

4. To provide a reliable system for determining in a timely manner that an occupant is out-of-position, or will become out-of-position, and likely to be injured by a deploying airbag.

5. To provide a system in which transducers are located within the passenger compartment at specific locations such that a high reliability of classification of objects and their position is obtained from the signals generated by the transducers.

6. To provide a system including a variety of transducers such as seatbelt payout sensors, seatbelt buckle sensors, seat position sensors, seatback position sensors, and weight sensors and which is adapted so as to constitute a highly reliable occupant presence and position system when used in combination with electromagnetic, ultrasonic or other radiation sensors.

Accordingly, in a vehicle including system for determining the occupancy state of a seat therein in accordance with the invention, the system comprises a plurality of transducers arranged in the vehicle, each transducers providing data relating to the occupancy state of the seat, and processor means or a processing unit (e.g., a microprocessor) coupled to the transducers for receiving the data from the transducers and processing the data to obtain an output indicative of the current occupancy state of the seat. The processor means comprise a combination neural network algorithm created from a plurality of data sets, each representing a different occupancy state of the seat and being formed from data from the transducers while the seat is in that occupancy state. The combination neural network algorithm produces the output indicative of the current occupancy state of the seat upon inputting a data set representing the current occupancy state of the seat and being formed from data from the transducers. The algorithm may be a pattern recognition algorithm or neural network algorithm generated by a combination neural network algorithm-generating program.

In accordance with some embodiments of the invention, the processor means are arranged to accept only a separate stream of data from each transducer such that the stream of data from each transducer is passed to the processor means without combining with another stream of data. Further, the processor means may be arranged to process each separate stream of data independent of the processing of the other streams of data.

It is an important feature of the invention that the transducers may be selected from a wide variety of different sensors, all of which are affected by the occupancy state of the seat. That is, different combinations of known sensors can be utilized in the many variations of the invention. For example, the sensors used in the invention may include a weight sensor arranged in the seat, a reclining angle detecting sensor for detecting a tilt angle of the seat between a back portion of the seat and a seat portion of the seat, a seat position sensor for detecting the position of the seat relative to a fixed reference point in the vehicle, a heartbeat sensor for sensing a heartbeat of an occupying item of the seat, a capacitive sensor, a seat belt buckle sensor, a seatbelt payout sensor, an infrared sensors, an inductive sensor, a motion sensor and a radar sensor. The same type of sensor could also be used, preferably situated in a different location, but possibly in the same location for redundancy purposes. For example, the system may include a plurality of weight sensors, each measuring the weight applied onto the seat at a different location. Such weight sensors may include a weight sensor, such as a strain gage, arranged to measure displacement of a surface of a seat portion of the seat and/or a strain, force or pressure gage arranged to measure displacement of the entire seat. In the latter case, the seat includes a support structure for supporting the seat above a floor of a passenger compartment of the vehicle whereby the strain gage can be attached to the support structure.

In some embodiments, the transducers include a plurality of electromagnetic wave sensors capable of receiving waves at least from a space above the seat, each electromagnetic wave sensor being arranged at a different location. Other wave sensors, such as capacitive sensors, can also be used.

In other embodiments, the transducers include at least two ultrasonic sensors capable of receiving waves at least from a space above the seat, each ultrasonic sensor being arranged at a different location. For example, one sensor is arranged on a ceiling of the vehicle and the other is arranged at a different location in the vehicle, preferably so that an axis connecting the sensors is substantially parallel to a second axis traversing a volume in the vehicle above the seat. The second sensor may be arranged on a dashboard or instrument panel of the vehicle. A third ultrasonic sensor can be arranged on an interior side surface of the passenger compartment while a fourth can be arranged on or adjacent an interior side surface of the passenger compartment. The ultrasonic sensors are capable of transmitting waves at least into the space above the seat. Further, the ultrasonic sensors are preferably aimed such that the ultrasonic fields generated thereby cover a substantial portion of the volume surrounding the seat. Horns or grills may be provided for adjusting the transducer field angles of the ultrasonic sensors to reduce reflections off of fixed surfaces within the vehicle or otherwise control the shape of the ultrasonic field.

The actual location of the ultrasonic sensors can be determined by placing a significant number of ultrasonic sensors in the vehicle and removing those sensors which prove analytically to be redundant.

The ultrasonic sensors can have different transmitting and receiving frequencies and be arranged in the vehicle such that sensors having adjacent transmitting and receiving frequencies are not within a direct ultrasonic field of each other.

Once the occupancy state of the seat (or seats) in the vehicle is known, this information can be used to control or affect the operation of a significant number of vehicular systems, components and devices. That is, the systems, components and devices in the vehicle would be controlled in consideration of the occupancy of the seat(s) in the vehicle, possibly to optimize operation of the same. Thus, the vehicle includes control means coupled to the processor means for controlling a component or device in the vehicle in consideration of the output indicative of the current occupancy state of the seat obtained from the processor means. The component or device can be an airbag system including at least one deployable airbag whereby the deployment of the airbag is suppressed, e.g., if the seat is occupied by a rear-facing child seat, or otherwise the parameters of the deployment are controlled.

In another embodiment of the invention, the system for determining the occupancy state of a seat in a vehicle includes a plurality of transducers arranged in the vehicle, each providing data relating to the occupancy state of the seat, and processor means coupled to the transducers for receiving only a separate stream of data from each transducer (such that the stream of data from each transducer is passed to the processor means without combining with another stream of data) and processing the streams of data to obtain an output indicative of the current occupancy state of the seat. The processor means comprise an algorithm created from a plurality of data sets, each representing a different occupancy state of the seat and being formed from separate streams of data, each only from one transducers, while the seat is in that occupancy state. The algorithm produces the output indicative of the current occupancy state of the seat upon inputting a data set representing the current occupancy state of the seat and being formed from separate streams of data, each only from one transducer. The processor means preferably process each separate stream of data independent of the processing of the other streams of data.

In yet another embodiment of the invention, the system for determining the occupancy state of a seat in a vehicle includes a plurality of transducers including at least two wave-receiving transducers arranged in the vehicle, each providing data relating to the occupancy state of the seat. One wave-receiving transducer is arranged on or adjacent to a ceiling of the vehicle and a second wave-receiving transducer is arranged at a different location in the vehicle such that an axis connecting these wave-receiving transducers is substantially parallel to a longitudinal axis of the vehicle, substantially parallel to a transverse axis of the vehicle or passes through a volume above the seat. A processor is coupled to the transducers for receiving data from the transducers and processing the data to obtain an output indicative of the current occupancy state of the seat. The processor comprises an algorithm which produces the output indicative of the current occupancy state of the seat upon inputting a data set representing the current occupancy state of the seat and being formed from data from the transducers.

In still another embodiment of the invention, the system includes a plurality of transducers arranged in the vehicle, each providing data relating to the occupancy state of the seat, and which include a wave-receiving transducer and a non-wave-receiving transducer. The system also includes processor means coupled to the transducers for receiving the data from the transducers and processing the data to obtain an output indicative of the current occupancy state of the seat. The processor means comprising an algorithm created from a plurality of data sets, each representing a different occupancy state of the seat and being formed from data from the transducers while the seat is in that occupancy state. The algorithm produces the output indicative of the current occupancy state of the seat upon inputting a data set representing the current occupancy state of the seat and being formed from data from the transducers.

In all of the implementations of the invention described above, a combination or combinational neural network is used. The particular combination neural network is determined by a process in which a number of neural network modules are combined in a parallel and a serial manner and an optimization program can be utilized to determine the best combination of such neural networks to achieve the highest accuracy. Alternately, the optimization process can be undertaken manually in a trial and error manner. In this manner, the optimum combination of neural networks is selected to solve the particular pattern recognition and categorization objective desired.

These and other objects and advantages will become apparent from the following description of the preferred embodiments of the vehicle identification and monitoring system of this invention.

BRIEF DESCRIPTION OF THE DRAWINGS

The following drawings are illustrative of embodiments of the system developed or adapted using the teachings of this invention and are not meant to limit the scope of the invention as encompassed by the claims. In particular, the illustrations below are limited to the monitoring of the front passenger seat for the purpose of describing the system. Naturally, the invention applies as well to adapting the system to the other seating positions in the vehicle and particularly to the driver position.

FIG. 18 is a database of data sets for use in training of a neural network in accordance with the invention.

FIG. 19 is a categorization chart for use in a training set collection matrix in accordance with the invention.

FIGS. 20, 21 and 22 are charts of infant seats, child seats and booster seats showing attributes of the seats and a designation of their use in the training database, validation database or independent database in an exemplifying embodiment of the invention.

FIGS. 23A–23D show a chart showing different vehicle configurations for use in training of combination neural network in accordance with the invention.

FIGS. 24A–24H show a training set collection matrix for training a neural network in accordance with the invention.

FIG. 25 shows an independent test set collection matrix for testing a neural network in accordance with the invention.

FIG. 26 is a table of characteristics of the data sets used in the invention.

FIG. 27 is a table of the distribution of the main training subjects of the training data set.

FIG. 28 is a table of the distribution of the types of child seats in the training data set.

FIG. 29 is a table of the distribution of environmental conditions in the training data set.

FIG. 30 is a table of the distribution of the validation data set.

FIG. 31 is a table of the distribution of human subjects in the validation data set.

FIG. 32 is a table of the distribution of child seats in the validation data set.

FIG. 33 is a table of the distribution of environmental conditions in the validation data set.

FIG. 34 is a table of the inputs from ultrasonic transducers.

FIG. 35 is a table of the baseline network performance.

FIG. 36 is a table of the performance per occupancy subset.

FIG. 37 is a tale of the performance per environmental conditions subset.

FIG. 39 is a table of the results of the normalization study.

FIG. 40 is a table of the results of the low threshold filter study.

DETAILED DESCRIPTION OF THE PREFERRED EMBODIMENTS

Figure 1:
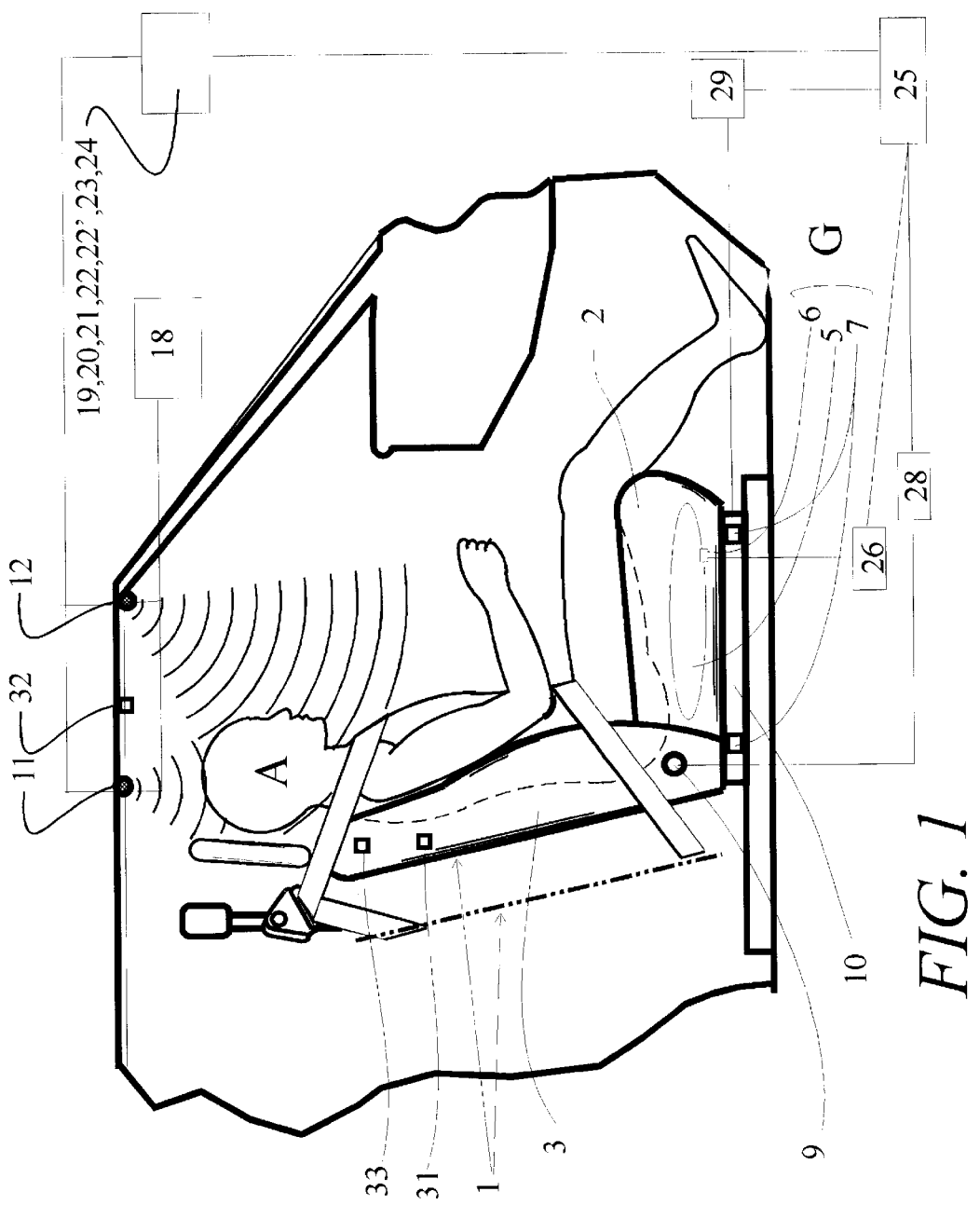
FIG. 1 shows a seated-state detecting unit developed in accordance with the present invention and the connections between ultrasonic or electromagnetic sensors, a weight sensor, a reclining angle detecting sensor, a seat track position detecting sensor, a heartbeat sensor, a motion sensor, a neural network circuit, and an airbag system installed within a vehicle compartment.

System Adaptation involves the process by which the hardware configuration and the software algorithms are determined for a particular vehicle. Each vehicle model or platform will most likely have a different hardware configuration and different algorithms. Some of the various aspects that make up this process are as follows:

The determination of the mounting location and aiming of the transducers.

The determination of the transducer field angles

The use of a combination neural network algorithm generating program such as available from Consultants International Ltd., LLC to help generate the algorithms.

The process of the collection of data in the vehicle for neural network training purposes.

The method of automatic movement of the vehicle seats etc. while data is collected The determination of the quantity of data to acquire and the setups needed to achieve a high system accuracy, typically several hundred thousand vectors.

The collection of data in the presence of varying environmental conditions such as with thermal gradients.

The photographing of each data setup.

The makeup of the different databases and the use of three different databases.

The method by which the data is biased to give higher probabilities for forward facing humans.

The automatic recording of the vehicle setup including seat, seat back, headrest, window, visor, armrest positions to help insure data integrity.

The use of a daily setup to validate that the transducer configuration has not changed.

The method by which bad data is culled from the database.

The inclusion of the Fourier transforms and other pre-processors of the data in the training process.

The use of multiple network levels, for example, for categorization and position.

The use of multiple networks in parallel.

The use of post processing filters and the particularities of these filters.

The addition of fuzzy logic or other human intelligence based rules.

The method by which vector errors are corrected using, for example, a neural network.

The use of neural works as the pattern recognition algorithm generating system.

The use of back propagation neural networks from training.

The use of vector normalization.

The use of feature extraction techniques including:

The number of data points prior to a peak.

The normalization factor.

The total number of peaks.

The vector mean or variance.

The use of other computational intelligence systems such as the genetic algorithms The use the data screening techniques.

The techniques used to develop a stable networks including the concepts of old and new networks.

The time spent or the number of iterations spent in, and method of, arriving at stable networks.

The technique where a small amount of data is collected first such as 16 sheets followed by a complete data collection sequence.

The process of adapting the system to the vehicle begins with a survey of the vehicle model. Any existing sensors, such as seat position sensors, seat back sensors, etc., are immediate candidates for inclusion into the system. Input from the customer will determine what types of sensors would be acceptable for the final system. These sensors can include: seat structure mounted weight sensors, pad type weight sensors, pressure type weight sensors, seat fore and aft position sensors, seat vertical position sensors, seat angular position sensors, seat back position sensors, headrest position sensors, ultrasonic occupant sensors, optical occupant sensors, capacitive sensors, inductive sensors, radar sensors, vehicle velocity and acceleration sensors, brake pressure, seatbelt force, payout and buckle sensors, etc. A candidate array of sensors is then chosen and mounted onto the vehicle.

The vehicle is also instrumented so that data input by humans is minimized. Thus, the positions of the various components in the vehicle such as the seats, windows, sun visor, armrest etc. are automatically recorded. Also, the position of the occupant while data is being taken is also recorded through a variety of techniques such as direct ultrasonic ranging sensors, optical ranging sensors, radar ranging sensors, optical tracking sensors etc. Cameras are also installed to take a picture of the setup to correspond to each vector of data collected or at some other appropriate frequency.

A standard set of vehicle setups is chosen for initial trial data collection purposes. Typically, the initial trial will consist of between 20,000 and 100,000 setups, although this range is not intended to limit the invention.

Initial digital data collection now proceeds for the trial setup matrix. The data is collected from the transducers, digitized and combined to form to a vector of input data for analysis by a neural network program or combination neural network program. This analysis should yield a training accuracy of nearly 100%. If this is not achieved, then additional sensors are added to the system or the configuration changed and the data collection and analysis repeated.

In addition to a variety of seating states for objects in the passenger compartment, the trial database will also include environmental effects such as thermal gradients caused by heat lamps and the operation of the air conditioner and heater. A sample of such a matrix is presented in FIGS. 24A–24H, with some of the variables and objects used in the matrix being designated or described in FIGS. 18–23D. After the neural network has been trained on the trial database, the trial database will be scanned for vectors that yield erroneous results (which would likely be considered bad data). A study of those vectors along with vectors from associated in time cases are compared with the photographs to determine whether there is erroneous data present. If so, an attempt is made to determine the cause of the erroneous data. If the cause can be found, for example if a voltage spike on the power line corrupted the data, then the vector will be removed from the database and an attempt is made to correct the data collection process so as to remove such disturbances.

At this time, some of the sensors may be eliminated from the sensor matrix. This can be determined during the neural network analysis by selectively eliminating sensor data from the analysis to see what the effect if any results. Caution should be exercised here, however, since once the sensors have been initially installed in the vehicle, it requires little additional expense to use all of the installed sensors in future data collection and analysis.

The neural network that has been developed in this first phase is used during the data collection in the next phases as an instantaneous check on the integrity of the new vectors being collected. Occasionally, a voltage spike or other environmental disturbance will momentarily effect the data from some transducers. It is important to capture this event to first eliminate that data from the database and second to isolate the cause of the erroneous data.

The next set of data to be collected is the training database. This will be the largest database initially collected and will cover such setups as listed, for example, in FIGS. 24A–24H. The training database, which may contain 500,000 or more vectors, will be used to begin training of the neural network. While this is taking place additional data will be collected according to FIGS. 20–22 and 25 of the independent and validation databases. The training database has been selected so that it uniformly covers all seated states that are known to be likely to occur in the vehicle. The independent database may be similar in makeup to the training database or it may evolve to more closely conform to the occupancy state distribution of the validation database. During the neural network training, the independent database is used to check the accuracy of the neural network and to reject a candidate neural network design if its accuracy, measured against the independent database, is less than that of a previous network architecture.

Although the independent database is not actually used in the training of the neural network, nevertheless, it has been found that it significantly influences the network structure or architecture. Therefore, a third database, the validation or real world database, is used as a final accuracy check of the chosen system. It is the accuracy against this validation database that is considered to be the system accuracy. The validation database is composed of vectors taken from setups which closely correlate with vehicle occupancy in real cars on the roadway. Initially the training database is the largest of the three databases. As time and resources permit the independent database, which perhaps starts out with 100,000 vectors, will continue to grow until it becomes approximately the same size as the training database. The validation database, on the other hand, will typically start out with as few as 50,000 vectors. However, as the hardware configuration is frozen, the validation database will continuously grow until, in some cases, it actually becomes larger than the training database. This is because near the end of the program, vehicles will be operating on highways and data will be collected in real world situations. If in the real world tests, system failures are discovered this can lead to additional data being taken for both the training and independent databases as well as the validation database.

Once a neural network has been trained using all of the available data from all of the transducers, it is expected that the accuracy of the network will be very close to 100%. It is usually not practical to use all of the transducers that have been used in the training of the system for final installation in real production vehicle models. This is primarily due to cost and complexity considerations. Usually the automobile manufacturer will have an idea of how many sensors would be acceptable for installation in a production vehicle. For example, the data may have been collected using 20 different transducers but the automobile manufacturer may restrict the final selection to 6 transducers. The next process, therefore, is to gradually eliminate sensors to determine what is the best combination of six sensors, for example, to achieve the highest system accuracy. Ideally, a series of neural networks would be trained using all combinations of six sensors from the 20 available. The activity would require a prohibitively long time. Certain constraints can be factored into the system from the beginning to start the pruning process. For example, it would probably not make sense to have both optical and ultrasonic sensors present in the same system since it would complicate the electronics. In fact, the automobile manufacturer may have decided initially that an optical system would be too expensive and therefore would not be considered. The inclusion of optical sensors, therefore, serves as a way of determining the loss in accuracy as a function of cost. Various constraints, therefore, usually allow the immediate elimination of a significant number of the initial group of sensors. This elimination and the training on the remaining sensors provides the resulting accuracy loss that results.

The next step is to remove each of the sensors one at a time and determine which sensor has the least effect on the system accuracy. This process is then repeated until the total number of sensors has been pruned down to the number desired by the customer. At this point, the process is reversed to add in one at a time those sensors that were removed at previous stages. It has been found, for example, that a sensor that appears to be unimportant during the early pruning process can become very important later on. Such a sensor may add a small amount of information due to the presence of various other sensors. Whereas the various other sensors, however, may yield less information than still other sensors and, therefore may have been removed during the pruning process. Reintroducing the sensor that was eliminated early in the cycle therefore can have a significant effect and can change the final choice of sensors to make up the system.

The above method of reducing the number of sensors that make up the system is but one of a variety approaches which have applicability in different situations. In some cases, a Monte Carlo or other statistical approach is warranted, whereas in other cases a design of experiments approach has proven to be the most successful. In many cases, an operator conducting this activity becomes skilled and after a while knows intuitively what set of sensors is most likely to yield the best results. During the process it is not uncommon to ran multiple cases on different computers simultaneously. Also, during this process, a database of the cost of accuracy is generated. The automobile manufacturer, for example, may desire to have the total of 6 transducers in the final system, however, when shown the fact that the addition of one or two additional sensors substantially increases the accuracy of the system, the manufacturer may change his mind. Similarly, the initial number of sensors selected may be 6 but the analysis could show that 4 sensors give substantially the same accuracy as 6 and therefore the other 2 can be eliminated at a cost saving.

While the pruning process is occurring, the vehicle is subjected to a variety of road tests and would be subjected to presentations to the customer. The road tests are tests that are ran at different locations than where the fundamental training took place. It has been found that unexpected environmental factors can influence the performance of the system and therefore these tests can provide critical information. The system, therefore, which is installed in the test vehicle should have the capability of recording system failures. This recording includes the output of all of the sensors on the vehicle as well as a photograph of the vehicle setup that caused the error. This data is later analyzed to determine whether the training, independent or validation setups need to be modified and/or whether the sensors or positions of the sensors require modification.

Once the final set of sensors has been chosen, the vehicle is again subjected to real world testing on highways and at customer demonstrations. Once again, any failures are recorded. In this case, however, since the total number of sensors in the system is probably substantially less than the initial set of sensors, certain failures are to be expected. All such failures, if expected, are reviewed carefully with the customer to be sure that the customer recognizes the system failure modes and is prepared to accept the system with those failure modes.

The system described so far has been based on the use of a single neural network. It is frequently necessary and desirable to use combination neural networks, multiple neural networks or other pattern recognition systems. For example, for determining the occupancy state of a vehicle seat there may be at least two different requirements. The first requirement is to establish what is occupying the seat and the second requirement is to establish where that object is located. Another requirement might be to simply determine whether an occupying item warranting analysis by the neural networks is present. Generally, a great deal of time, typically many seconds, is available for determining whether a forward facing human or an occupied or unoccupied rear facing child seat, for example, occupies the vehicle seat. On the other hand, if the driver of the car is trying to avoid an accident and is engaged in panic braking, the position of an unbelted occupant can be changing rapidly as he or she is moving toward the airbag. Thus, the problem of determining the location of an occupant is time critical. Typically, the position of the occupant in such situations must be determined in less than 20 milliseconds. There is no reason for the system to have to determine that a forward facing human being is in the seat while simultaneously determining where that forward facing human being is. The system already knows that the forward facing human being is present and therefore all of the resources can be used to determine the occupant's position. Thus, in this situation a dual level or modular neural network can be advantageously used. The first level determines the occupancy of the vehicle seat and the second level determines the position of that occupant. In some situations, it has been demonstrated that multiple neural networks used in parallel can provide some benefit. This will be discussed in more detail below. Both modular and multiple parallel neural networks are examples of combination neural networks.

The data that is fed to the pattern recognition system typically will usually not be the raw vectors of data as captured and digitized from the various transducers. Typically, a substantial amount of preprocessing of the data is undertaken to extract the important information from the data that is fed to the neural network. This is especially true in optical systems and where the quantity of data obtained, if all were used by the neural network, would require very expensive processors. The techniques of preprocessing data will not be described in detail here. However, the preprocessing techniques influence the neural network structure in many ways. For example, the preprocessing used to determine what is occupying a vehicle seat is typically quite different from the preprocessing used to determine the location of that occupant. Some particular preprocessing concepts will be discussed in more detail below.

Once the pattern recognition system has been applied to the preprocessed data, one or more decisions are available as output. The output from the pattern recognition system is usually based on a snapshot of the output of the various transducers. Thus, it represents one epoch or time period. The accuracy of such a decision can usually be substantially improved if previous decisions from the pattern recognition system are also considered. In the simplest form, which is typically used for the occupancy identification stage, the results of many decisions are averaged together and the resulting averaged decision is chosen as the correct decision. Once again, however, the situation is quite different for dynamic out-of-position. The position of the occupant must be known at that particular epoch and cannot be averaged with his previous position. On the other hand, there is information in the previous positions that can be used to improve the accuracy of the current decision. For example, if the new decision says that the occupant has moved six inches since the previous decision, and, from physics, it is known that this could not possibly take place, than a better estimate of the current occupant position can be made by extrapolating from earlier positions. Alternately, an occupancy position versus time curve can be fitted using a variety of techniques such as the least squares regression method, to the data from previous 10 epochs, for example. This same type of analysis could also be applied to the vector itself rather than to the final decision thereby correcting the data prior to its being entered into the pattern recognition system. An alternate method is to train a module of a modular neural network to predict the position of the occupant based on feedback from previous results of the module.

A pattern recognition system, such as a neural network, can sometimes make totally irrational decisions. This typically happens when the pattern recognition system is presented with a data set or vector that is unlike any vector that has been in its training set. The variety of seating states of a vehicle is unlimited. Every attempt is made to select from that unlimited universe a set of representative cases. Nevertheless, there will always be cases that are significantly different from any that have been previously presented to the neural network. The final step, therefore, to adapting a system to a vehicle, is to add a measure of human intelligence. Sometimes this goes under the heading of fuzzy logic and the resulting system has been termed in some cases a neural fuzzy system. In some cases, this takes the form of an observer studying failures of the system and coming up with rules and that say, for example, that if sensor A perhaps in combination with another sensor produces values in this range than the system should be programmed to override the pattern recognition decision and substitute therefor a human decision.

An example of this appears in R. Scorcioni, K. Ng, M. M. Trivedi, N. Lassiter; "MoNiF: A Modular Neuro-Fuzzy Controller for Race Car Navigation"; In Proceedings of the 1997 *IEEE Symposium on Computational Intelligence and Robotics Applications*, Monterey, Calif., USA July 1997 and describes the case of where an automobile was designed for autonomous operation and trained with a neural network, in one case, and a neural fuzzy system in another case. As long as both vehicles operated on familiar roads both vehicles performed satisfactorily. However, when placed on an unfamiliar road, the neural network vehicle failed while the neural fuzzy vehicle continue to operate successfully. Naturally, if the neural network vehicle had been trained on the unfamiliar road, it might very well have operated successful. Nevertheless, the critical failure mode of neural networks that most concerns people is this uncertainty as to what a neural network will do when confronted with an unknown state.

One aspect, therefore, of adding human intelligence to the system, is to ferret out those situations where the system is likely to fail. Unfortunately, in the current state-of-the-art, this is largely a trial and error activity. One example is that if the range of certain parts of vector falls outside of the range experienced during training, the system defaults to a particular state. In the case of suppressing deployment of one or more airbags, or other occupant protection apparatus, this case would be to enable airbag deployment even if the pattern recognition system calls for its being disabled. An alternate method is to train a particular module of a modular neural network to recognize good from bad data and reject the bad data before it is fed to the main neural networks.

The foregoing description is applicable to the systems described in the following drawings and the connection between the foregoing description and the systems described below will be explained below. However, it should be appreciated that the systems shown in the drawings do not limit the applicability of the methods or apparatus described above.

Referring to the accompanying drawings wherein like reference numbers designate the same or similar elements, FIG. 1 shows a passenger seat 1 to which an adjustment apparatus including a seated-state detecting system developed according to the present invention may be applied. The seat 1 includes a horizontally situated bottom seat portion 2 and a vertically oriented back portion 3. The seat portion 2 is provided with weight measuring means, such as one or more weight sensors 6 and 7, that determine the weight of the object occupying the seat, if any. The coupled portion between the seated portion 2 and the back portion 3 (also referred to as the seatback) is provided with a reclining angle detecting sensor 9, which detects the tilted angle of the back portion 3 relative to the seat portion 2. The seat portion 2 is provided with a seat track position-detecting sensor 10. The seat track position detecting sensor 10 fulfills a role of detecting the quantity of movement of the seat 1 which is moved from a back reference position, indicated by the dotted chain line. Embedded within the seatback 3 is a heartbeat sensor 31 and a motion sensor 33. Attached to the headliner of the vehicle is a capacitance sensor 32. The seat 1 may be the driver seat, the front passenger seat or any other seat in a motor vehicle as well as other seats in transportation vehicles or seats in non-transportation applications.

Motion sensor 33 can be a discrete sensor that detects relative motion in the passenger compartment of the vehicle. Such sensors are frequently based on ultrasonics and can measure a change in the ultrasonic pattern that occurs over a short time period. Alternately, the subtracting of one position vector from a previous position vector to achieve a differential position vector can detect motion. For the purposes herein, a motion sensor will be used to mean either a particular device that is designed to detect motion for the creation of a special vector based on vector differences.

The weight measuring means, such as the sensors 6 and 7, are associated with the seat, and can be mounted into or below the seat portion 2 or on the seat structure, for example, for measuring the weight applied onto the seat. The weight may be zero if no occupying item is present. Sensors 6 and 7 may represent a plurality of different sensors which measure the weight applied onto the seat at different portions thereof or for redundancy purposes, for example, such as by means of an airbag or bladder 5 in the seat portion 2. The bladder 5 may have one or more compartments. Such sensors may be in the form of strain, force or pressure sensors which measure the force or pressure on the seat portion 2 or seat back 3, displacement measuring sensors which measure the displacement of the seat surface or the entire seat 1 such as through the use of strain gages mounted on the seat structural members, such as 7, or other appropriate locations, or systems which convert displacement into a pressure wherein a pressure sensor can be used as a measure of weight. Sensors 6 and 7 may be of the types disclosed in U.S. patent application Ser. No. 09/193,209, incorporated by reference herein.

An ultrasonic or optical sensor system 12 is mounted on the upper portion of the front pillar, i.e., the A-Pillar, of the vehicle and a similar sensor system 11 is mounted on the upper portion of the intermediate pillar, i.e., the B-Pillar. Each sensor system 11, 12 may comprise a transducer. The outputs of the sensor systems 11 and 12 are input to a band pass filter 20 through a multiplex circuit 19 which is switched in synchronization with a timing signal from the ultrasonic sensor drive circuit 18, and then is amplified by an amplifier 21. The band pass filter 20 removes a low frequency wave component from the output signal and also removes some of the noise. The envelope wave signal is input to an analog/digital converter (ADC) 22 and digitized as measured data. The measured data is input to a processing circuit 23, which is controlled by the timing signal which is in turn output from the sensor drive circuit 18

Each of the measured data is input to a normalization circuit 24 and normalized. The normalized measured data is input to the combination neural network (circuit) 25 as wave data.

The output of the weight sensor(s) 6 and 7 is amplified by an amplifier 26 coupled to the weight sensor(s) 6 and 7 and the amplified output is input to an analog/digital converter and then directed to the combination neural network 25 of the processor means. Amplifier 26 is useful in some embodiments but it may be dispensed with by constructing the sensors 6 and 7 to provide a sufficient strong output signal, and even possibly a digital signal. One manner to do this would be to construct the sensor systems with appropriate electronics.

The reclining angle detecting sensor 9 and the seat track position-detecting sensor 10 are connected to appropriate electronic circuits. For example, a constant-current can be supplied from a constant-current circuit to the reclining angle detecting sensor 9, and the reclining angle detecting sensor 9 converts a change in the resistance value on the tilt of the back portion 3 to a specific voltage. This output voltage is input to an analog/digital converter 28 as angle data, i.e., representative of the angle between the back portion 3 and the seat portion 2. Similarly, a constant current can be supplied from a constant-current circuit to the seat track position detecting sensor 10 and the seat track position detecting sensor 10 converts a change in the resistance value based on the track position of the seat portion 2 to a specific voltage. This output voltage is input to an analog/digital converter 29 as seat track data. Thus, the outputs of the reclining angle-detecting sensor 9 and the seat track position-detecting sensor 10 are input to the analog/digital converters (ADC) 28 and 29, respectively. Each digital data value from the ADCs 28,29 is input to the combination neural network 25. A more detailed description of this and similar systems can be found in the above-referenced patents and patent applications assigned to the current assignee, all of which are included herein by reference. The system described above is one example of many systems that can be designed using the teachings of this invention for detecting the occupancy state of the seat of a vehicle.

The combination neural network 25 is directly connected to the ADCs 28 and 29, the ADC associated with amplifier 26 and the normalization circuit 24. As such, information from each of the sensors in the system (a stream of data) is passed directly to the combination neural network 25 for processing thereby. The streams of data from the sensors are not combined prior to the combination neural network 25 and the combination neural network is designed to accept the separate streams of data (e.g., at least a part of the data at each input node) and process them to provide an output indicative of the current occupancy state of the seat. The combination neural network 25 thus includes or incorporates a plurality of algorithms derived by training in the manners discussed above and below. Once the current occupancy state of the seat is determined, it is possible to control vehicular components or systems, such as the airbag system, in consideration of the current occupancy state of the seat.

Figure 2:
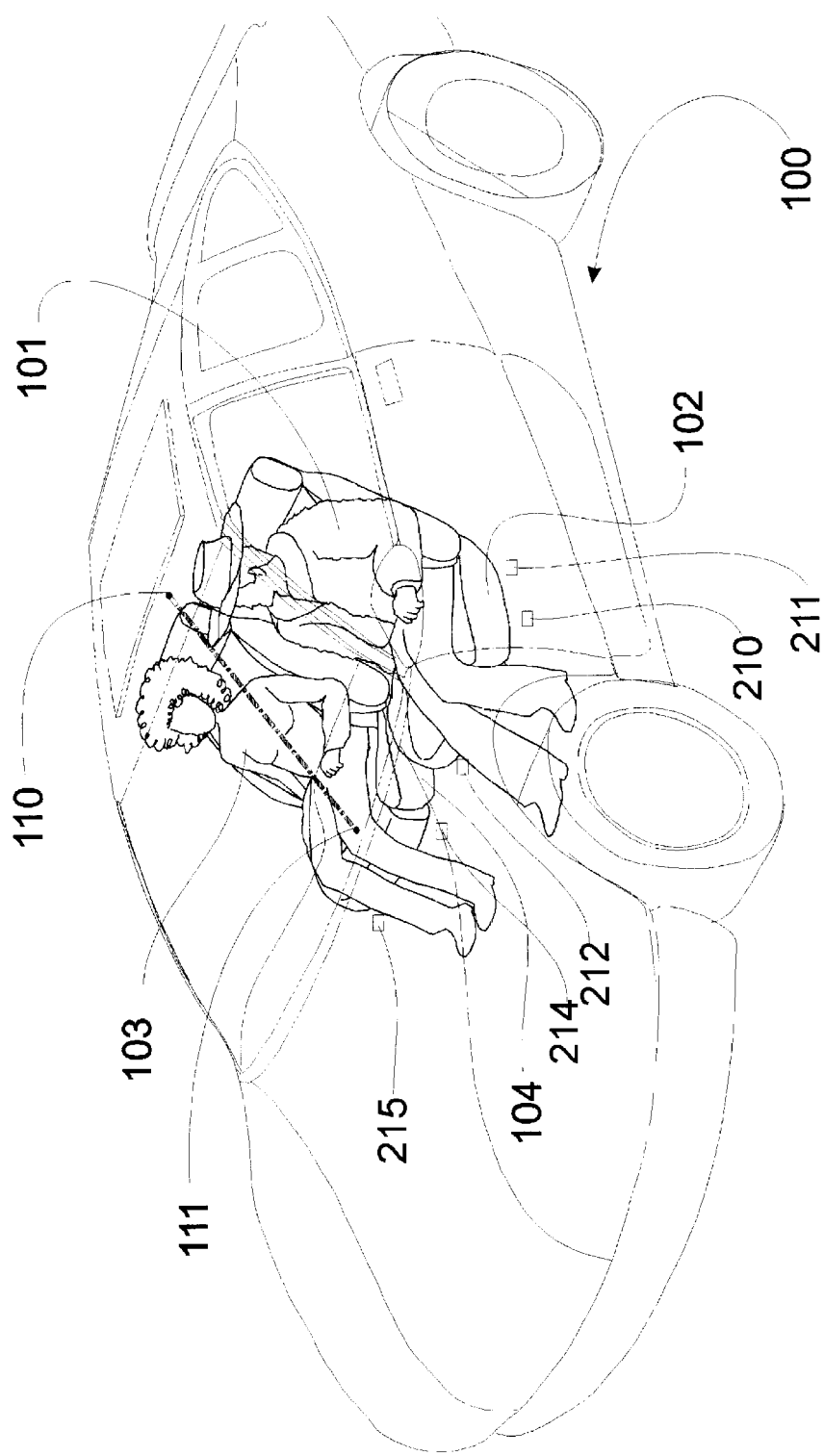
FIG. 2 is a perspective view of a vehicle containing two adult occupants on the front seat with the vehicle shown in phantom illustrating one preferred location of the ultrasonic transducers placed according to the methods taught in this invention.

A section of the passenger compartment of an automobile is shown generally as 100 in FIG. 2. A driver 101 of a vehicle sits on a seat 102 behind a steering wheel, not shown, and an adult passenger 103 sits on seat 104 on the passenger side. Two transmitter and receiver assemblies 110 and 111, also referred to herein as transducers, are positioned in the passenger compartment 100, one transducer 110 is arranged on the headliner adjacent or in proximity to the dome light and the other transducer 111 is arranged on the center of the top of the dashboard or instrument panel of the vehicle. The methodology leading to the placement of these transducers is central to the instant invention as explained in detail below. In this situation, the system developed in accordance with this invention will reliably detect that an occupant is sitting on seat 104 and deployment of the airbag is enabled in the event that the vehicle experiences a crash. Transducers 110, 111 are placed with their separation axis parallel to the separation axis of the head, shoulder and rear facing child seat volumes of occupants of an automotive passenger seat and in view of this specific positioning, are capable of distinguishing the different configurations. In addition to the ultrasonic transducers 110, 111, weight-measuring sensors 210, 211, 212, 214 and 215 are also present. These weight sensors may be of a variety of technologies including, as illustrated here, strain-measuring transducers attached to the vehicle seat support structure as described in more detail in U.S. patent application Ser. No. 08/920,822, incorporated herein by reference. Naturally other weight systems can be utilized including systems that measure the deflection of, or pressure on, the seat cushion. The weight sensors described here are meant to be illustrative of the general class of weight sensors and not an exhaustive list of methods of measuring occupant weight.

Figure 3:
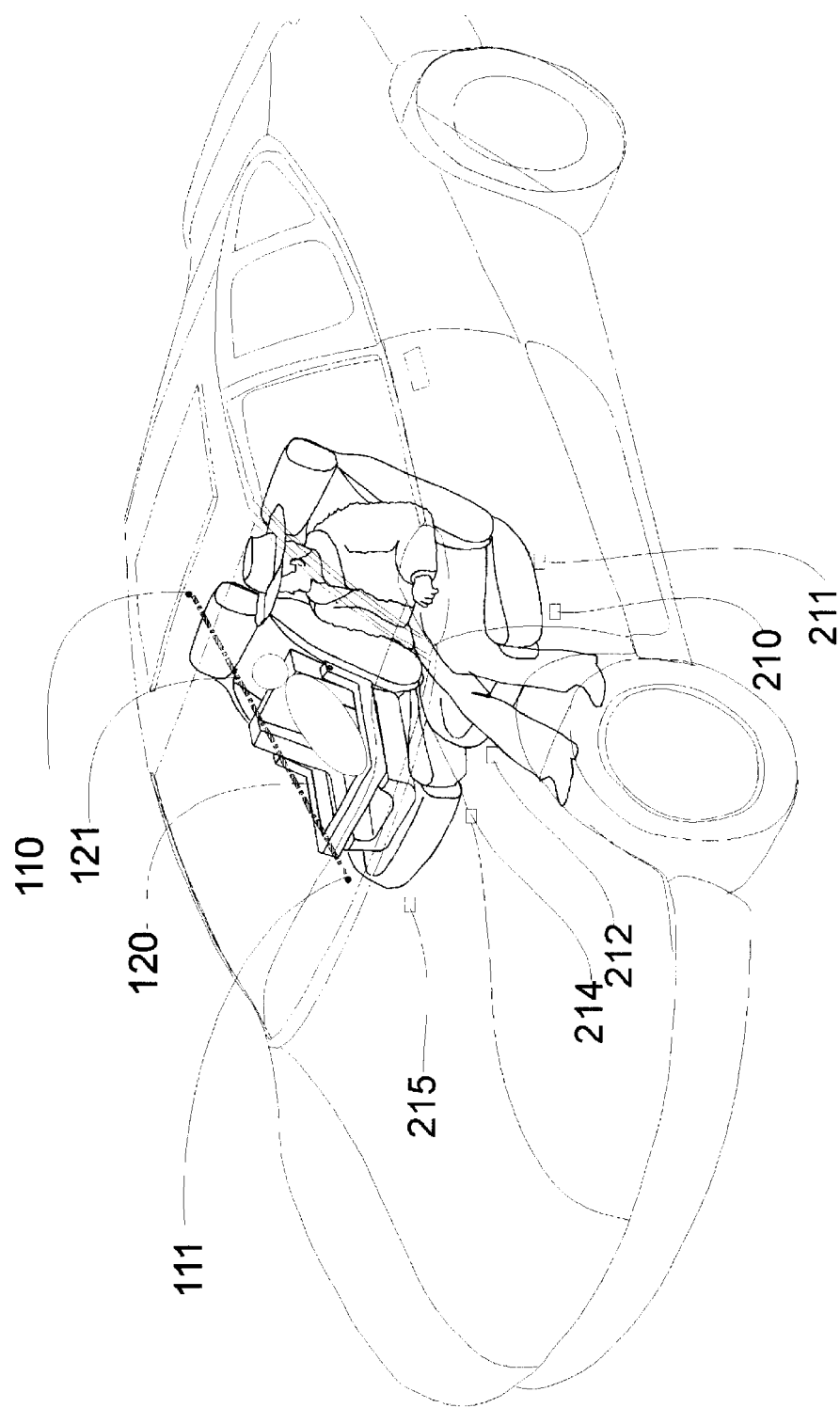
FIG. 3 is a view as in FIG. 2 with the passenger occupant replaced by a child in a forward facing child seat.
Figure 4:
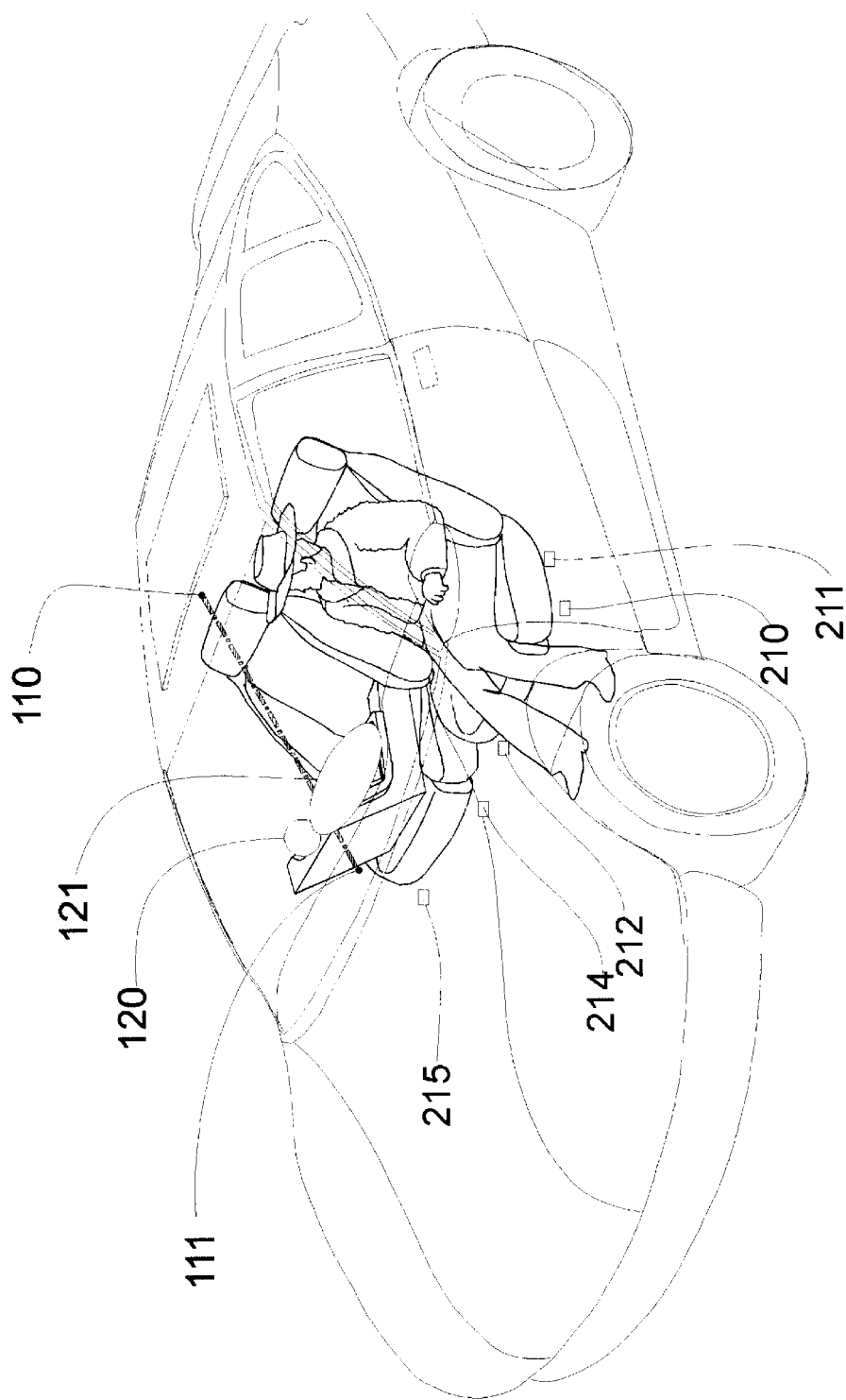
FIG. 4 is a view as in FIG. 2 with the passenger occupant replaced by a child in a rearward facing child seat.
Figure 5:
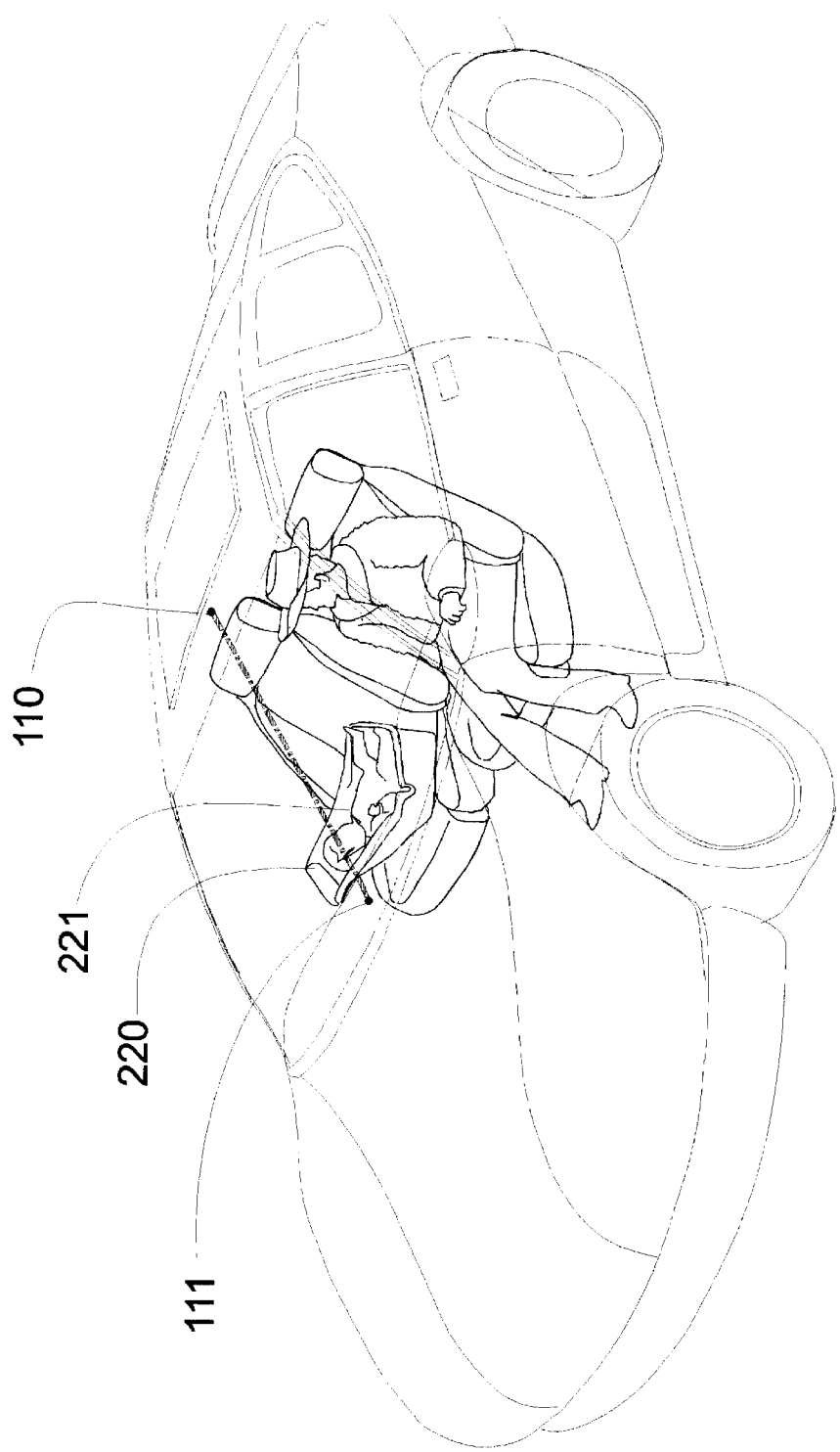
FIG. 5 is a view as in FIG. 2 with the passenger occupant replaced by an infant in an infant seat.

In FIG. 3, a forward facing child seat 120 containing a child 121 replaces the adult passenger 103 as shown in FIG. 2. In this case, it is usually required that the airbag not be disabled in the event of an accident. However, in the event that the same child seat is placed in the rearward facing position as shown in FIG. 4, then the airbag is usually required to be disabled since deployment of the airbag in a crash can seriously injure or even kill the child. Furthermore, as illustrated in FIG. 5, if an infant 131 in an infant carrier 130 is positioned in the rear facing position of the passenger seat, the airbag should be disabled for the reasons discussed above. Instead of disabling deployment of the airbag, the deployment could be controlled to provide protection for the child, e.g., to reduce the force of the deployment of the airbag. It should be noted that the disabling or enabling of the passenger airbag relative to the item on the passenger seat may be tailored to the specific application. For example, in some embodiments, with certain forward facing child seats, it may in fact be desirable to disable the airbag and in other cases to deploy a depowered airbag. The selection of when to disable, depower or enable the airbag, as a function of the item in the passenger seat and its location, is made during the programming or training stage of the sensor system and, in most cases, the criteria set forth above will be applicable, i.e., enabling airbag deployment for a forward facing child seat and an adult in a proper seating position and disabling airbag deployment for a rearward facing child seat and infant and for any occupant who is out-of-position and in close proximity to the airbag module. The sensor system developed in accordance with the invention may however be programmed according to other criteria.

Several systems using other technologies have been devised to discriminate between the four cases illustrated above but none have shown a satisfactory accuracy or reliability of discrimination. Some of these systems appear to work as long as the child seat is properly placed on the seat and belted in. So called "tag systems", for example, whereby a device is placed on the child seat which is electromagnetically sensed by sensors placed within the seat have not proven reliable by themselves but can add information to the overall system. When used alone, they function well as long as the child seat is restrained by a seatbelt, but when this is not the case they have a high failure rate. Since the seatbelt usage of the population of the United States is only about 60% at the present time, it is quite likely that a significant percentage of child seats will not be properly belted onto the seat and thus children will be subjected to injury and death in the event of an accident.

Figure 6:
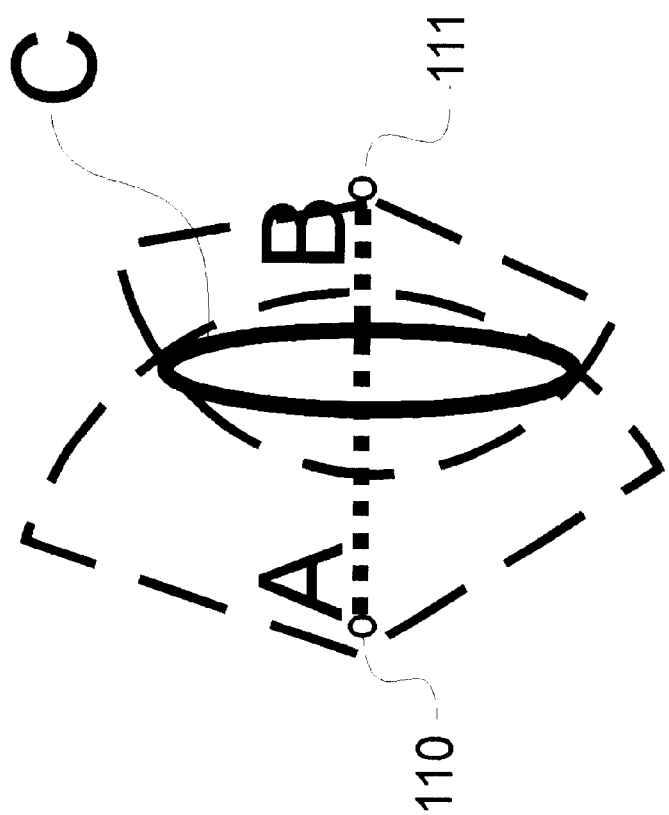
FIG. 6 is a diagram illustrating the interaction of two ultrasonic sensors and how this interaction is used to locate a circle is space.

The methodology of this invention was devised to solve this problem. To understand this methodology, consider two ultrasonic transmitters and receivers 110 and 111 (transducers) which are connected by an axis AB in FIG. 6. Each transmitter radiates a signal which is primarily confined to a cone angle, called the field angle, with its origin at the transmitter. For simplicity, assume that the transmitter and receiver are embodied in the same device although in some cases a separate device will be used for each function. When a transducer sends out a burst of waves, to thereby irradiate the passenger compartment with ultrasonic radiation, and then receives a reflection or modified radiation from some object in the passenger compartment, the distance of the object from the transducer can be determined by the time delay between the transmission of the waves and the reception of the reflected or modified waves.

When looking at a single transducer, it is not possible to determine the direction to the object which is reflecting or modifying the signal but it is possible to know only how far that object is from the transducer, that is a single transducer enables a distance measurement but not a directional measurement. In other words, the object may be at a point on the surface of a three-dimensional spherical segment having its origin at the transducer and a radius equal to the distance. Consider two transducers, such as 110 and 111 in FIG. 6, and both transducers receive a reflection from the same object, which is facilitated by proper placement of the transducers, the timing of the reflections depends on the distance from the object to each respective transducer. If it is assumed for the purposes of this analysis that the two transducers act independently, that is, they only listen to the reflections of waves which they themselves transmitted (which may be achieved by transmitting ultrasonic waves at different frequencies), then each transducer enables the determination of the distance to the reflecting object but not its direction. If we assume that the transducer radiates ultrasound in all directions within the field cone angle, each transducer enables the determination that the object is located on a spherical surface A', B' a respective known distance from the transducer, that is, each transducer enables the determination that the object is a specific distance from that transducer which may or may not be the same distance between the other transducer and the same object. Since now there are two transducers, and the distance of the reflecting object has been determined relative to each of the transducers, the actual location of the object resides on a circle which is the intersection of the two spherical surfaces A', and B'. This circle is labeled C in FIG. 6. At each point along circle C, the distance to the transducer 110 is the same and the distance to the transducer 111 is the same. This, of course, is strictly true only for ideal one-dimensional objects.

For many cases, the mere knowledge that the object lies on a particular circle is sufficient since it is possible to locate the circle such that the only time that an object lies on a particular circle that its location is known. That is, the circle which passes through the area of interest otherwise passes through a volume where no objects can occur. Thus, the mere calculation of the circle in this specific location, which indicates the presence of the object along that circle, provides valuable information concerning the object in the passenger compartment which may be used to control or affect another system in the vehicle such as the airbag system. This of course is based on the assumption that the reflections to the two transducers are in fact from the same object. Care must be taken in locating the transducers such that other objects do not cause reflections that could confuse the system.

Figure 7:
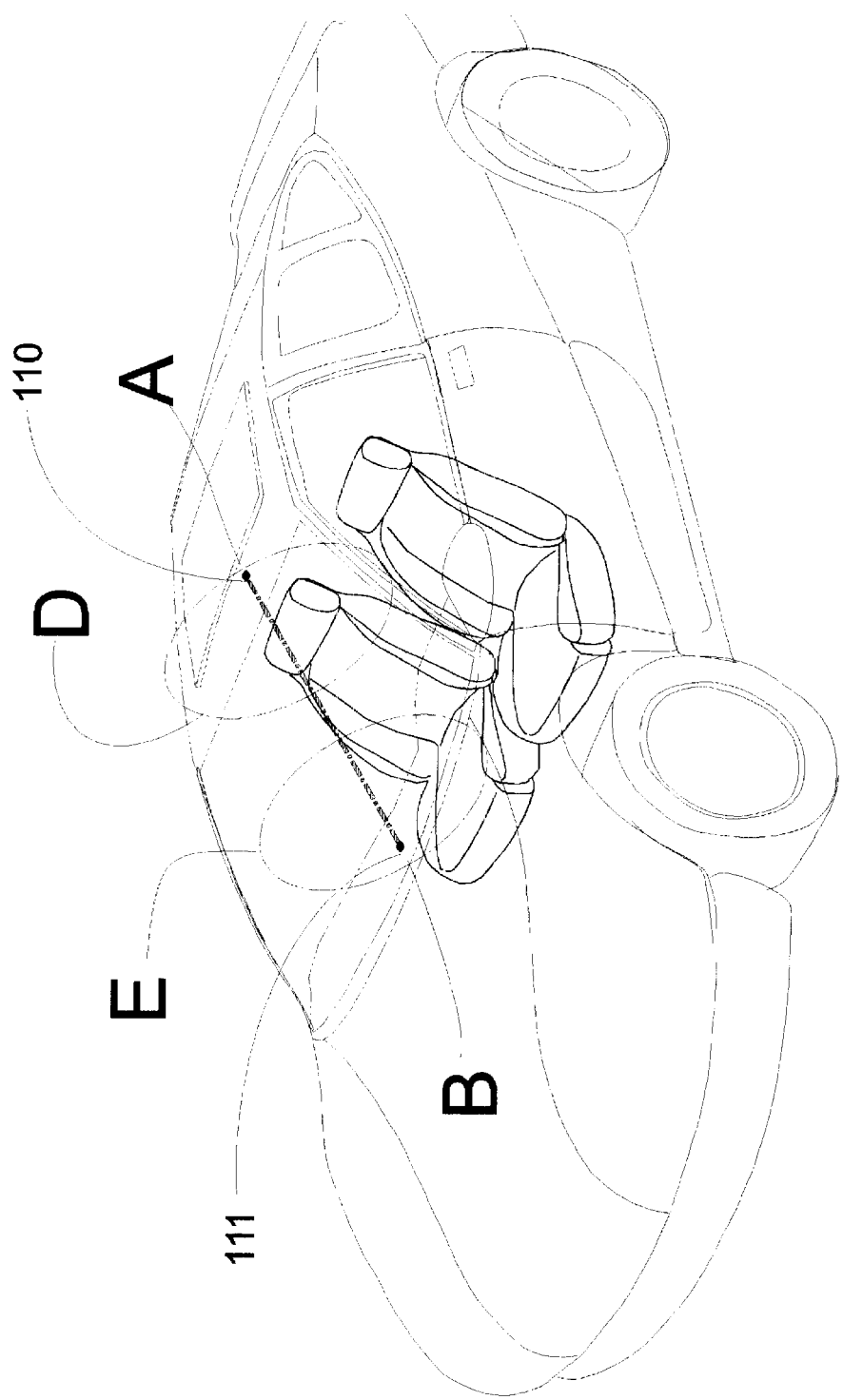
FIG. 7 is a view as in FIG. 2 with the occupants removed illustrating the location of two circles in space and how they intersect the volumes characteristic of a rear facing child seat and a larger occupant.

FIG. 7, for example, illustrates two circles D and E of interest which represent the volume which is usually occupied when the seat is occupied by a person not in a child seat, C, or by a forward facing child seat and the volume normally occupied by a rear facing child seat, respectively. Thus, if the circle generated by the system, (i.e., by appropriate processor means which receives the distance determination from each transducer and creates the circle from the intersection of the spherical surfaces which represent the distance from the transducers to the object) is at a location which is only occupied by an adult passenger, the airbag would not be disabled since its deployment in a crash is desired. On the other hand, if a circle is at a location occupied only by a rear facing child seat, the airbag would be disabled.

The above discussion of course is simplistic in that it is not take into account the volume occupied by the object or the fact the reflections from more than one object surface will be involved. In reality, transducer B is likely to pickup the rear of the occupant's head and transducer A, the front. This makes the situation more difficult for an engineer looking at the data to analyze. It has been found that pattern recognition technologies are able to extract the information from these situations and through a proper application of these technologies, an algorithm can be developed, which when installed as part of the system for a particular vehicle, the system accurately and reliably differentiates between a forward facing and rear facing child seat, for example, or an in-position or out-of-position forward facing human being.

From the above discussion, a method of transducer location is disclosed which provides unique information to differentiate between (i) a forward facing child seat or a forward properly positioned occupant where airbag deployment is desired and (ii) a rearward facing child seat and an out-of-position occupant where airbag deployment is not desired. In actuality, the algorithm used to implement this theory does not directly calculate the surface of spheres or the circles of interaction of spheres. Instead, a pattern recognition system is used to differentiate airbag-deployment desired cases from those where the airbag should not be deployed. For the pattern recognition system to accurately perform its function, however, the patterns presented to the system must have the requisite information. That is, a pattern of reflected waves from an occupying item in a passenger compartment to various transducers must be uniquely different for cases where airbag deployment is desired from cases where deployment is not desired. The theory described above and in more detail below teaches how to locate transducers within the vehicle passenger compartment so that the patterns of reflected waves will be easily distinguishable for cases where airbag deployment is desired from those where deployment is not desired. In the case presented thus far, it has been shown that in some implementations the use of only two transducers can result in the desired pattern differentiation when the vehicle geometry is such that two transducers can be placed such that the circles D (airbag enabled) and E (airbag disabled) fall outside of the transducer field cones except where they are in the critical regions where positive identification of the condition occurs. Thus, the aiming and field angles of the transducers are important factors to determine in adapting a system to a particular vehicle.

Figure 8:
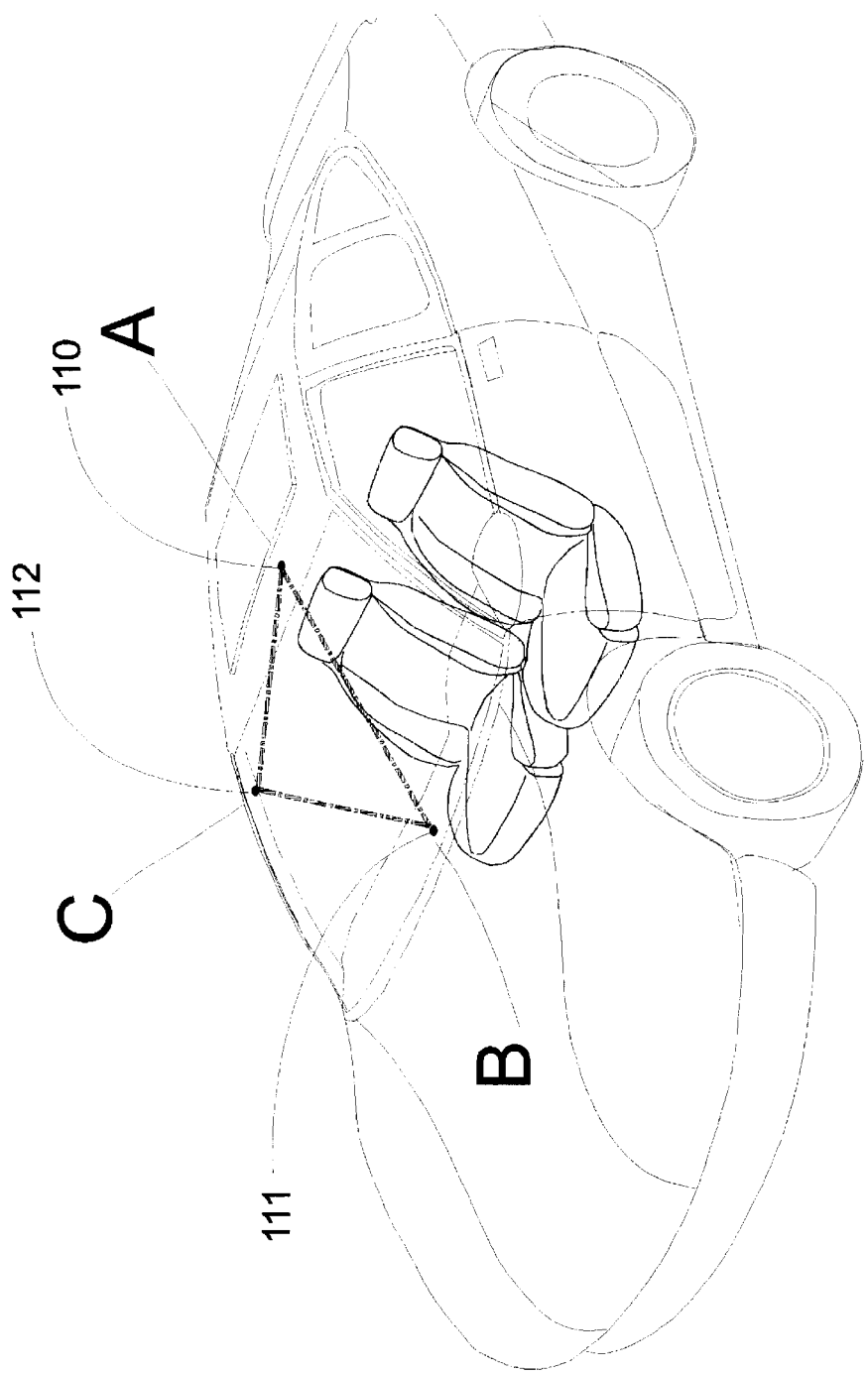
FIG. 8 illustrates a preferred mounting location of a three-transducer system.
Figure 9:
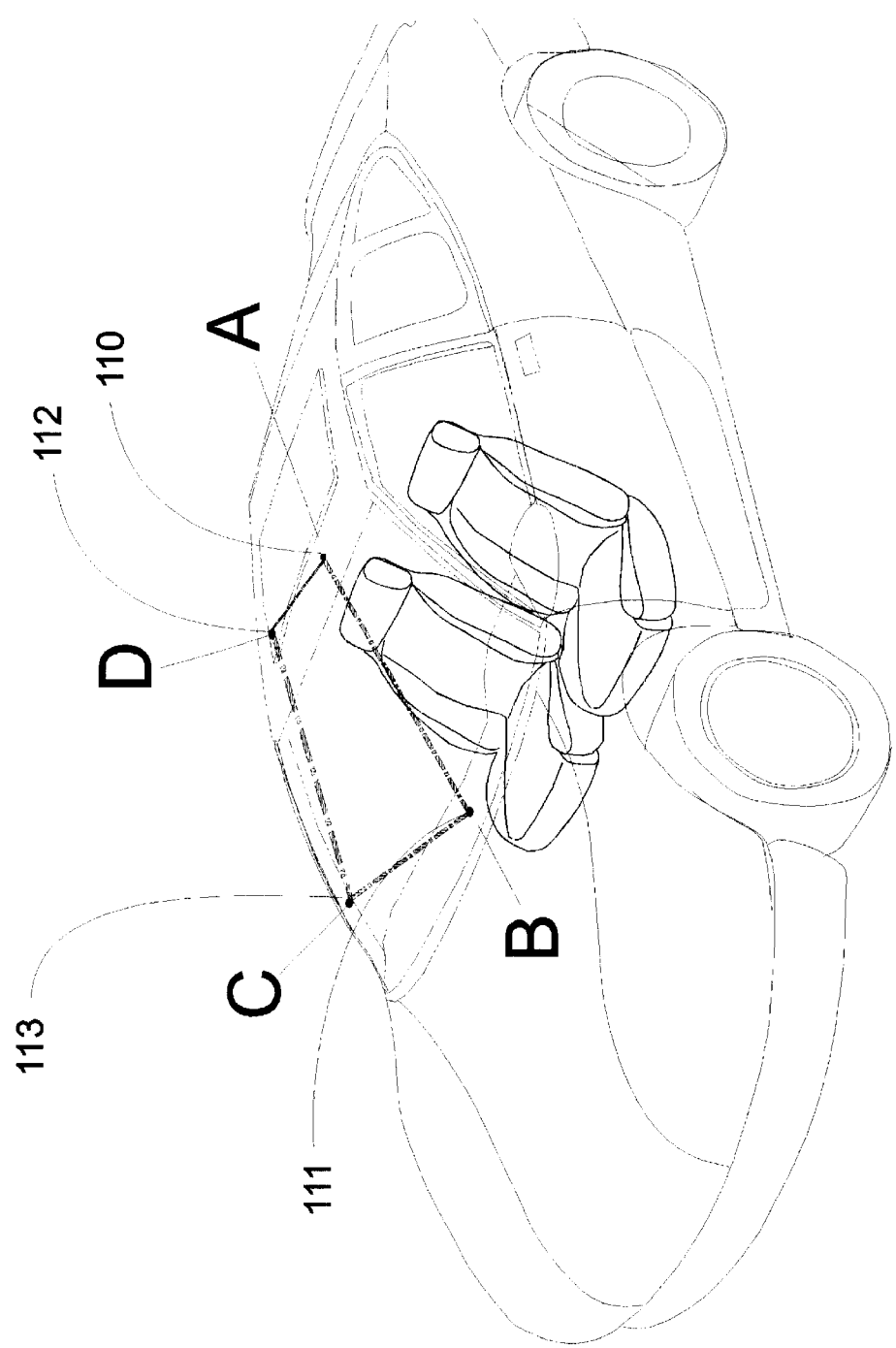
FIG. 9 illustrates a preferred mounting location of a four-transducer system.

The use of only two transducers in a system is typically not acceptable since one or both of the transducers can be rendered inoperable by being blocked, for example, by a newspaper. Thus, it is desirable to add a third transducer 112 as shown in FIG. 8 which now provides a third set of spherical surfaces relative to the third transducer. Transducer 112 is positioned on the passenger side of the A-pillar (which is a preferred placement if the system is designed to operate on the passenger side of the vehicle). Three spherical surfaces now intersect in only two points and in fact, usually at one point if the aiming angles and field angles are properly chosen. Once again, this discussion is only strictly true for a point object. For a real object, the reflections will come from different surfaces of the object, which usually are at similar distances from the object. Thus, the addition of a third transducer substantially improves system reliability. Finally, with the addition of a fourth transducer 113 as shown in FIG. 9, even greater accuracy and reliability is attained. Transducer 113 is positioned on the ceiling of the vehicle close to the passenger side door. In FIG. 9, lines connecting the transducers C and D and the transducers A and B are substantially parallel permitting an accurate determination of asymmetry and thereby object rotation. Thus, for example, if the infant seat is placed on an angle as shown in FIG. 5, this condition can be determined and taken into account when the decision is made to disable the deployment of the airbag.

The discussion above has centered on locating transducers and designing a system for determining whether the two target volumes, that adjacent the airbag and that adjacent the upper portion of the vehicle seat, are occupied. Other systems have been described in the above referenced patents using a sensor mounted on or adjacent the airbag module and a sensor mounted high in the vehicle to monitor the space near the vehicle seat. Such systems use the sensors as independent devices and do not use the combination of the two sensors to determine where the object is located. In fact, the location of such sensors is usually poorly chosen so that it is easy to blind either or both with a newspaper, for example. Furthermore, no system is known to have been disclosed, except in patents and patent applications assigned to the assignee of this invention, which uses more than two transducers in such a manner that one or more can be blocked without causing serious deterioration of the system. Again, the examples here have been for the purpose of suppressing the deployment of the airbag when it is necessary to prevent injury. The sensor system disclosed can be used for many other purposes such as disclosed in the above-mentioned patent applications assigned to the same assignee as the instant invention. The ability to use the sensors for these other applications in generally lacking in the systems disclosed in the other referenced patents.

Figure 10:
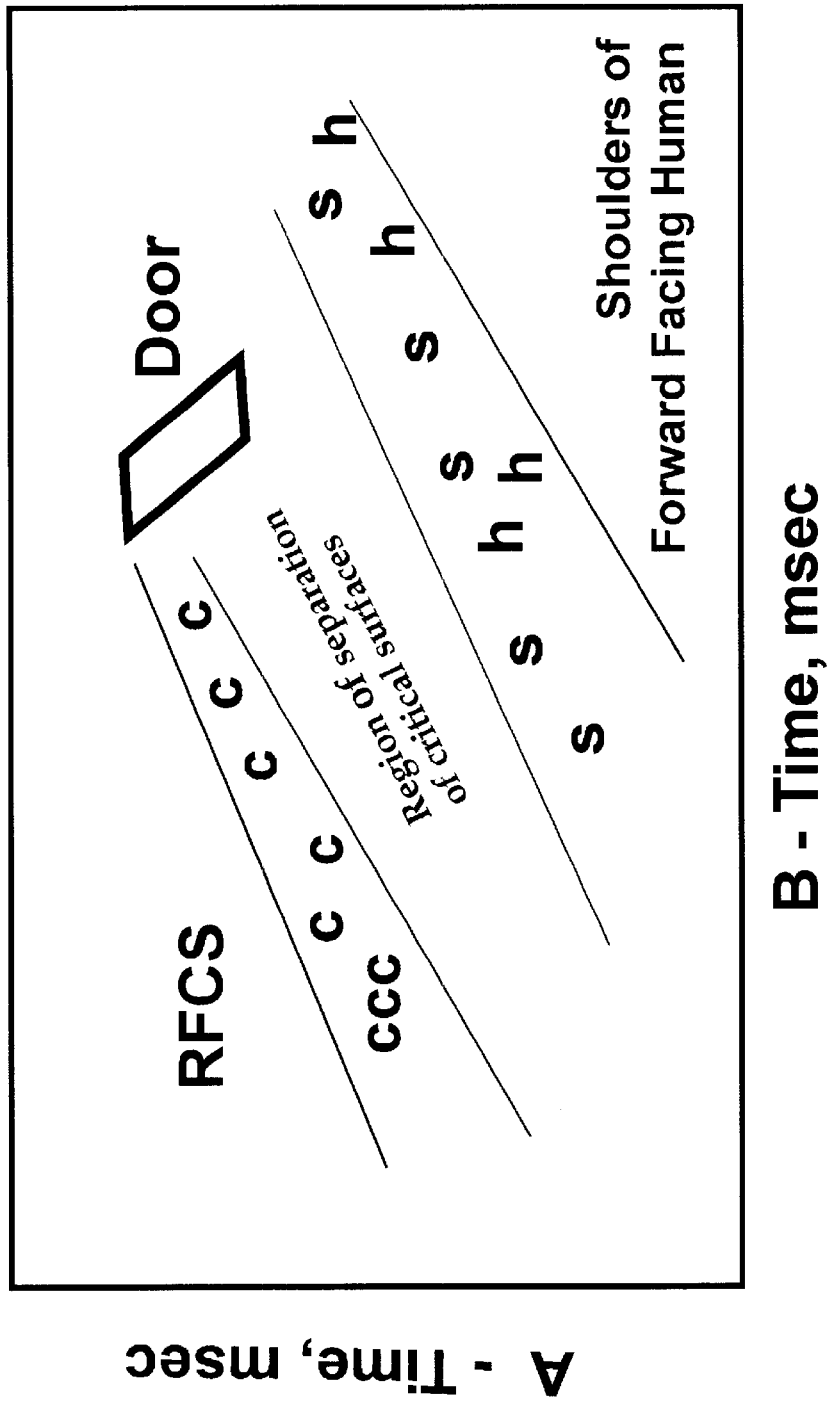
FIG. 10 is a plot showing the target volume discrimination for two transducers.

Considering once again the condition of FIGS. 2–7 where two transducers are used, a plot can be made showing the reflection times of the objects which are located in the region of curve E and curve F of FIG. 7. This plot is shown on FIG. 10 where the c's represent reflections from rear facing child seats from various tests where the seats were placed in a variety of different positions and similarly the s's and h's represent shoulders and heads respectively of various forward facing human occupants. In these results from actual experiments, the effect of body thickness is present and yet the results still show that the basic principles of separation of key volumes are valid. Note that there is a region of separation between corridors that house the different object classes. It is this fact which is used in conjunction with neural networks, as described in the above referenced patent applications, which permit the design of a system that provides an accurate discrimination of rear facing child seats from forward facing humans. Heretofore before the techniques for locating the transducers to separate these two zones were discovered, the entire discrimination task was accomplished using neural networks. There was significant overlap between the reflections from the various objects and therefore separation was done based on patterns of the reflected waves. By using the technology described herein to carefully position and orient the transducers so as to create this region of separation of the critical surfaces, wherein all of the rear facing child seat data falls within a known corridor, the task remaining for the neural networks is substantially simplified with the result that the accuracy of identification is substantially improved.

Three general classes of child seats exist as well as several models which are unique. First, there is the infant only seat as shown in FIG. 5 which is for occupants weighing up to about 20 pounds. This is designed to be only placed in the rear facing position. The second which is illustrated in FIGS. 2 and 3 is for children from about 20 to about 40 pounds and can be used in both the forward and rear facing position and the third is for use only in the forward facing position and is for children weighing over about 40 pounds. All of these seats as well as the unique models are used in test setups according to this invention for adapting a system to a vehicle. For each child seat, there are several hundred unique orientations representing virtually every possible position of that seat within the vehicle. Tests are run, for example, with the seat tilted 22 degrees, rotated 17 degrees, placed on the front of the seat with the seat back fully up with the seat fully back and with the window open as well as all variations of there parameters. A large number of cases are also run, when practicing the teachings of this invention, with various accessories, such as clothing, toys, bottles, blankets etc., added to the child seat.

Similarly, wide variations are used for the occupants including size, clothing and activities such as reading maps or newspapers, leaning forward to adjust the radio, for example. Also included are cases where the occupant puts his/her feet on the dashboard or otherwise assumes a wide variety of unusual positions. When all of the above configurations are considered along with many others not mentioned, the total number of configurations which are used to train the pattern recognition system can exceed 500,000. The goal is to include in the configuration training set representations of all occupancy states that occur in actual use. Since the system is highly accurate in making the correct decision for cases which are similar to those in the training set, the total system accuracy increases as the size of the training set increases providing the cases are all distinct and not copies of other cases.

In addition to all of the variations in occupancy states, it is important to consider environmental effects during the data collection. Thermal gradients or thermal instabilities are particularly important for systems based on ultrasound since sound waves can be significantly diffracted by density changes in air. There are two aspects of the use of thermal gradients or instability in training. First, the fact that thermal instabilities exist and therefore data with thermal instabilities present should be part of database. For this case, a rather small amount of data collected with thermal instabilities would be used. A much more important use of thermal instability comes from the fact that they add variability to data. Thus, considerably more data is taken with thermal instability and in fact, in some cases almost the entire database is taken with time varying thermal gradients in order to provide variability to the data so that the neural network does not memorize but instead generalizes from the data. This is accomplished by taking the data with a cold vehicle with the heater operating and with a hot vehicle with the air conditioner operating. Additional data is also taken with a heat lamp in a closed vehicle to simulate a stable thermal gradient caused by sun loading.

To collect data for 500,000 vehicle configurations is not a formidable task. A trained technician crew can typically collect data on in excess on 2000 configurations or vectors per hour. The data is collected typically every 50 to 100 milliseconds. During this time, the occupant is continuously moving, assuming a continuously varying position and posture in the vehicle including moving from side to side, forward and back, twisting his/her head, reading newspapers and books, moving hands, arms, feet and legs, until the desired number of different seated state examples are obtained. In some cases, this process is practiced by confining the motion of an occupant into a particular zone. In some cases, for example, the occupant is trained to exercise these different seated state motions while remaining in a particular zone that may be the safe zone, the keep out zone, or an intermediate gray zone. In this manner, data is collected representing the airbag disable, depowered airbag enabled or full power airbag enabled states. In other cases, the actual position of the back of the head and/or the shoulders of the occupant are tracked using string pots, high frequency ultrasonic transducers, or optically. In this manner, the position of the occupant can be measured and the decision as to whether this should be a disable or enable airbag case can be decided later. By continuously monitoring the occupant, an added advantage results in that the data can be collected to permit a comparison of the occupant from one seated state to another. This is particularly valuable in attempting to project the future location of an occupant based on a series of past locations as would be desirable for example to predict when an occupant would cross into the keep out zone during a panic braking situation prior to crash.

It is important to note that it is not necessary to train on every vehicle produced but rather to train on each platform. A platform is an automobile manufacturer's designation of a group of vehicle models that are built on the same vehicle structure.

A review of the literature on neural networks yields the conclusion that the use of such a large training set is unique in the neural network field. The rule of neural networks is that there must be at least three training cases for each network weight. Thus, for example, if a neural network has 156 input nodes, 10 first hidden layer nodes, 5 second hidden layer nodes, and one output node this results in a total of 1,622 weights. According to conventional theory 5000 training examples should be sufficient. It is highly unexpected, therefore, that greater accuracy would be achieved through 100 times that many cases. It is thus not obvious and cannot be deduced from the neural network literature that the accuracy of the system will improve substantially as the size of the training database increases even to tens of thousands of cases. It is also not obvious looking at the plots of the vectors obtained using ultrasonic transducers that increasing the number of tests or the database size will have such a significant effect on the system accuracy. Each of the vectors is a rather course plot with a few significant peaks and valleys. Since the spatial resolution of the system is typically about 3 to 4 inches, it is once again surprising that such a large database is required to achieve significant accuracy improvements.

Figure 12:
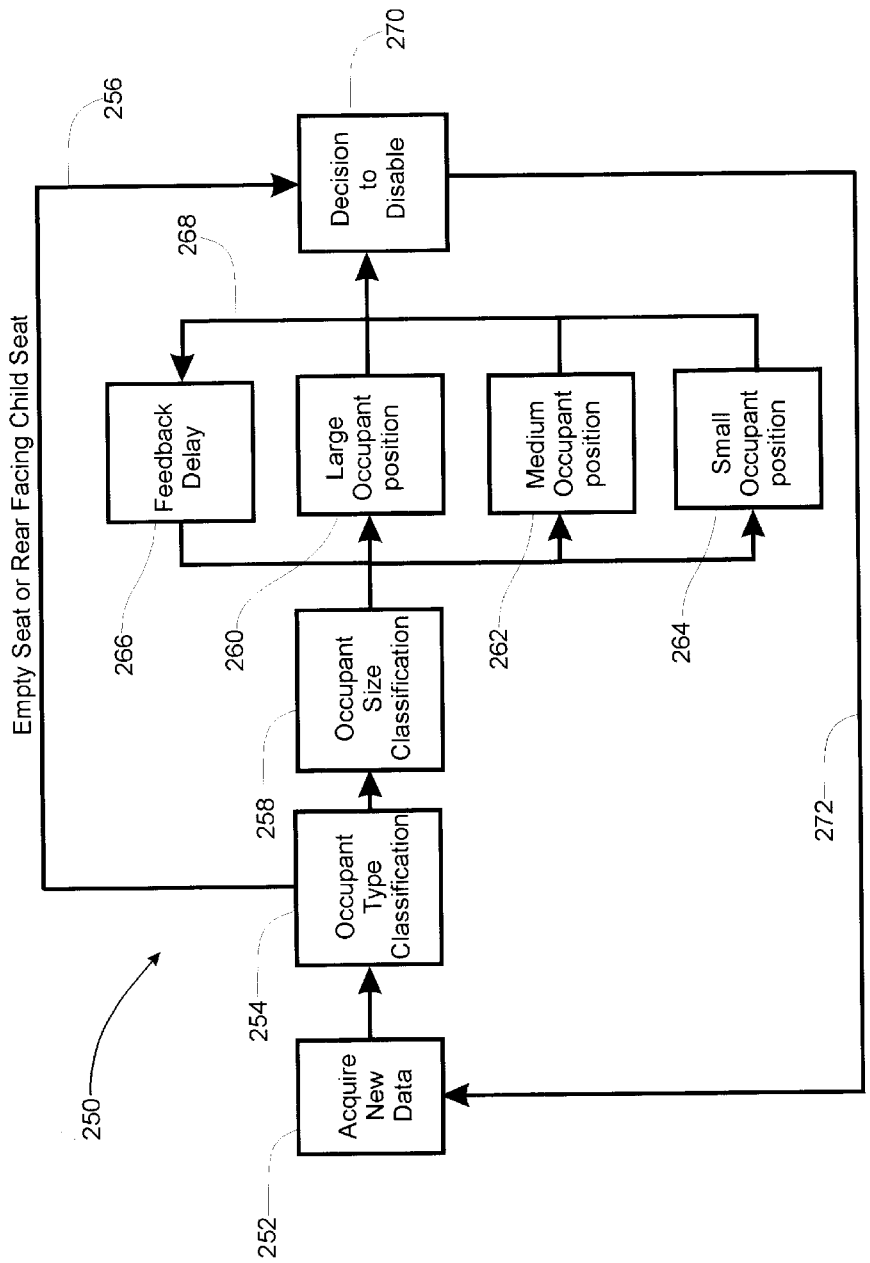
FIG. 12 is a schematic illustrating a combination neural network system.

An example of a combination neural network is shown generally at 250 in FIG. 12. The process begins at 252 with the acquisition of new data. This could be from a variety of sources such as multiple cameras, ultrasonic sensors, capacitive sensors, other electromagnetic field monitoring sensors, and other electromagnetic or acoustic-based wave sensors. Additionally, the data can come from non-wave sources such as weight or other morphological characteristic detecting sensors, occupant-presence detecting sensors or seat position sensors. The data is preprocessed and fed into neural network at 254 where the type of occupying item is determined. If the network determines that the type of occupying item is either an empty seat or a rear facing child seat then control is passed to box 270 via line 256 and the decision is made to disable the airbag. It is envisioned though that instead of disabling deployment if a rear-facing child seat is present, a depowered deployment, a late deployment or a oriented deployment may be made if it is determined that such would more likely prevent injury to the child in the child seat than cause harm.

In the event that the occupant type classification neural network 254 has determined that the seat is occupied by something other than a rear-facing child seat, then control is transferred to neural network 258, occupant size classification, which has the task of determining whether the occupant is a small, medium or large occupant. It has been found that the accuracy of the position determination is improved if the occupant size is first classified and then a special occupant position neural network is used to monitor the position of the occupant relative to airbag module. Nevertheless, the order of applying the neural networks, e.g., the size classification prior to the position classification, is not critical to the practice of the invention. Once the size of the occupant has been classified by a neural network at 258, control is then passed to neural networks 260, 262, or 264 depending on the output size determination from neural network 258. The chosen network then determines the position of the occupant and that position determination is fed to the feedback delay algorithm 266 and to the decision to disable algorithm 270. The feedback delay 266 can be a function of occupant size as well as the rate at which data is acquired. The results of the feedback delay algorithm 266 are fed to the appropriate large, medium or small occupant position neural networks 260, 262 or 264. It has been found that if the previous position of the occupant is used as input to the neural network that a more accurate estimation of the present position results. In some cases, multiple previous position values are fed instead of only the most recent value. This is determined for a particular application and programmed as part as of the feedback delay algorithm 266. After the decision to disable has been made in algorithm 270, control is returned to algorithm 252 via line 272 to acquire new data.

FIG. 12 is a singular example of an infinite variety combination neural networks that can be employed. This case combines a modular neural network structure with serial and parallel architectures. Feedback has also been used. Other examples include situations where imprecise data requires the input data to be divided into subsets and fed to a series of neural networks operating in parallel. The output of these neural networks can then be combined in a voting or another analytical manner to determine the final decision, e.g., whether and how to deploy the occupant protection apparatus. In other cases, particular transducers are associated with particular neural networks and the data combined after initial process by those dedicated neural networks. In still other cases, as discussed above, an initial neural network is used to determine whether the data to be analyzed is part of the same universe of data that has been used to train the networks. Sometimes transducers provide erroneous data and sometimes the wiring in the vehicle can be a source of noise that can corrupt the data. Similarly, a neural network in sometimes used as part of the decision to disable activity to compare results over time to again attempt to eliminate spurious false decisions. Thus, an initial determination as to whether the data is consistent with data on which the neural network is trained is often an advisable step.

In each of the boxes in FIG. 12, with the exception of the decision to disable box 270 and the feedback delay box 266, it has been assumed that each box would be a neural network. In many cases, a deterministic algorithm can be used, and in other cases correlation analysis, fuzzy logic or neural fuzzy systems are appropriate. Therefore, a combination neural network can include non-neural network analytical tasks.

Figure 13:
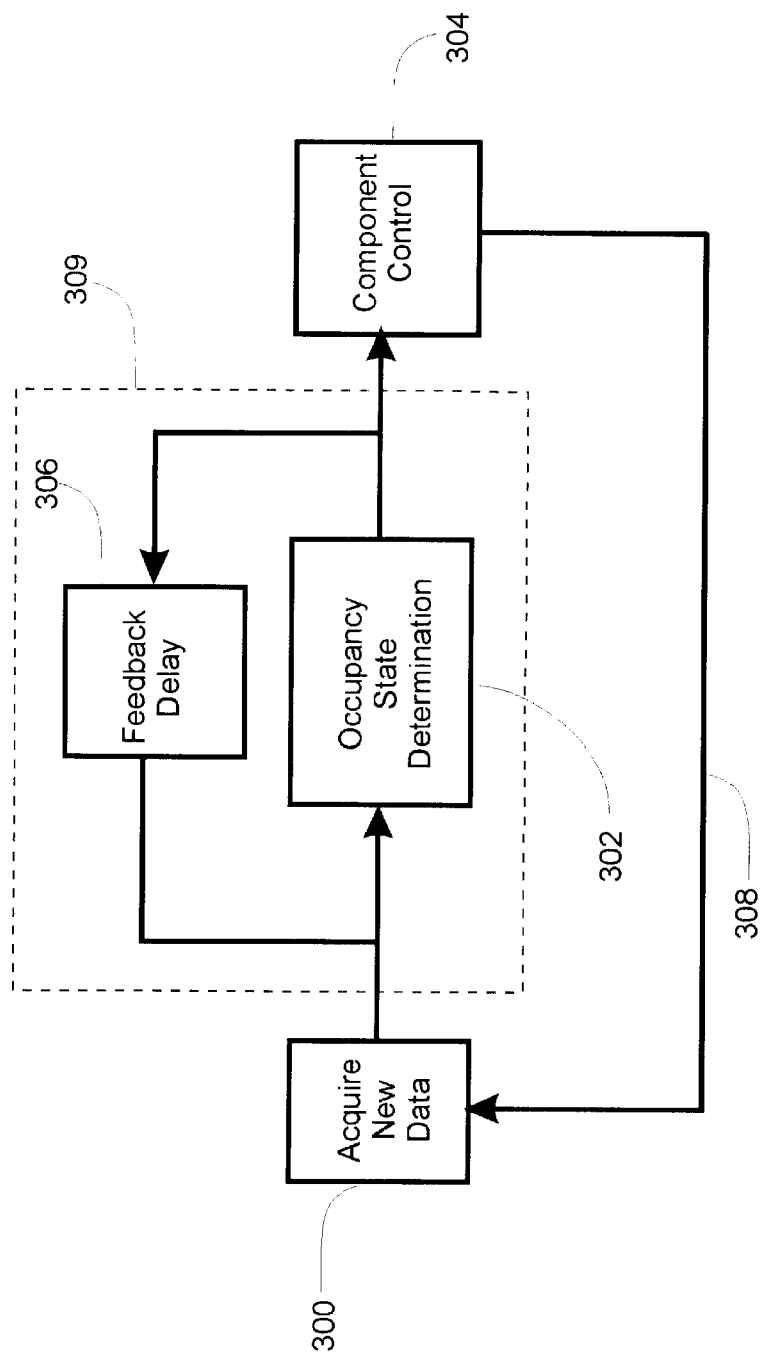
FIG. 13 is a schematic illustration of a method in which the occupancy state of a seat of a vehicle is determined using a combination neural network in accordance with the invention.

FIG. 12 illustrates the use of a combination neural network to determine whether and how to deploy or disable an airbag. It must be appreciated that the same architecture may be used to determine whether and how to deploy any type of occupant protection apparatus which is defined herein as any device, apparatus, system or component which is actuatable or deployable or includes a component which is actuatable or deployable for the purpose of attempting to minimize injury to the occupant in the event of a crash involving the vehicle. More generally, the architecture shown in FIG. 12 may be used simply to determine the occupancy state of the vehicle, e.g., the type, size and position of the occupant. A determination of the occupancy state of the vehicle includes a determination of any or all of the occupant's type, identification, size, position, etc. The occupancy state can then be used to in the control of any vehicular component, system or subsystem. FIG. 13 shows a more general schematic illustration of the use of a combination neural network designated 309 in accordance with the invention. Data is acquired at 300 and input into the occupancy state determination unit, i.e., the combination neural network, which provides an indication of the occupancy state of the seat. Once the occupancy state is determined at 302, it is provided to the component control unit 304 to effect control of the component. A feedback delay 306 is provided to enable the determination of the occupancy state from one instance to be used by the combination neural network at a subsequent instance. After the component control 304 is effected, the process begins anew by acquiring new data via line 308.

Figure 14:
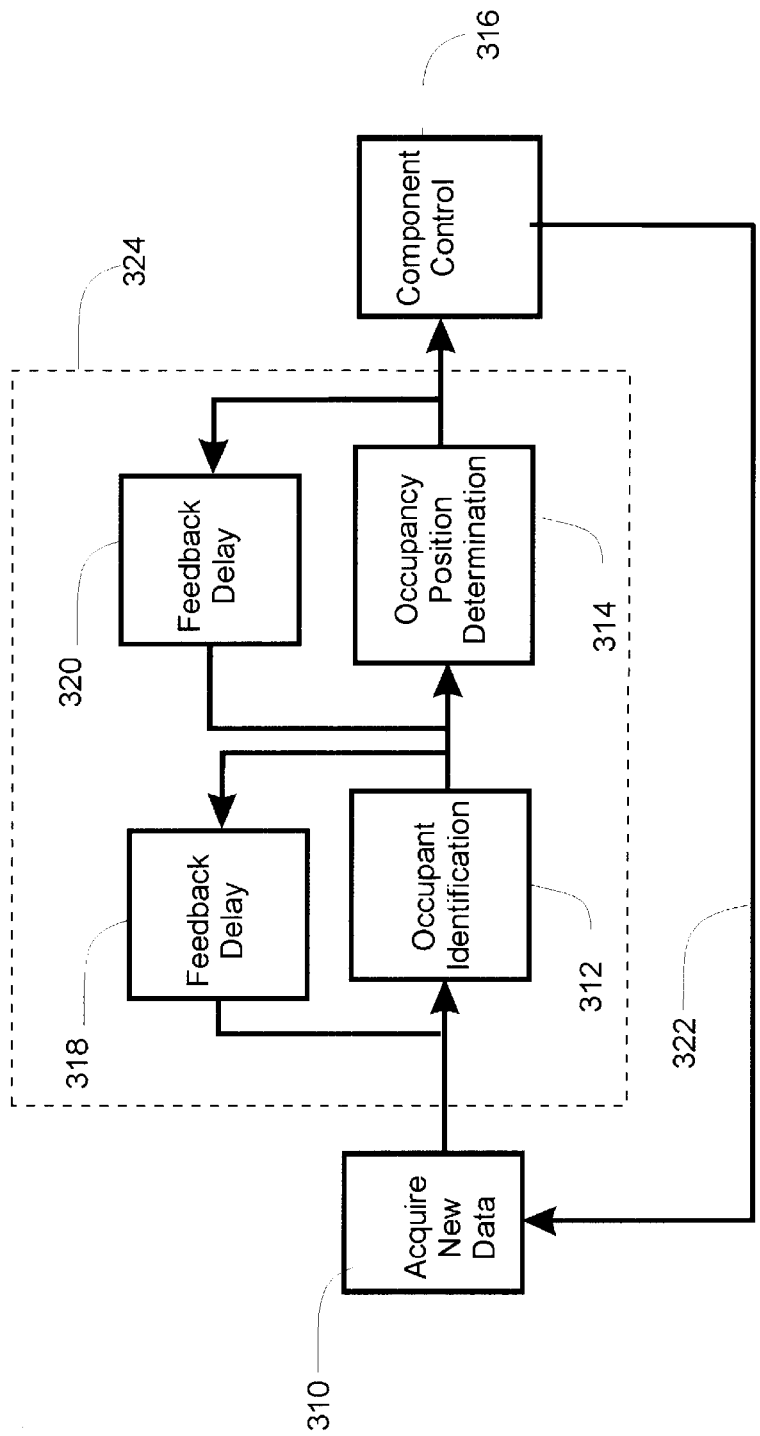
FIG. 14 is a schematic illustration of a method in which the identification and position of the occupant is determined using a combination neural network in accordance with the invention.

FIG. 14 shows a schematic illustration of the use of a combination neural network in accordance with the invention designated 324 in which the occupancy state determination entails an identification of the occupying item by one neural network and a determination of the position of the occupying item by another neural network. Data is acquired at 310 and input into the identification neural network 312 which is trained to provide the identification of the occupying item of the seat based on at least some of the data, i.e., data from one or more transducers might have been deemed of nominal relevance for the identification determination and thus the identification neural network 312 was not trained on such data. Once the identification of the occupying item is determined at 312, it is provided to the position neural network 314 which is trained to provide an indication of the position of the occupying item, e.g., relative to the occupant protection apparatus, based on at least some of the data. That is, data from one or more transducers, although possibly useful for the identification neural network 312, might have been deemed of nominal relevance for the position neural network 314 and thus the position neural network was not trained on such data. Once the identification and position of the occupying item are determined, they are provided to the component control unit 316 to effect control of the component based on one of these determinations or both. A feedback delay 318 is provided for the identification neural network 312 to enable the determination of the occupying item's identification from one instance to be used by the identification neural network 312 at a subsequent instance. A feedback delay 320 is provided for the position neural network 314 to enable the determination of the occupying item's position from one instance to be used by the position neural network 314 at a subsequent instance. After the component control 316 is effected, the process begins anew by acquiring new data via line 322. The identification neural network 312, the position determination neural network 314 and feedback delays 318,320 combine to constitute the combination neural network 324 in this embodiment (shown in dotted lines).

The data used by the identification neural network 312 to determine the identification of the occupying item may be different than the data used by the position determination neural network 314 to determine the position of the occupying item. That is, data from a different set of transducers may be applied by the identification neural network 312 than by the position determination neural network. Instead of a single position determination neural network as schematically shown in FIG. 14, a plurality of position determination neural networks may be used depending on the identification of the occupying item. Also, a size determination neural network may be incorporated into the combination neural network after the identification neural network 312 and then optionally, a plurality of the position determination neural networks as shown in the embodiment of FIG. 12.

With respect to the feedback delays 318,320, it is possible to use the position determination from position neural network 314 as input into the identification neural network 312.

Figure 15:
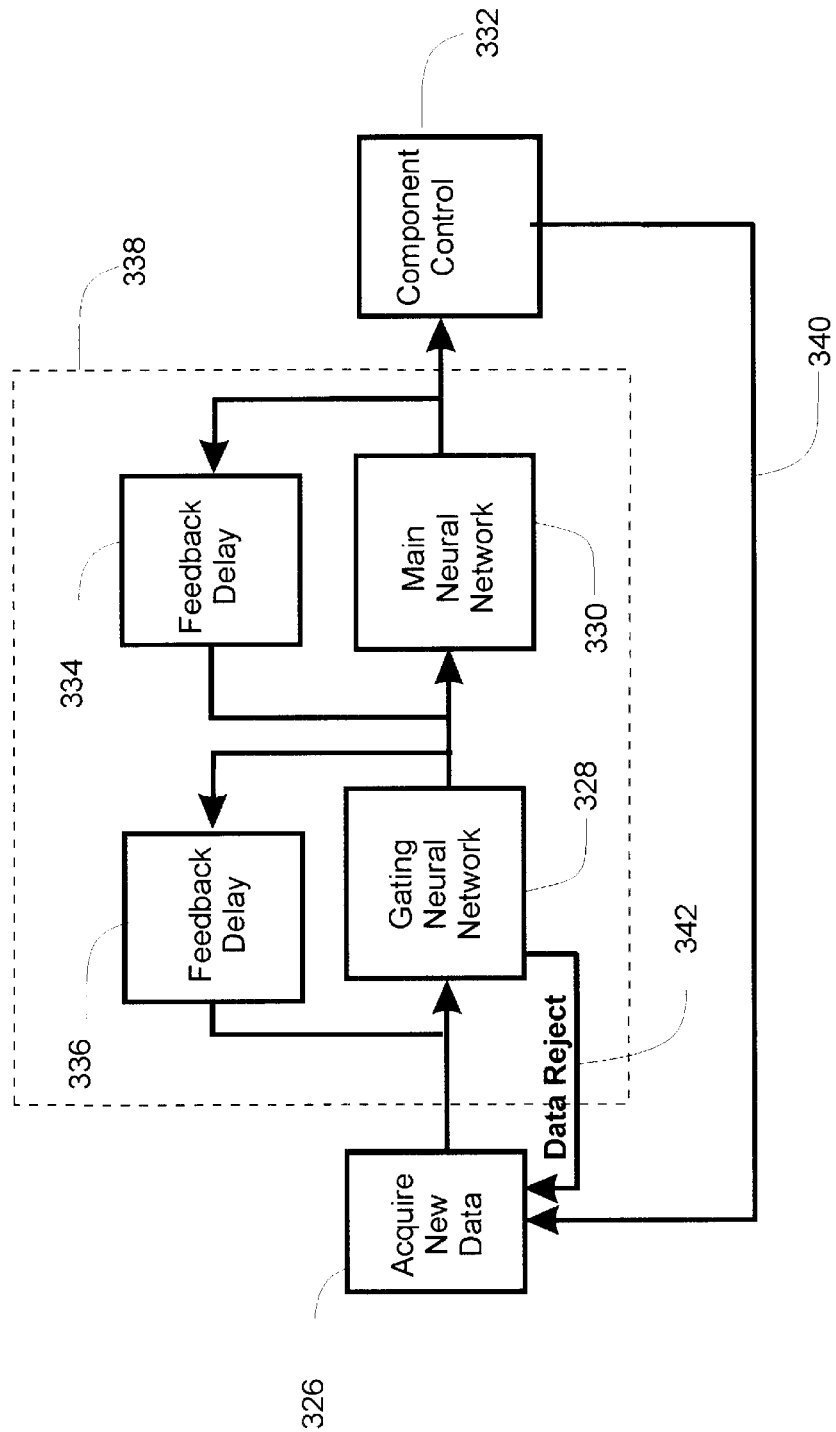
FIG. 15 is a schematic illustration of a method in which the occupancy state of a seat of a vehicle is determined using a combination neural network in accordance with the invention in which bad data is prevented from being used to determine the occupancy state of the vehicle.

FIG. 15 shows a schematic illustration of the use of a combination neural network in accordance with the invention designated 338 in which the occupancy state determination entails an initial determination as to the quality of the data obtained by the transducers and intended for input into a main occupancy state determination neural network. Data from the transducers is acquired at 326 and input into a gating neural network 328 which is trained to allow only data which agrees with or is similar to data on which a main neural network 330 is trained. If the data provided by transducers has been corrupted and thus deviates from data on which the main neural network 330 has been trained, the gating neural network 328 will reject it and request new data via line 342 from the transducers. Thus, gating neural network 328 serves as a gate to prevent data which might cause an incorrect occupancy state determination from entering as input to the main neural network 330. If the gating neural network 328 determines that the data is reasonable, it allows the data to pass as input to the main neural network 330 which is trained to determine the occupancy state. Once the occupancy state is determined, it is provided to the component control unit 332 to effect control of the component. A feedback delay 336 is provided for the gating neural network 328 to enable the indication of unreasonable data from one instance to be used by the gating neural network 328 at a subsequent instance. A feedback delay 334 is provided for the main neural network 330 to enable the determination of the occupancy state from one instance to be used by the main neural network 330 at a subsequent instance. After the component control 332 is effected, the process begins anew by acquiring new data via line 340. The gating neural network 328, the main neural network 330 and optional feedback delays 334,336 combine to constitute the combination neural network 338 in this embodiment (shown in dotted lines).

Instead of a single occupancy state neural network as schematically shown in FIG. 15, the various combinations of neural networks disclosed herein for occupancy state determination may be used. Similarly, the use of a gating neural network may be incorporated into any of the combination neural networks disclosed herein to prevent unreasonable data from entering into any of the neural networks in any of the combination neural networks.

Figure 16:
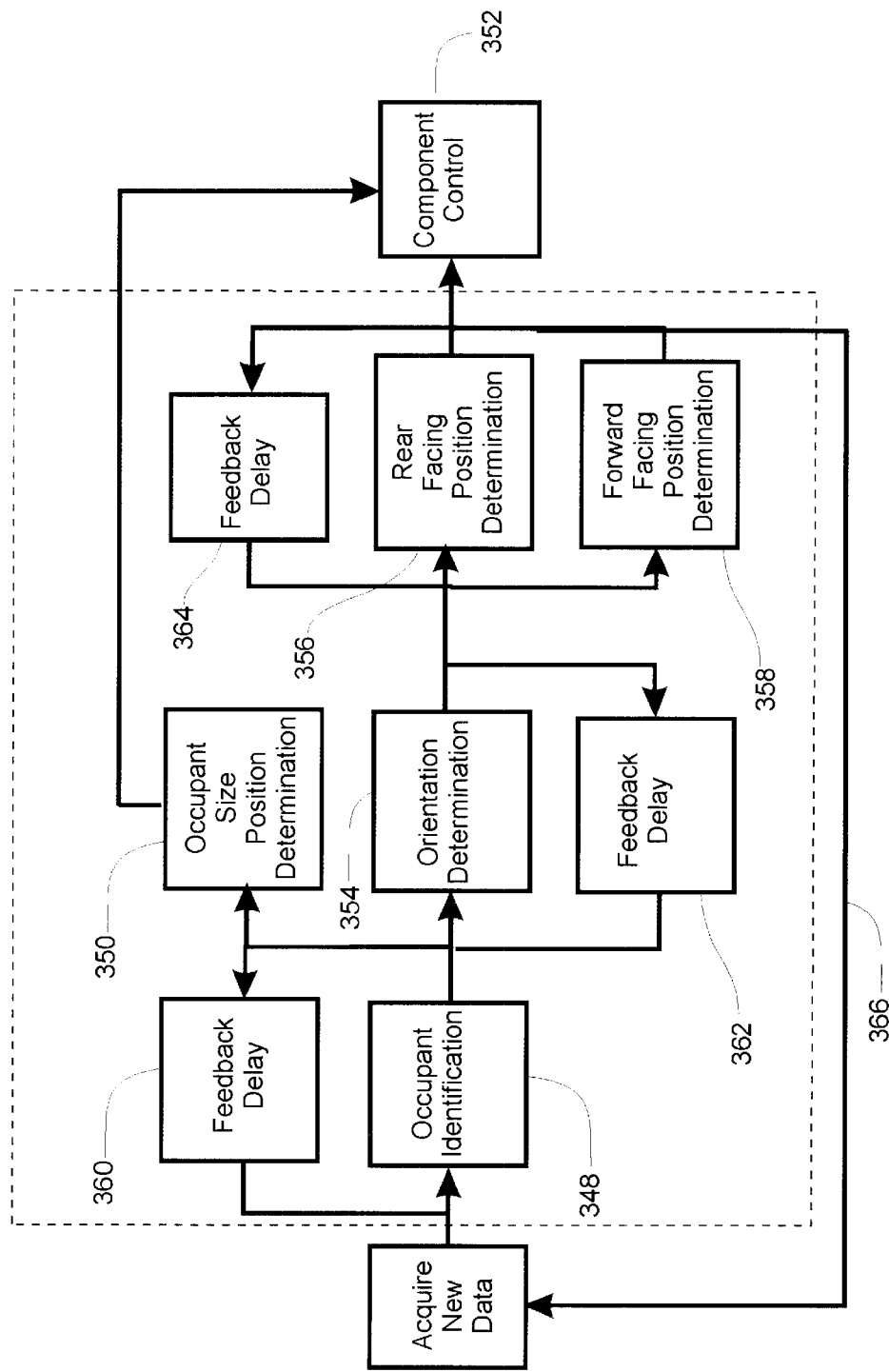
FIG. 16 is a schematic illustration of another method in which the occupancy state of a seat of a vehicle is determined, in particular, for the case when a child seat is present, using a combination neural network in accordance with the invention.

FIG. 16 shows a schematic illustration of the use of a combination neural network in accordance with the invention designated 344 with a particular emphasis on determining the orientation and position of a child seat. Data is acquired at 346 and input into the identification neural network 348 which is trained to provide the identification of the occupying item of the seat based on at least some of the data. If the occupying item is other than a child seat, the process is directed to size/position determination neural network 350 which is trained to determine the size and position of the occupying item and pass this determination to the component control 352 to enable control of the component to be effected based on the identification, size and/or position of the occupying item. Note that the size/position determination neural network may itself be a combination neural network.

When the occupying item is identified as a child seat, the process passes to orientation determination neural network 354 which is trained to provide an indication of the orientation of the child seat, i.e., whether it is rear-facing or forward-facing, based on at least some of the data. That is, data from one or more transducers, although possibly useful for the identification neural network 348, might have been deemed of nominal relevance for the orientation determination neural network 354 and thus the orientation neural network was not trained on such data. Once the orientation of the child seat is determined, control is then passed to position determination neural networks 356,358 depending on the orientation determination from neural network 354. The chosen network then determines the position of the child seat and that position determination is passed to component control 352 to effect control of the component.

A feedback delay 360 is provided for the identification neural network 348 to enable the determination of the occupying item's identification from one instance to be used by the identification neural network 348 at a subsequent instance. A feedback delay 362 is provided for the orientation determination neural network 354 to enable the determination of the child seat's orientation from one instance to be used by the orientation determination neural network 354 at a subsequent instance. A feedback delay 364 is provided for the position determination neural networks 356,358 to enable the position of the child seat from one instance to be used by the respective position determination neural networks 356,358 at a subsequent instance. After the component control 352 is effected, the process begins anew by acquiring new data via line 366. The identification neural network 348, the position/size determination neural network 350, the child seat orientation determination neural network 354, the position determination neural networks 356,358 and the feedback delays 360,362,364 combine to constitute the combination neural network 344 in this embodiment (shown in dotted lines).

The data used by the identification neural network 348 to determine the identification of the occupying item, the data used by the position/size determination neural network 350 to determine the position of the occupying item, the data used by the orientation determination neural network 354, the data used by the position determination neural networks 356,358 may all be different from one another. For example, data from a different set of transducers may be applied by the identification neural network 348 than by the position/size determination neural network 350. As mentioned above, instead of a single position/size determination neural network as schematically shown in FIG. 14, a plurality of position determination neural networks may be used depending on the identification of the occupying item.

With respect to the feedback delays 360,362,364, it is possible to provide either upstream or downstream feedback from any of the neural networks to any of the other neural networks.

Figure 17:
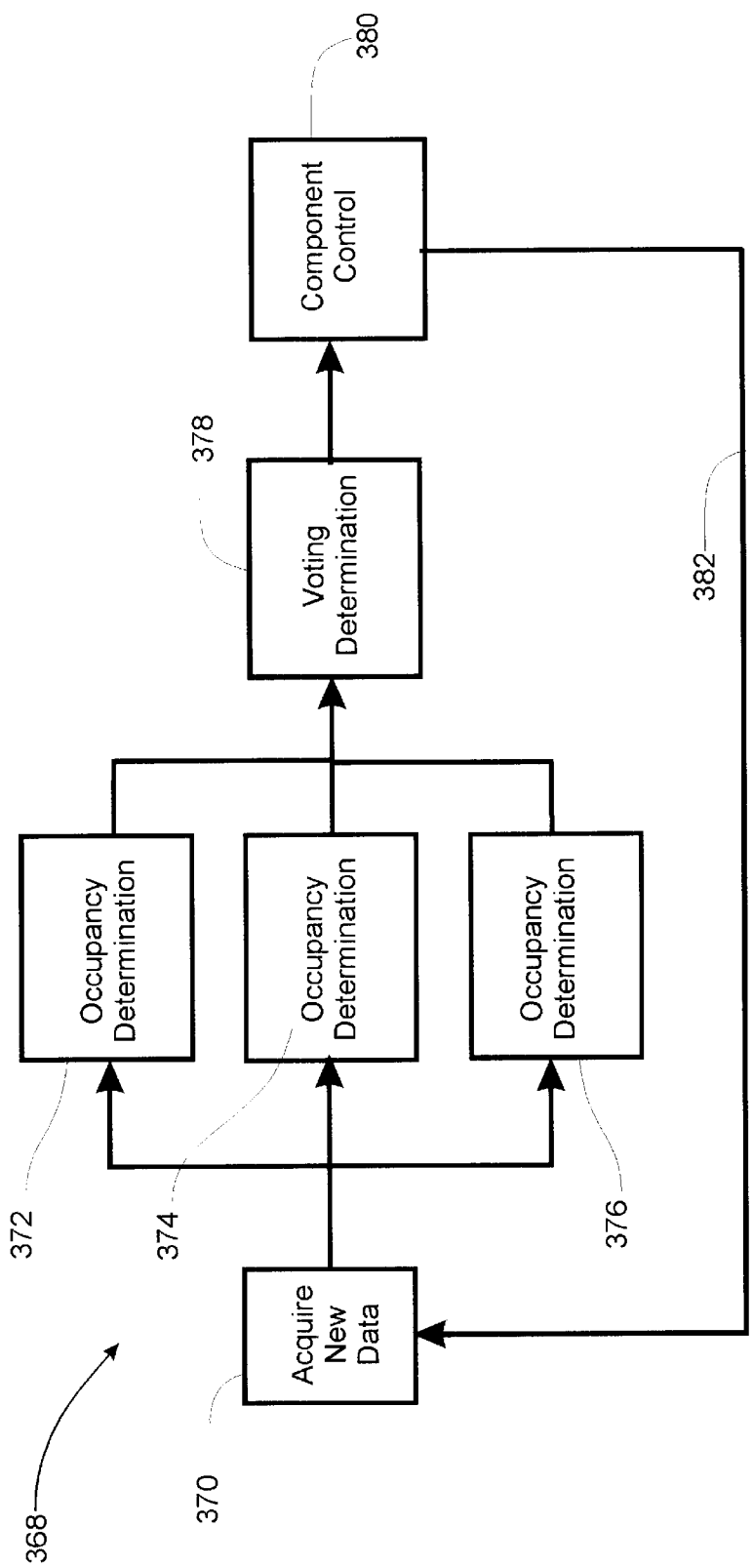
FIG. 17 is a schematic illustration of a method in which the occupancy state of a seat of a vehicle is determined using a combination neural network in accordance with the invention, in particular, an ensemble arrangement of neural networks.

FIG. 17 shows a schematic illustration of the use of an ensemble type of combination neural network in accordance with the invention designated 368. Data from the transducers is acquired at 370 and three streams of data are created. Each stream of data contains data from a different subset of transducers. Each stream of data is input into a respective occupancy determination neural network 372,374,376, each of which is trained to determine the occupancy state based on the data from the respective subset of transducers. Once the occupancy state is determined by each neural network 372,374,376, it is provided to a voting determination system 378 to consider the determination of the occupancy states from the occupancy determination neural networks 372,374, 376 and determine the most reasonable occupancy state which is passed to the component control unit 380 to effect control of the component. Ideally, the occupancy state determined by each neural network 372,374,376 will be the same and such would be passed to the component control. However, in the event they differ, the voting determination system 378 weighs the occupancy states determined by each neural network 372,374,376 and "votes" for one. For example, if two neural networks 372,374 provided the same occupancy state while neural network 376 provides a different occupancy state, the voting determination system 378 could be designed to accept the occupancy state from the majority of neural networks, in this case, that of neural networks 372,374. A feedback delay may be provided for each neural network 372,374,376 as well as from the voting determination system 378 to each neural network 372,374, 376. The voting determination system 378 may itself be a neural network. After the component control 380 is effected, the process begins anew by acquiring new data via line 382.

Instead of the single occupancy state neural networks 372,374,376 as schematically shown in FIG. 17, the various combinations of neural networks disclosed herein for occupancy state determination may be used.

Process For Training A Vehicle

The process for adapting an ultrasonic system to a vehicle will now be described. A more detailed list of steps is provided in Appendix 2. Although the pure ultrasonic system is described here, a similar or analogous set of steps applies when other technologies such as weight and optical or other electromagnetic wave systems such as capacitance and field monitoring systems are used. This description is thus provided to be exemplary and not limiting:

1. Select transducer, horn and grill designs to fit the vehicle. At this stage, usually full horns are used which are mounted so that they project into the passenger compartment. No attempt is made at this time to achieve an esthetic matching of the transducers to the vehicle surfaces. An estimate of the desired transducer fields is made at this time either from measurements in the vehicle directly or from CAD drawings.

2. Make polar plots of the transducer sonic fields. Transducers and candidate horns and grills are assembled and tested to confirm that the desired field angles have been achieved. This frequently requires some adjustment of the transducers in the horn and of the grill. A properly designed grill for ultrasonic systems can perform a similar function as a lens for optical systems.

3. Check to see that the fields cover the required volumes of the vehicle passenger compartment and do not impinge on adjacent flat surfaces that may cause multipath effects. Redesign horns and grills if necessary.

4. Install transducers into vehicle.

5. Map transducer fields in the vehicle and check for multipath effects and proper coverage.

6. Adjust transducer aim and re-map fields if necessary.

7. Install daily calibration fixture and take standard setup data.

8. Acquire 50,000 to 100,000 vectors

9. Adjust vectors for volume considerations by removing some initial data points if cross talk is present and some final points to keep data in the desired passenger compartment volume.

10. Normalize vectors.

11. Run neural network algorithm generating software to create algorithm for vehicle installation.

12. Check the accuracy of the algorithm. If not sufficiently accurate collect more data where necessary and to retrain. If still not sufficiently accurate, add additional transducers to cover holes.

13. When sufficient accuracy is attained, proceed to collect ~500,000 training vectors varying:

Occupancy (see Appendices 1 and 3):
    Occupant size, position (zones), clothing etc
    Child seat type, size, position etc.
    Empty seat
Vehicle configuration:
    Seat position
    Window position
    Visor and armrest position
    Presence of other occupants in adjoining seat or rear seat
    Temperature
    Temperature gradient—stable
    Temperature turbulence—heater and air conditioner
    Wind turbulence—High speed travel with windows open, top down etc 14. Collect~100,000 vectors of Independent data using other combinations of the above 15. Collect ~50,000 vectors of "real world data" to represent the acceptance criteria and more closely represent the actual seated state probabilities in the real world.

16. Train network and create an algorithm using the training vectors and the Independent data vectors.

17. Validate the algorithm using the real world vectors.

18. Install algorithm into the vehicle and test.

19. Decide on post processing methodology to remove final holes (areas of inaccuracy) in system 20. Implement post-processing methods into the algorithm 21. Final test. The process up until step 13 involves the use of transducers with full horns mounted on the surfaces of the interior passenger compartment. At some point, the actual transducers which are to be used in the final vehicle must be substituted for the trial transducers. This is either done prior to step 13 or at this step. This process involves designing transducer holders that blend with the visual surfaces of the passenger compartment so that they can be covered with a properly designed grill that helps control the field and also serves to retain the esthetic quality of the interior. This is usually a lengthy process and involves several consultations with the customer. Usually, therefore, the steps from 13 through 20 are repeated at this point after the final transducer and holder design has been selected. The initial data taken with full horns gives a measure of the best system that can be made to operate in the vehicle. Some degradation in performance is expected when the esthetic horns and grills are substituted for the full horns. By conducting two complete data collection cycles an accurate measure of this accuracy reduction can be obtained.

22. Up until this point, the best single neural network algorithm has been developed. The final step is to implement the principles of a combination neural network in order to remove some remaining error sources such as bad data and to further improve the accuracy of the system. It has been found that the implementation of combination neural networks can reduce the remaining errors by up to 50 percent. A combination neural network CAD optimization program provided by Consultants International Ltd. can now be used to derive the neural network architecture. Briefly, the operator lays out a combination neural network involving many different neural networks arranged in parallel and in series and with appropriate feedbacks which the operator believes could be important. The software then optimizes each neural network and also provides an indication of the value of the network. The operator can then selectively eliminate those networks with little or no value and retrain the system. Through this combination of pruning, retraining and optimizing the final candidate combination neural network results.

23. Ship to customers to be used in production vehicles.

24. Collect additional real world validation data for continuous improvement.

More detail on the operation of the transducers and control circuitry as well as the neural network is provided in the above referenced patents and patent applications and is included herein as if the entire text of the same were reproduced here. One particular example of a successful neural network for the two transducer case had 78 input nodes, 6 hidden nodes and one output node and for the four transducer case had 176 input nodes 20 hidden layer nodes on hidden layer one, 7 hidden layer nodes on hidden layer 2 and one output node. The weights of the network were determined by supervised training using the back propagation method as described in the referenced patent applications and in more detail in the references cited therein. Naturally other neural network architectures are possible including RCE, Logicon Projection, Stochastic etc. An example of a combination neural network system is shown in FIG. 12. Any of the network architectures mention here can be used for any of the boxes in FIG. 12.

Finally, the system is trained and tested with situations representative of the manufacturing and installation tolerances that occur during the production and delivery of the vehicle as well as usage and deterioration effects. Thus, for example, the system is tested with the transducer mounting positions shifted by up to one inch in any direction and rotated by up to 5 degrees, with a simulated accumulation of dirt and other variations. This tolerance to vehicle variation also sometimes permits the installation of the system onto a different but similar model vehicle with, in many cases, only minimal retraining of the system.

The speed of sound varies with temperature, humidity, and pressure. This can be compensated for by using the fact that the geometry between the transducers is known and the speed of sound can therefore be measured. Thus, on vehicle startup and as often as desired thereafter, the speed of sound can be measured by one transducer, such as transducer 110 in FIG. 5, sending a signal which is directly received by another transducer. Since the distance separating them is known, the speed of sound can be calculated and the system automatically adjusted to remove the variation due to the change in the speed of sound. Therefore, the system operates with same accuracy regardless of the temperature, humidity or atmospheric pressure. It may even be possible to use this technique to also automatically compensate for any effects due to wind velocity through an open window. An additional benefit of this system is that it can be used to determine the vehicle interior temperature for use by other control systems within the vehicle since the variation in the velocity of sound is a strong function of temperature and a weak function of pressure and humidity.

The problem with the speed of sound measurement described above is that some object in the vehicle may block the path from one transducer to another. This of course could be checked and a correction not be made if the signal from one transducer does not reach the other transducer. The problem, however, is that the path might not be completely blocked but only slightly blocked. This would cause the ultrasonic path length to increase, which would give a false indication of a temperature change. This can be solved by using more than one transducer. All of the transducers can broadcast signals to all of the other transducers. The problem here, of course, is which transducer pair does one believe if they all give different answers. The answer is the one that gives the shortest distance or the greatest calculated speed of sound. By this method, there are a total of 6 separate paths for four ultrasonic transducers.

An alternative method of determining the temperature is to use the transducer circuit to measure some parameter of the transducer that changes with temperature. For example the natural frequency of ultrasonic transducers changes in a known manner with temperature and therefore by measuring the natural frequency of the transducer the temperature can be determined. Since this method does not require communication between transducers, it would also work in situations where each transducer has a different resonant frequency.

The process by which all of the distances are carefully measured from each transducer to the other transducers and the algorithm developed to determine the speed of sound, is a significant part of the teachings of the instant invention. Prior to this, the speed of sound calculation was based on a single transmission from one transducer to a known second transducer. This resulted in an inaccurate system design and degraded the accuracy of systems in the field.

If the electronic control module that is part of the system is located in generally the same environment as the transducers, another method of determining the temperature is available. This method utilizes a device and whose temperature sensitivity is known and which is located in the same box as the electronic circuit. In fact, in many cases, an existing component on the printed circuit board can be monitored to give an indication of the temperature. For example, the diodes in the log comparison circuit have characteristics that their resistance changes in a known manner with temperature. It can be expected that the electronic module will generally be at a higher temperature than the surrounding environment, however, the temperature difference is a known and predictable amount. Thus, a reasonably good estimation of the temperature in the passenger compartment can also be obtained in this manner. Naturally, thermisters or other temperature transducers can be used.

Another important feature of a system, developed in accordance with the teachings of this invention, is the realization that motion of the vehicle can be used in a novel manner to substantially increase the accuracy of the system. Ultrasonic waves reflect on most objects as light off a mirror. This is due to the relatively long wavelength of ultrasound as compared with light. As a result, certain reflections can overwhelm the receiver and reduce the available information. When readings are taken while the occupant and/or the vehicle is in motion, and these readings averaged over several transmission/reception cycles, the motion of the occupant and vehicle causes various surfaces to change their angular orientation slightly but enough to change the reflective pattern and reduce this mirror effect. The net effect is that the average of several cycles gives a much clearer image of the reflecting object than is obtainable from a single cycle. This then provides a better image to the neural network and significantly improves the identification accuracy of the system. The choice of the number of cycles to be averaged depends on the system requirements. For example, if dynamic out-of-position is required then each vector must be used alone and averaging in the simple sense cannot be used. This will be discussed more detail below.

When an occupant is sitting in the vehicle during normal vehicle operation, the determination of the occupancy state can be substantially improved by using successive observations over a period of time. This can either be accomplished by averaging the data prior to insertion into a neural network, or alternately the decision of the neural network can be averaged. This is known as the categorization phase of the process. During categorization the occupancy state of the vehicle is determined. Is the vehicle occupied by the forward facing human, an empty seat, a rear facing child seat, or an out-of-position human? Typically many seconds of data can be accumulated to make the categorization decision.

When a driver senses an impending crash, on the other hand, he or she will typically slam on the brakes to try to slow vehicle prior to impact. If an occupant is unbelted, he or she will begin moving toward the airbag during this panic braking. For the purposes of determining the position of the occupant, there is not sufficient time to average data as in the case of categorization. Nevertheless, there is information in data from previous vectors that can be used to partially correct errors in current vectors, which may be caused by thermal effects, for example. One method is to determine the location of the occupant using the neural network based on previous training. The motion of the occupant can then be compared to a maximum likelihood position based on the position estimate of the occupant at previous vectors. Thus, for example, perhaps the existence of thermal gradients in the vehicle caused an error in the current vector leading to a calculation that the occupant has moved 12 inches since the previous vector. Since this could be a physically impossible move during ten milliseconds, the measured position of the occupant can be corrected based on his previous positions and known velocity. Naturally, if an accelerometer is present in the vehicle and if the acceleration data is available for this calculation, a much higher accuracy prediction can be made. Thus, there is information in the data in previous vectors as well as in the positions of the occupant determined from the latest data that can be used to correct erroneous data in the current vector and, therefore, in a manner not too dissimilar from the averaging method for categorization, the position accuracy of the occupant can be known with higher accuracy.

Returning to the placement of ultrasonic transducers for the ultrasonic occupant position sensor system, as to the more novel features of the invention for the placement of ultrasonic transducers, this application discloses (1) the application of two sensors to single-axis monitoring of target volumes; (2) the method of locating two sensors spanning a target volume to sense object positions, that is, transducers are mounted along the sensing axis beyond the objects to be sensed; (3) the method of orientation of the sensor axis for optimal target discrimination parallel to the axis of separation of distinguishing target features; and (4) the method of defining the head and shoulders and supporting surfaces as defining humans for rear facing child seat detection and forward facing human detection.

A similar set of observations is available for the use of electromagnetic sensors. Such rules however must take into account that such sensors typically are more accurate in measuring lateral and vertical dimensions relative to the sensor than distances perpendicular to the sensor. This is particularly the case for CMOS and CCD based transducers.

Considerable work is ongoing to improve the resolution of the ultrasonic transducers. To take advantage of higher resolution transducers, more closer together data points should be obtained. This means that after the envelope has been extracted from the returned signals, the sampling rate should be increased from approximately 1000 samples per second to perhaps 2000 samples per second or even higher. By doubling or tripling the amount data required to be analyzed, the system which is mounted on the vehicle will require greater computational power. This results in a more expensive electronic system. Not all of the data is of equal importance, however. The position of the occupant in the normal seating position does not need to be known with great accuracy whereas as that occupant is moving toward the keep out zone boundary during pre-crash braking, the spatial accuracy requirements become more important. Fortunately, the neural network algorithm generating system has the capability of indicating to the system designer the relative value of each of the data points used by the neural network. Thus, as many as, for example, 500 data points per vector may be collected and fed to the neural network during the training stage and, after careful pruning, the final number of data points to be used by the vehicle mounted system may be reduced to 150, for example. This technique of using the neural network algorithm-generating program to prune the input data is an important teaching of the present invention. By this method, the advantages of higher resolution transducers can be optimally used without increasing the cost of the electronic vehicle mounted circuits. Also, once the neural network has determined the spacing of the data points, this can be fine-tuned, for example, by acquiring more data points at the edge of the keep out zone as compared to positions well into the safe zone. The initial technique is done by collecting the full 500 data points, for example, while in the system installed in the vehicle the data digitization spacing can be determined by hardware or software so that only the required data is acquired.

The technique that was described above for the determination of the location of an occupant during panic or braking pre-crash situations involved the use of a modular neural network. In that case, one neural network was used to determine the occupancy state of the vehicle and the second neural network was used to determine the location of the occupant within the vehicle. The method of designing a system utilizing multiple neural networks is a key teaching of the present invention. When this idea is generalized, many potential combinations of multiple neural network architectures become possible. Some of these will now be discussed.

One of the earliest attempts to use multiple neural networks was to combine different networks trained differently but on substantially the same data under the theory that the errors which affect the accuracy of one network would be independent of the errors which affect the accuracy of another network. For example, for a system containing four ultrasonic transducers, four neural networks could be trained each using a different subset of the four transducer data. Thus, if the transducers are arbitrarily labeled A, B, C and D the then the first neural network would be trained on data from A, B and C. The second neural network would be trained on data from B, C, and D etc. This technique has not met with a significant success since it is an attempt to mask errors in the data rather than to eliminate them. Nevertheless, such a system does perform marginally better in some situations compared to a single network using data from all four transducers. The penalty for using such a system is that the computational time is increased by approximately a factor of three. This significantly affects the cost of the system installed in a vehicle.

An alternate method of obtaining some of the advantages of the parallel neural network architecture described above, is to form a single neural network but where the nodes of one or more of the hidden layers are not all connected to all of the input nodes. Alternately, if the second hidden layer is chosen, all of the notes from the previous hidden layer are not connected to all of the nodes of the subsequent layer. The alternate groups of hidden layer nodes can then be fed to different output notes and the results of the output nodes combined, either through a neural network training process into a single decision or a voting process. This latter approach retains most of the advantages of the parallel neural network while substantially reducing the computational complexity.

The fundamental problem with parallel networks is that they focus on achieving reliability or accuracy by redundancy rather than by improving the neural network architecture itself or the quality of the data being used. They also increase the cost of the final vehicle installed systems. Alternately, modular neural networks improve the accuracy of the system by dividing up the tasks. For example, if a system is to be designed to determine the type of tree and the type of animal in a particular scene, the modular approach would be to first determine whether the object of interest is an animal or a tree and then use separate neural networks to determine type of tree and the type of animal. When a human looks at a tree he is not ask himself is that a tiger or a monkey. Modular neural network systems are efficient since once the categorization decision is made, the seat is occupied by forward facing human, for example, the location of that object can be determined more accurately and without requiring increased computational resources.

Another example where modular neural networks have proven valuable is to provide a means for separating "normal" from "special cases". It has been found that in some cases, the vast majority of the data falls into what might be termed "normal" cases that are easily identified with a neural network. The balance of the cases cause the neural network considerable difficulty, however, there are identifiable characteristics of the special cases that permits them to be separated from the normal cases and dealt with separately. Various types of human intelligence rules can be used, in addition to a neural network, to perform this separation including fuzzy logic, statistical filtering using the average class vector of normal cases, the vector standard deviation, and threshold where a fuzzy logic network is used to determine chance of a vector belonging to a certain class. If the chance is below a threshold, the standard neural network is used and if above the special one is used.

Mean-Variance connections, Fuzzy Logic, Stochastic, and Genetic Algorithm networks, and combinations thereof such as Neuro-Fuzzy systems are other technologies considered in designing an appropriate system. During the process of designing a system to be adapted to a particular vehicle, many different neural network architectures are considered including those mentioned above. The particular choice of architecture is frequently determined on a trial and error basis by the system designer in many cases using the combination neural network CAD software from Consultants International Ltd. Although the parallel architecture system described above has not proven to be in general beneficial, one version of this architecture has shown some promise. It is known that when training a neural network, that as the training process proceeds the accuracy of the decision process improves for the training and independent databases. It is also known that the ability of the network to generalize suffers. That is, when the network is presented with a system which is similar to some case in the database but still with some significant differences, the network may make the proper decision in the early stages of training, but the wrong decisions after the network has become fully trained. This is sometimes called the young network vs. old network dilemma. In some cases, therefore, using an old network in parallel with a young network can retain some of the advantages of both networks, that is, the high accuracy of the old network coupled with the greater generality of the young network. Once again, the choice of any of these particular techniques is part of the process of designing a system to be adapted to a particular vehicle and is the prime subject of this invention. The particular combination of tools used depends on the particular application and the experience of the system designer.

The methods above have been described in connection with the use of ultrasonic transducers. Many of the methods, however, are also applicable to optical, radar, capacitive and other sensing systems and where applicable, this invention is not limited to ultrasonic systems. In particular, an important feature of this invention is the proper placement of three or more separately located receivers such that the system still operates with high reliability if one of the receivers is blocked by some object such as a newspaper. This feature is also applicable to systems using electromagnetic radiation instead of ultrasonic, however the particular locations will differ based on the properties of the particular transducers. Optical sensors based on two-dimensional cameras or other image sensors, for example, are more appropriately placed on the sides of a rectangle surrounding the seat to be monitored rather than at the corners of such a rectangle as is the case with ultrasonic sensors. This is because ultrasonic sensors measure an axial distance from the sensor where the camera is most appropriate for measuring distances up and down and across its field view rather than distances to the object. With the use of electromagnetic radiation and the advances which have recently been made in the field of very low light level sensitivity, it is now possible, in some implementations, to eliminate the transmitters and use background light as the source of illumination along with using a technique such as auto-focusing to obtain the distance from the receiver to the object. Thus, only receivers would be required further reducing the complexity of the system.

Optical sensors can be used to obtain a three dimensional measurement of the object through a variety of methods that use time of flight, modulated light and phase measurement, quantity of light received within a gated window, structured light and triangulation etc. Some of these techniques are discussed in U.S. patent application Ser. No. 09/389,947 filed Sep. 3, 1999, which is incorporated herein by reference.

Although implicit in the above discussion, an important feature of this invention which should be emphasized is the method of developing a system having distributed transducer mountings. Other systems which have attempted to solve the rear facing child seat (RFCS) and out-of-position problems have relied on a single transducer mounting location or at most, two transducer mounting locations. Such systems can be easily blinded by a newspaper or by the hand of an occupant, for example, which is imposed between the occupant and the transducers. This problem is almost completely eliminated through the use of three or more transducers which are mounted so that they have distinctly different views of the passenger compartment volume of interest. If the system is adapted using four transducers as illustrated in the distributed system of FIG. 9, for example, the system suffers only a slight reduction in accuracy even if two of the transducers are covered so as to make them inoperable.

It is important in order to obtain the full advantages of the system when a transducer is blocked, that the training and independent databases contains many examples of blocked transducers. If the pattern recognition system, the neural network in this case, has not been trained on a substantial number of blocked transducer cases, it will not do a good job in recognizing such cases later. This is yet another instance where the makeup of the databases is crucial to the success of designing the system that will perform with high reliability in a vehicle and is an important aspect of the instant invention.

Other techniques which may or may not be part of the process of designing a system for a particular application include the following:

1. Fuzzy Logic

As discussed above, neural networks frequently exhibit the property that when presented with a situation that is totally different from any previously encounter, an irrational decision can result. Frequently when the trained observer looks at input data, certain boundaries to the data become evident and cases that fall outside of those boundaries are indicative of either corrupted data or data from a totally unexpected situation. It is sometimes desirable for the system designer to add rules to handle these cases. These can be fuzzy logic based rules or rules based on human intelligence. One example would be that when certain parts of the data vector fall outside of expected bounds that the system defaults to an airbag enable state.

2. Genetic Algorithms

When developing a neural network algorithm for a particular vehicle, there is no guarantee that the best of all possible algorithms has been selected. One method of improving the probability that the best algorithm has been selected is to incorporate some of the principles of genetic algorithms. In one application of this theory, the network architecture and/or the node weights are varied pseudo-randomly to attempt to find other combinations which have higher success rates. The discussion of such genetic algorithms systems appears in the book Computational Intelligence referenced above.

3. Pre-processing

For military target recognition is common to use the Fourier transform of the data rather than the data itself. This can be especially valuable for categorization as opposed to location of the occupant and the vehicle. When used with a modular network, for example, the Fourier transform of the data may be used for the categorization neural network and the non-transformed data used for the position determination neural network. Recently wavelet transforms have also been considered as a preprocessor.

4. Occupant Position Determination Comparison

Above, under the subject of dynamic out-of-position, it was discussed that the position of the occupant can be used as a filter to determine the quality of the data in a particular vector. This technique can also be used in general as a method to improve the quality of a vector of data based on the previous positions of the occupant. This technique can also be expanded to help differentiate live objects in the vehicle from inanimate objects. For example, a forward facing human will change his position frequently during the travel of the vehicle whereas a box will tend to show considerably less motion. This is also useful, for example, in differentiating a small human from an empty seat. The motion of a seat containing a small human will be significantly different from that of an empty seat even though the particular vector may not show significant differences. That is, a vector formed from the differences from two successive vectors is indicative of motion and thus of an occupant.

5. Blocked Transducers

It is sometimes desirable to positively identify a blocked transducer and when such a situation is found to use a different neural network which has only been trained on the subset of unblocked transducers. Such a network, since it has been trained specifically on three transducers, for example, will generally perform more accurately than a network which has been trained on four transducers with one of the transducers blocked some of the time. Once a blocked transducer has been identified the occupant can be notified if the condition persists for more than a reasonable time.

6. Other Basic Architectures

The back propagation neural network is a very successful general-purpose network. However, for some applications, there are other neural network architectures that can perform better. If it has been found, for example, that a parallel network as described above results in a significant improvement in the system, then, it is likely that the particular neural network architecture chosen has not been successful in retrieving all of the information that is present in the data. In such a case, an RCE, Stochastic, Logicon Projection, or one of the other approximately 30 types of neural network architectures can be tried to see if the results improve. This parallel network test, therefore, is a valuable tool for determining the degree to which the current neural network is capable of using efficiently the available data.

7. Transducer Geometry

Another technique, which is frequently used in designing a system for a particular vehicle, is to use a neural network to determine the optimum mounting locations, aiming or orientation directions and field angles of transducers. For particularly difficult vehicles, it is sometimes desirable to mount a large number of ultrasonic transducers, for example, and then use the neural network to eliminate those transducers which are least significant. This is similar to the technique described above where all kinds of transducers are combined initially and later pruned.

8. Data Quantity

Since it is very easy to take large amounts data and yet large databases require considerably longer training time for a neural network, a test of the variability of the database can be made using a neural network. If, for example, after removing half of the data in the database, the performance of a trained neural network against the validation database does not decrease, then the system designer suspects that the training database contains a large amount of redundant data. Techniques such as similarity analysis can then be used to remove data that is virtually indistinguishable from other data. Since it is important to have a varied database, it is undesirable generally to have duplicate or essentially duplicate vectors in the database since the presence of such vectors can bias the system and drive the system more toward memorization and away from generalization.

9. Environmental Factors

An evaluation can be made of the beneficial effects of using varying environmental influences, such as temperature, during data collection on the accuracy of the system using neural networks along with a technique such as design of experiments.

10. Database Makeup

It is generally believed that the training database must be flat, meaning that all of the occupancy states that the neural network must recognize must be approximately equally represented in the training database. Typically, the independent database has approximately the same makeup as the training database. The validation database, on the other hand, typically is represented in a non-flat basis with representative cases from real world experience. Since there is no need for the validation database to be flat, it can include many of the extreme cases as well as being highly biased towards the most common cases. This is the theory that is currently being used to determine the makeup of the various databases. The success of this theory continues to be challenged by the addition of new cases to the validation database. When significant failures are discovered in the validation database, the training and independent databases are modified in an attempt to remove the failure.

11. Biasing

All seated state occupancy states are not equally important. The final system must be nearly 100% accurate for forward facing "in-position" humans. Since that will comprise the majority of the real world situations, even a small loss in accuracy here will cause the airbag to be disabled in a situation where it otherwise would be available to protect an occupant. A small decrease in accuracy will thus result in a large increase in deaths and injuries. On the other hand, there are no serious consequences if the airbag is deployed occasionally when the seat is empty. Various techniques are used to bias the data in the database to take this into account. One technique is to give a much higher value to the presence of a forward facing human during the supervised learning process than to an empty seat. Another technique is to include more data for forward facing humans than for empty seats. This, however, can be dangerous as an unbalanced network leads to a loss of generality.

12. Screening

It is important that the loop be closed on data acquisition. That is, the data must be checked at the time the data is acquired to the sure that it is good data. Bad data can happen because of electrical disturbances on the power line, sources of ultrasound such as nearby welding equipment, or due to human error. if the data remains in the training database, for example, then it will degrade the performance of the network. Several methods exist for eliminating bad data. The most successful method is to take an initial quantity of data, such as 30,000 to 50,000 vectors, and create an interim network. This is normally done anyway as an initial check on the system capabilities prior to engaging in an extensive data collection process. The network can be trained on this data and, as the real training data is acquired, the data can be tested against the neural network created on the initial data set. Any vectors that fail are examined for reasonableness.

13. Vector Normalization Method

Through extensive research it has been found that the vector should be normalized based on all of the data in the vector, that is have all its data values range from 0 to 1. For particular cases, however, it has been fond desirable to apply the normalization process selectively, eliminating or treating differently the data at the early part of the data from each transducer. This is especially the case when there is significant ringing on the transducer or cross talk when a separate send and receive transducer is used. There are times when other vector normalization techniques are required and the neural network system can be used to determine the best vector normalization technique for a particular application.

14. Feature Extraction

The success of a neural network system can frequently be aided if additional data is inputted into the network. One example can be the number of 0 data points before the first peak is experience. Alternately, the exact distance to the first peak can be determined prior to the sampling of the data. Other features can include the number of peaks, the distance between the peaks, the width of the largest peak, the normalization factor, the vector mean or standard deviation, etc. These normalization techniques are frequently used at the end of the adaptation process to slightly increase the accuracy of the system.

15. Noise

It has been frequently reported in the literature that adding noise to the data that is provided to a neural network can improve the neural network accuracy by leading to better generalization and away from memorization. However, the training of the network in the presence of thermal gradients has been shown to substantially eliminate the need to artificially add noise to the data. Nevertheless, in some cases, improvements have been observed when random arbitrary noise of a rather low level is superimposed on the training data.

16. Photographic recording of the setup

After all of the data has been collected and used to train a neural network, it is common to find a significant number of vectors which, when analyzed by the neural network, give a weak or wrong decision. These vectors must be carefully studied especially in comparison with adjacent vectors to see if there is an identifiable cause for the weak or wrong decision. Perhaps the occupant was on the borderline of the keep out zone and strayed into the keep out zone during a particular data collection event. For this reason, it is desirable to photograph each setup simultaneous with the collection of the data. This can be done using a camera mounted in a position whereby it obtains a good view of the seat occupancy. Sometimes several cameras are necessary to minimize the effects of blockage by a newspaper, for example. Having the photographic record of the data setup is also useful when similar results are obtained when the vehicle is subjected to road testing. During road testing, the camera is also present and the test engineer is required to initiate data collection whenever the system does not provide the correct response. The vector and the photograph of this real world test can later be compared to similar setups in the laboratory to see whether there is data that was missed in deriving the matrix of vehicle setups for training the vehicle.

17. Automation

When collecting data in the vehicle it is desirable to automate the motion of the vehicle seat, seatback, windows, visors etc. in this manner the positions of these items can be controlled and distributed as desired by the system designer. This minimizes the possibility of taking too much data at one configuration and thereby unbalancing the network.

18. Automatic Setup Parameter Recording

To achieve an accurate data set, the key parameters of the setup should be recorded automatically. These include the temperatures at various positions inside the vehicle, the position of the vehicle seat, and seatback, the position of the headrest, visor and windows and, where possible, the position of the vehicle occupants. The automatic recordation of these parameters minimizes the effects of human errors.

19. Laser Pointers

During the initial data collection with full horns mounted on the surface of the passenger compartment, care must the exercised so that the transducers are not accidentally moved during the data collection process. In order to check for this possibility, a small laser diode is incorporated into each transducer holder. The laser is aimed so that it illuminates some other surface of the passenger compartment at a known location. Prior to each data taking session, each of the transducer aiming points is checked.

20. Multi-frequency Transducer Placement

Figure 11:
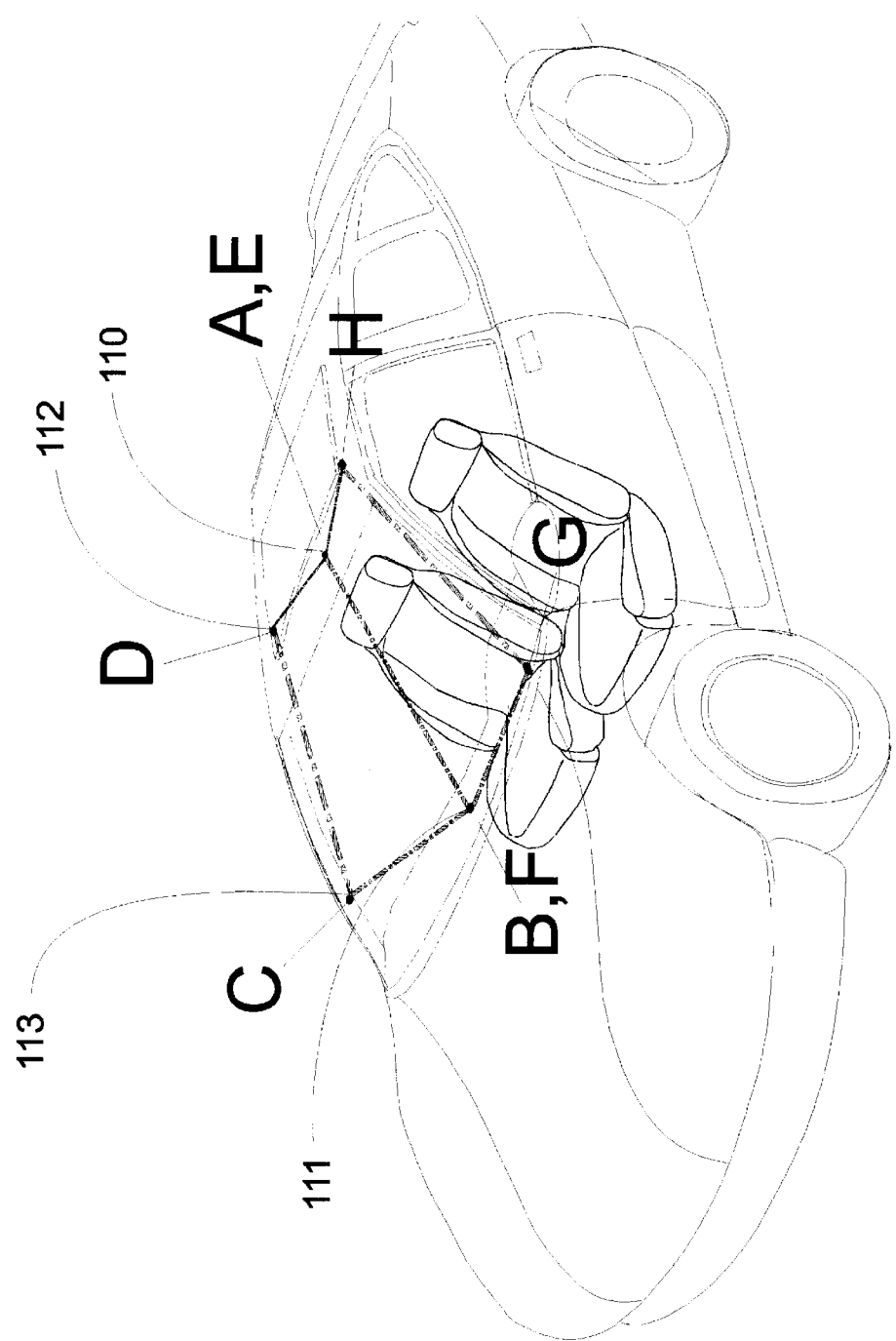
FIG. 11 illustrates a preferred mounting location of a eight-transducer system.

When data is collected for dynamic out-of-position, each of the ultrasonic transducers must operate at a different frequency so that all transducers can transmit simultaneously. By this method data can be collected every 10 milliseconds, which is sufficiently fast to approximately track the motion of an occupant during pre-crash braking prior to an impact. A problem arises in the spacing of the frequencies between the different transducers. If the spacing is too close, it becomes very difficult to separate the signals from different transducers and it also affects the sampling rate of the transducer data and thus the resolution of the transducers. If an ultrasonic transducer operates at a frequency much below about 35 kHz, it can be sensed by dogs and other animals. If the transducer operates at a frequency much above 70 kHz, it is very difficult to make the open type of ultrasonic transducer which produces the highest sound pressure. If the multiple frequency system is used for both the driver and passenger-side, eight separate frequencies are required. In order to find eight frequencies between 35 and 70 kHz, a frequency spacing of 5 kHz is required. In order to use conventional electronic filters and to provide sufficient spacing to permit the desired resolution at the keep out zone border, a 10 kHz spacing is desired. These incompatible requirements can be solved through a careful judicious placement of the transducers such that transducers that are within 5 kHz of each other are placed in such a manner that there is no direct path between the transducers and any indirect path is sufficiently long so that it can be filtered temporally. An example of such an arrangement is shown on FIG. 11. For this example, the transducers operate at the following frequencies A 65 kHz, B 55 kHz, C 35 kHz, D 45 kHz, E 50 kHz, F 40 kHz, G 60 kHz, H 70 kHz. Actually, other arrangements adhering to the principle described above would also work.

21. Use of a PC in Data Collection

When collecting data for the training, independent, and validation databases, it is frequently desirable to test the data using various screening techniques and to display the data on a monitor. Thus, during data collection the process is usually monitored using a desktop PC for data taken in the laboratory and a laptop PC for data taken on the road.

22. Use of Referencing Markers and Gages

In addition to and sometimes as a substitution for, the automatic recording of the positions of the seats, seatbacks, windows etc. as described above, a variety of visual markings and gages are frequently used. This includes markings to show the angular position of the seatback, the location of the seat on the seat track, the openness of the window, etc. Also in those cases where automatic tracking of the occupant is not implemented, visual markings are placed such that a technician can observe that the test occupant remains within the required zone for the particular data taking exercise. Sometimes, a laser diode is used to create a visual line in the space that represents the boundary of the keep out zone or other desired zone boundary.

It is important to realize that the adaptation process described herein applies to any combination of transducers that provide information about the vehicle occupancy. These include weight sensors, capacitive sensors, inductive sensors, moisture sensors, ultrasonic, optic, infrared, radar among others. The adaptation process begins with a selection of candidate transducers for a particular vehicle model. This selection is based on such considerations as cost, alternate uses of the system other than occupant sensing, vehicle interior passenger compartment geometry, desired accuracy and reliability, vehicle aesthetics, vehicle manufacturer preferences, and others. Once a candidate set of transducers has been chosen, these transducers are mounted in the test vehicle according to the teachings of this invention. The vehicle is then subjected to an extensive data collection process wherein various objects are placed in the vehicle at various locations as described below and an initial data set is collected. A pattern recognition system is then developed using the acquired data and an accuracy assessment is made. Further studies are made to determine which, if any, of the transducers can be eliminated from the design. In general the design process begins with a surplus of sensors plus an objective as to how many sensors are to be in the final vehicle installation. The adaptation process can determine which of the transducers are most important and which are least important and the least important transducers can be eliminated to reduce system cost and complexity.

Although several preferred methods are illustrated and described above, there are other possible combinations using different sensors located at different positions within the automobile passenger compartment which measure either the same or different characteristics of an occupying object to accomplish the same or similar goals as those described herein. There are also numerous additional applications in addition to those described above including, but not limited to, monitoring the driver seat, the center seat or the rear seat of the vehicle or for controlling other vehicle systems in addition to the airbag system. This invention is not limited to the above embodiments and should be determined by the following claims.

Appendix 1

Analysis of Neural Network Training and Data Preprocessing Methods—An Example

1. Introduction

The Artificial Neural Network that forms the "brains" of the Occupant Spatial Sensor needs to be trained to recognize airbag enable and disable patterns. The most important part of this training is the data that is collected in the vehicle, which provides the patterns corresponding to these respective configurations. Manipulation of this data (such as filtering) is appropriate if this enhances the information contained in the data. Important too, are the basic network architecture and training methods applied, as these two determine the learning and generalization capabilities of the neural network. The ultimate test for all methods and filters is their effect on the network performance against real world situations.

The Occupant Spatial Sensor (OSS) uses an artificial neural network (ANN) to recognize patterns that it has been trained to identify as either airbag enable or airbag disable conditions. The pattern is obtained from four ultrasonic transducers that cover the front passenger seating area. This pattern consists of the ultrasonic echoes from the objects in the passenger seat area. The signal from each of the four transducers consists of the electrical image of the return echoes, which is processed by the electronics. The electronic processing comprises amplification (logarithmic compression), rectification, and demodulation (band pass filtering), followed by discretization (sampling) and digitization of the signal. The only software processing required, before this signal can be fed into the artificial neural network, is normalization (i.e. mapping the input to numbers between 0 and 1). Although this is a fair amount of processing, the resulting signal is still considered "raw", because all information is treated equally.

It is possible to apply one or more software preprocessing filters to the raw signal before it is fed into the artificial neural network. The purpose of such filters is to enhance the useful information going into the ANN, in order to increase the system performance. This document describes several preprocessing filters that were applied to the ANN training of a particular vehicle.

2. Data Description

The performance of the artificial neural network is dependent on the data that is used to train the network. The amount of data and the distribution of the data within the realm of possibilities are known to have a large effect on the ability of the network to recognize patterns and to generalize. Data for the OSS is made up of vectors. Each vector is a combination of the useful parts of the signals collected from four ultrasonic transducers. A typical vector could comprise on the order of 100 data points, each representing the (time displaced) echo level as recorded by the ultrasonic transducers.

Three different sets of data are collected. The first set, the training data, contains the patterns that the ANN is being trained on to recognize as either an airbag deploy or non-deploy scenario. The second set is the independent test data. This set is used during the network training to direct the optimization of the network weights. The third set is the validation (or real world) data. This set is used to quantify the success rate (or performance) of the finalized artificial neural network.

FIG. 26 shows the main characteristics of these three data sets, as collected for the vehicle. Three numbers characterize the sets. The number of configurations characterizes how many different subjects and objects were used. The number of setups is the product of the number of configurations and the number of vehicle interior variations (seat position and recline, roof and window state, etc.) performed for each configuration. The total number of vectors is then made up of the product of the number of setups and the number of patterns collected while the subject or object moves within the passenger volume.

1.1 Training Data Set Characteristics

The training data set can be split up in various ways into subsets that show the distribution of the data. FIG. 27 shows the distribution of the training set amongst three classes of passenger seat occupancy: Empty Seat, Human Occupant, and Child Seat. All human occupants were adults of various sizes. No children were part of the training data set other then those seated in Forward Facing Child Seats. FIG. 28 shows a further breakup of the Child Seats into Forward Facing Child Seats, Rearward Facing Child Seats, Rearward Facing Infant Seats, and out-of-position Forward Facing Child Seats. FIG. 29 shows a different type of distribution; one based on the environmental conditions inside the vehicle.

1.2 Independent Test Data Characteristics

The independent test data is created using the same configurations, subjects, objects, and conditions as used for the training data set. Its makeup and distributions are therefore the same as those of the training data set.

1.3 Validation Data Characteristics

The distribution of the validation data set into its main subsets is shown in FIG. 30. This distribution is close to that of the training data set. However, the human occupants comprised both children (12% of total) as well as adults (27% of total). FIG. 31 shows the distribution of human subjects. Contrary to the training and independent test data sets, data was collected on children ages 3 and 6 that were not seated in a child restraint of any kind. FIG. 32 shows the distribution of the child seats used. On the other hand, no data was collected on Forward Facing Child Seats that were out-of-position. The child and infant seats used in this data set are different from those used in the training and independent test data sets. The validation data was collected with varying environmental conditions as shown in FIG. 33.

The baseline network consisted of a four layer back-propagation network with 117 input layer nodes, 20 and 7 nodes respectively in the two hidden layers, and 1 output layer node. The input layer is made up of inputs from four ultrasonic transducers. These were located in the vehicle on the rear quarter panel (A), the A-pillar (B), and the over-head console (C, H). FIG. 34 shows the number of points, taken from each of these channels that make up one vector.

The artificial neural network is implemented using the NeuralWorks Professional II/Plus software. The method used for training the decision mathematical model was back-propagation with Extended Delta-Bar-Delta learning rule and sigmoid transfer function. The Extended DBD paradigm uses past values of the gradient to infer the local curvature of the error surface. This leads to a learning rule in which every connection has a different learning rate and a different momentum term, both of which are automatically calculated.

The network was trained using the above-described training and independent test data sets. An optimum (against the independent test set) was found after 3,675,000 training cycles. Each training cycle uses 30 vectors (known as the epoch), randomly chosen from the 650,000 available training set vectors. FIG. 35 shows the performance of the baseline network.

The network performance has been further analyzed by investigating the success rates against subsets of the independent test set. The success rate against the airbag enable conditions at 94.6% is virtually equal to that against the airbag disable conditions at 94.4%. FIG. 36 shows the success rates for the various occupancy subsets. FIG. 37 shows the success rates for the environmental conditions subsets. Although the distribution of this data was not entirely balanced throughout the matrix, it can be concluded that the system performance is not significantly degraded by heat sources.

3.1 Normalization

Normalization is used to scale the real world data range into a range acceptable for the network training. The NeuralWorks software requires the use of a scaling factor to bring the input data into a range of 0 to 1, inclusive. Several normalization methods have been explored for their effect on the system performance.

Figure 38:
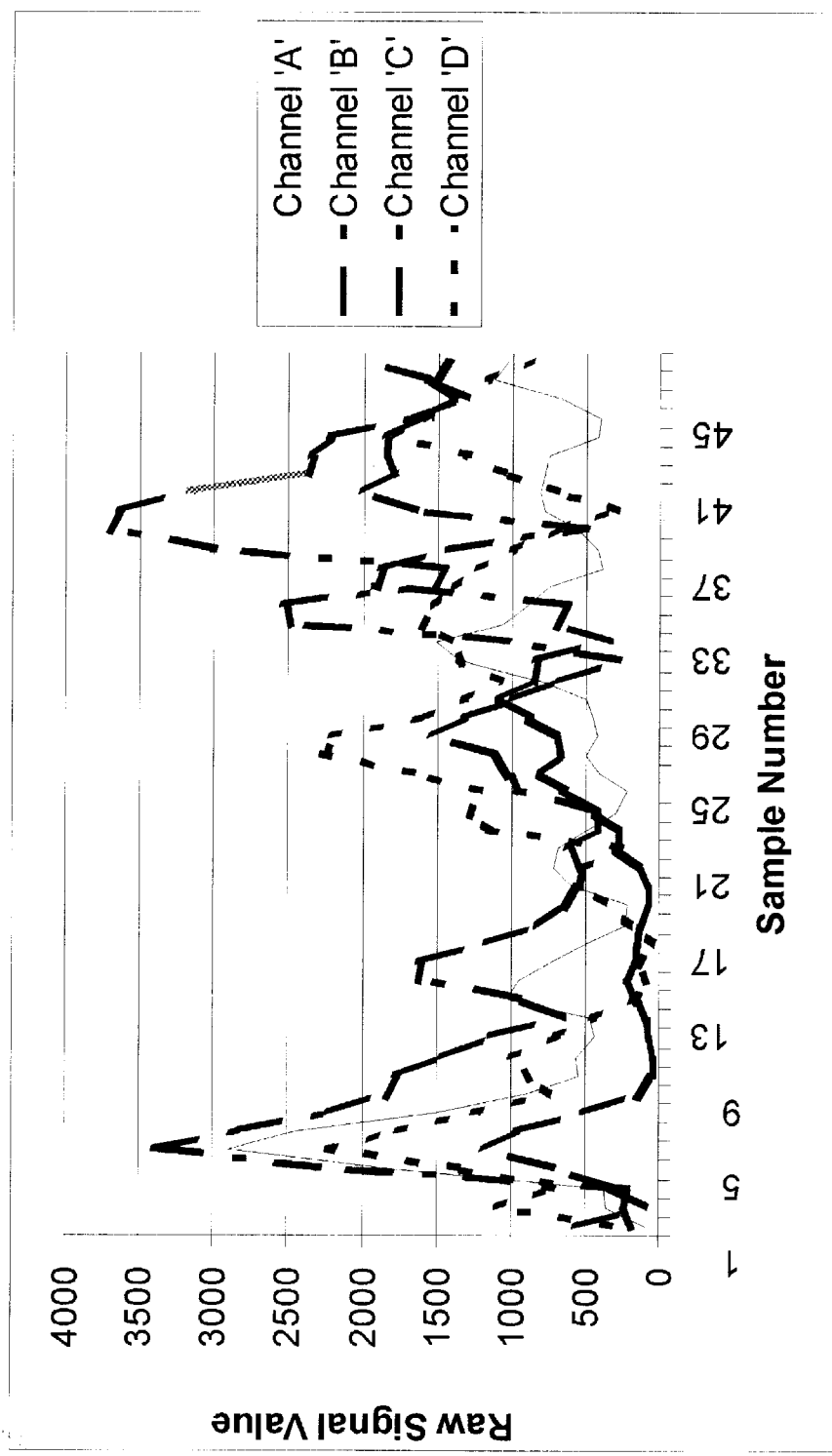
FIG. 38 is a chart of four typical raw signals which are combined to constitute a vector.

The real world data consists of 12 bit, digitized signals with values between 0 and 4095. FIG. 38 shows a typical raw signal. A raw vector consists of combined sections of four signals.

Chart 1 Sample Raw Input Signal

Three methods of normalizaton of the individual vectors have been investigated:

a. Normalization using the highest and lowest value of the entire vector (baseline).
b. Normalization of the transducer channels that make up the vector, individually. This method uses the highest and lowest values of each channel.
c. Normalization with a fixed range ([0,4095]).

The results of the normalization study are summarized in FIG. 39.

A higher performance results from normalizing across the entire vector versus normalizing per channel. This can be explained from the fact that the baseline method retains the information contained in the relative strength of the signal from one transducer compared to another. This information is lost when using the second method.

Normalization using a fixed range retains the information contained in the relative strength of one vector compared to the next. From this it could be expected that the performance of the network trained with fixed range normalization would increase over that of the baseline method. However, without normalization, the input range is, as a rule, not from zero to the maximum value (see FIG. 39). The absolute value of the data at the input layer affects the network weight adjustment (see equations (1) and (2)). During network training, vectors with a smaller input range will affect the weights calculated for each $$\Delta w_{ij}^{[s]} = \text{lcoef} \cdot e_j^{[s]} \cdot x_i^{[s-1]} \quad [1]$$

$$e_j^{[s]} = x_j^{[s]} \cdot (1.0 - x_j^{[s]}) \cdot \Delta_k(e_k^{[s+1]} \cdot w_{kj}^{[s+]}) \quad [2]$$

$\Delta w_{ij}^{[s]}$ is the change in the network weights; lcoef is the learning coefficient; $e_j^{[s]}$ is the local error at neuron j in layer s; $x_i^{[s]}$ is the current output state of neuron j in layer s.

Variations in the highest and lowest values in the input layer, therefore, have a negative effect on the training of the network. This is reflected in a lower performance against the validation data set.

A secondary effect of normalization is that it increases the resolution of the signal by stretching it out over the full range of 0 to 1, inclusive. As the network predominantly learns from higher peaks in the signal, this results in better generalization capabilities and therefore in a higher performance.

It must be concluded that the effects of the fixed range of input values and the increased resolution resulting from the baseline normalization method have a stronger effect on the network training than retaining the information contained in the relative vector strength.

3.2 Low Threshold Filters

Not all information contained in the raw signals can be considered useful for network training. Low amplitude echoes are received back from objects on the outskirts of the ultrasonic field that should not be included in the training data. Moreover, low amplitude noise, from various sources, is contained within the signal. This noise shows up strongest where the signal is weak. By using a low threshold filter, the signal to noise ratio of the vectors can be improved before they are used for network training.

Three cutoff levels were used: 5%, 10%, and 20% of the signal maximum value (4095). The method used, brings the values below the threshold up to the threshold level. Subsequent vector normalization (baseline method) stretches the signal to the fill range of [0,1].

The results of the low threshold filter study are summarized in FIG. 40.

The performance of the networks trained with 5% and 10% threshold filter is similar to that of the baseline network. A small performance degradation is observed for the network trained with a 20% threshold filter. From this it is concluded that the noise level is sufficiently low to not affect the network training. At the same time it can be concluded that the lower 10% of the signal can be discarded without affecting the network performance. This allows the definition of demarcation lines on the outskirts of the ultrasonic field where the signal is equal to 10% of the maximum field strength.

4. Network Types

The baseline network is a back-propagation type network. Back-propagation is a general-purpose network paradigm that has been successfully used for prediction, classification, system modeling, and filtering as well as many other general types of problems. Back propagation learns by calculating an error between desired and actual output and propagating this error information back to each node in the network. This back-propagated error is used to drive the learning at each node. Some of the advantages of a back-propagation network are that it attempts to minimize the global error and that it can provide a very compact distributed representation of complex data sets. Some of the disadvantages are its slow learning and the irregular boundaries and unexpected classification regions due to the distributed nature of the network and the use of a transfer functions that is unbounded. Some of these disadvantages can be overcome by using a modified back-propagation method such as the Extended Delta-Bar-Delta paradigm. The EDBD algorithm automatically calculates the learning rate and momentum for each connection in the network, which facilitates optimization of the network training.

Many other network architectures exist that have different characteristics than the baseline network. One of these is the Logicon Projection Network. This type of network combines the advantages of closed boundary networks with those of open boundary networks (to which the back-propagation network belongs). Closed boundary networks are fast learning because they can immediately place prototypes at the input data points and match all input data to these prototypes. Open boundary networks, on the other hand, have the capability to minimize the output error through gradient decent.

5. Conclusions

The baseline artificial neural network trained to a success rate of 92.7% against the validation data set. This network has a four-layer back-propagation architecture and uses the Extended Delta-Bar-Delta learning rule and sigmoid transfer function. Pre-processing comprised vector normalization while post-processing comprised a "five consistent decision" filter.

The objects and subjects used for the independent test data were the same as those used for the training data. This may have negatively affected the networks classification generalization abilities.

The spatial distribution of the independent test data was as wide as that of the training data. This has resulted in a network that can generalize across a large spatial volume. A higher performance across a smaller volume, located immediately around the peak of the normal distribution, combined with a lower performance on the outskirts of the distribution curve, might be preferable.

To achieve this, the distribution of the independent test set needs to be a reflection of the normal distribution for the system (a.k.a. native population).

Modifying the pre-processing method or applying additional pre-processing methods did not show a significant improvement of the performance over that of the baseline network. The baseline normalization method gave the best results as it improves the learning by keeping the input values in a fixed range and increases the signal resolution. The lower threshold study showed that the network learns from the larger peaks in the echo pattern. Pre-processing techniques should be aimed at increasing the signal resolution to bring out these peaks.

A further study could be performed to investigate combining a lower threshold with fixed range normalization, using a range less than full scale. This would force each vector to include at least one point at the lower threshold value and one value in saturation, effectively forcing each vector into a fixed range that can be mapped between 0 and 1, inclusive. This would have the positive effects associated with the baseline normalization, while retaining the information contained in the relative vector strength. Raw vectors points that, as a result of the scaling, would fall outside the range of 0 to 1 would then be mapped to 0 and 1 respectively.

Post-processing should be used to enhance the network recognition ability with a memory function. The possibilities for such are currently frustrated by the necessity of one network performing both object classification as well as spatial locating functions. Performing the spatial locating function requires flexibility to rapidly update the system status. Object classification, on the other hand, benefits from decision rigidity to nullify the effect of an occasional pattern that is incorrectly classified by the network.

Appendix 2
Process for Training an OPS System DOOP Network for a Specific Vehicle
1. Define customer requirements and deliverables
   1.1. Number of zones
   1.2. Number of outputs
   1.3. At risk zone definition
   1.4. Decision definition i.e. empty seat at risk, safe seating, or not critical and undetermined
   1.5. Determine speed of DOOP decision
2. Develop PERT chart for the program
3. Determine viable locations for the transducer mounts
   3.1. Manufacturability
   3.2. Repeatability
   3.3. Exposure (not able to damage during vehicle life)
4. Evaluate location of mount logistics
   4.1. Field dimensions
   4.2. Multipath reflections
   4.3. Transducer Aim
   4.4. Obstructions/Unwanted data
   4.5. Objective of view
   4.6. Primary DOOP transducers requirements
5. Develop documentation logs for the program (vehicle books)
6. Determine vehicle training variables
   6.1. Seat track stops
   6.2. Steering wheel stops
   6.3. Seat back angles
   6.4. DOOP transducer blockage during crash
   6.5. Etc . . .
7. Determine and mark at risk zone in vehicle
8. Evaluate location physical impediments
   8.1. Room to mount/hide transducers
   8.2. Sufficient hard mounting surfaces
   8.3. Obstructions
9. Develop matrix for training, independent, validation, and DOOP data sets
10. Determine necessary equipment needed for data collection
    10.1. Child/booster/infant seats
    10.2. Maps/razors/makeup
    10.3. Etc . . .
11. Schedule sled tests for initial and final DOOP networks
12. Design test buck for DOOP
13. Design test dummy for DOOP testing
14. Purchase any necessary variables
    14.1. Child/booster/infant seats
    14.2. Maps/razors/makeup
    14.3. Etc . . .
15. Develop automated controls of vehicle accessories
    15.1. Automatic seat control for variable empty seat
    15.2. Automatic seat back angle control for variable empty seat
    15.3. Automatic window control for variable empty seat
    15.4. Etc . . .
16. Acquire equipment to build automated controls
17. Build & install automated controls of vehicle variables
18. Install data collection aides
    18.1. Thermometers
    18.2. Seat track gauge
    18.3. Seat angle gauge
    18.4. Etc . . .
19. Install switched and fused wiring for:
    19.1. Transducer pairs
    19.2. Lasers
    19.3. Decision Indicator Lights
    19.4. System box
    19.5. Monitor
    19.6. Power automated control items
    19.7. Thermometers, potentiometers
    19.8. DOOP occupant ranging device
    19.9. DOOP ranging indicator
    19.10. Etc . . .
20. Write DOOP operating software for OPS system box
21. Validate DOOP operating software for OPS
22. Build OPS system control box for the vehicle with special DOOP operating software
23. Validate & document system control box
24. Write vehicle specific DOOP data collection software (pollbin)
25. Write vehicle specific DOOP data evaluation program (picgraph)
26. Evaluate DOOP data collection software
27. Evaluate DOOP data evaluation software
28. Load DOOP data collection software on OPS system box and validate
29. Load DOOP data evaluation software on OPS system box and validate
30. Train technicians on DOOP data collection techniques and use of data collection software
31. Design prototype mounts based on known transducer variables
32. Prototype mounts
33. Pre-build mounts
    33.1. Install transducers in mounts 33.2. Optimize to eliminate crosstalk
33.3. Obtain desired field
33.4. Validate performance of DOOP requirements for mounts
34. Document mounts
34.1. Polar plots of fields
34.2. Drawings with all mount dimensions
34.3. Drawings of transducer location in the mount
35. Install mounts in the vehicle
36. Map fields in the vehicle using ATI designed apparatus and specification
37. Map performance in the vehicle of the DOOP transducer assembly
38. Determine sensor volume
39. Document vehicle mounted transducers and fields
39.1. Mapping per ATI specification
39.2. Photographs of all fields
39.3. Drawing and dimensions of installed mounts
39.4. Document sensor volume
39.5. Drawing and dimensions of aim & field
40. Using data collection software and OPS system box collect initial 16 sheets of training, independent, and validation data
41. Determine initial conditions for training the ANN
41.1. Normalization method
41.2. Training via back propagation or ?
41.3. Weights
41.4. Etc . . .
42. Pre-process data
43. Train an ANN on above data
44. Develop post processing strategy if necessary
45. Develop post processing software
46. Evaluate ANN with validation data and in vehicle analysis
47. Perform sled tests to confirm initial DOOP results
48. Document DOOP testing results and performance
49. Rework mounts and repeat steps 31 through 48 if necessary
50. Meet with customer and review program
51. Develop strategy for customer directed outputs
51.1. Develop strategy for final ANN multiple decision networks if necessary
51.2. Develop strategy for final ANN multiple layer networks if necessary
51.3. Develop strategy for DOOP layer I network
52. Design daily calibration jig
53. Build daily calibration jig
54. Develop daily calibration test
55. Document daily calibration test procedure & jig
56. Collect daily calibration tests
57. Document daily calibration test results
58. Rework vehicle data collection markings for customer directed outputs
58.1. Multiple zone identifiers for data collection
59. Schedule subjects for all data sets
60. Train subjects for data collection procedures
61. Using DOOP data collection software and OPS system box collect initial 16 sheets of training, independent, and validation data
62. Collect total amount of vectors deemed necessary by program directives, amount will vary as outputs and complexity of ANN varies
63. Determine initial conditions for training the ANN
63.1. Normalization method
63.2. Training via back propagation or ?
63.3. Weights
63.4. Etc . . .
64. Pre-process data
65. Train an ANN on above data
66. Develop post processing strategy
66.1. Weighting
66.2. Averaging
66.3. Etc . . .
67. Develop post processing software
68. Evaluate ANN with validation data
69. Perform in vehicle hole searching and analysis
70. Perform in vehicle non sled mounted DOOP tests
71. Determines need for further training or processing
72. Repeat steps 58 through 71 if necessary
73. Perform sled tests to confirm initial DOOP results
74. Document DOOP testing results and performance
75. Repeat steps 58 through 74 if necessary
76. Write summary performance report
77. Presentation of vehicle to the customer
78. Delivered an OPS equipped vehicle to the customer

We claim:

1. A vehicle including a system for determining the occupancy state of a seat in the vehicle occupied by an occupying item, the system comprising:

a plurality of transducers arranged in the vehicle, each of said transducers providing data relating to the occupancy state of the seat; and processor means coupled to said transducers for receiving the data from said transducers and processing the data to obtain an output indicative of the current occupancy state of the seat, said processor means comprising a trained combination neural network created from a plurality of data sets, each of said data sets representing a different occupancy state of the seat and being formed from data from said transducers while the seat is in that occupancy state, said combination neural network producing the output indicative of the current occupancy state of the seat upon inputting a data set representing the current occupancy state of the seat and being formed from data from at least some of said transducers.

2. The vehicle of claim 1, wherein said combination neural network comprises a neural network trained to determine the type of the occupying item based on data from at least some of said transducers.

3. The vehicle of claim 1, wherein said combination neural network comprises a neural network trained to determine the size of the occupying item based on data from at least some of said transducers.

4. The vehicle of claim 1, wherein said combination neural network comprises a neural network trained to determine the position of the occupying item based on data from at least some of said transducers.

5. The vehicle of claim 1, wherein said combination neural network comprises a first neural network trained to determine the type of the occupying item based on data from at least some of said transducers and a second neural network trained to determine the size of the occupying item based on data from at least some of said transducers.

6. The vehicle of claim 5, wherein said combination neural network further comprises a plurality of additional neural networks, each trained to determine the position of the occupying item for a particular size of occupying item based on data from at least some of said transducers, one of said plurality of additional neural networks determining the position after said second neural network determines size.

7. The vehicle of claim 6, wherein said combination neural network comprises a feedback loop wherein the determination of the position at one instance is used as input into one of said plurality of additional neural networks at a subsequent instance.

8. The vehicle of claim 1, wherein said combination neural network comprises a feedback loop wherein the determination of the occupancy state at one instance is used as input into said combination neural network at a subsequent instance.

9. The vehicle of claim 1, wherein said combination neural network comprises a first neural network trained to identify the occupying item based on data from at least some of said transducers and a second neural network trained to determine the position of the occupying item based on data from at least some of said transducers.

10. The vehicle of claim 1, wherein said combination neural network comprises a first neural network trained to determine the current occupancy state of the seat based on data from at least some of said transducers and a second neural network trained to determine whether the data set representing the current occupancy state of the seat and formed from data from said transducers is similar to a data set on which said first neural network is trained whereby said second neural network prevents unreasonable data sets from being input to said first neural network.

11. The vehicle of claim 1, wherein said combination neural network comprises a first neural network trained to determine whether the occupying item is a child seat based on data from at least some of said transducers, a second neural network trained to determine the orientation of the child seat based on data from at least some of said transducers when said first neural network determines that the occupying item is a child seat.

12. The vehicle of claim 11, wherein said combination neural network comprises a third neural network trained to determine the position of the child seat based on data from at least some of said transducers.

13. The vehicle of claim 1, wherein said combination neural network comprises a plurality of neural networks each trained to determine the occupancy state of the seat based on data from a respective set of said transducers whereby each set of transducers is different than other sets of transducers, said processor means being arranged to factor the determination of the occupancy states by said plurality of neural networks in the determination of the occupancy state of the seat.

14. The vehicle of claim 1, wherein said transducers include at least two ultrasonic sensors capable of receiving waves at least from a space above the seat, each of said ultrasonic sensors being arranged at a different location.

15. The vehicle of claim 14, wherein a first one of said two ultrasonic sensors is arranged on or adjacent to a ceiling of the vehicle and a second one of said two ultrasonic sensors is arranged at a different location in the vehicle such that an axis connecting said first and second ultrasonic sensors is substantially parallel to a second axis traversing a volume in the vehicle above the seat.

16. The vehicle of claim 14, wherein the system further comprises horns or grills for adjusting the transducer field angles of said ultrasonic sensors.

17. The vehicle of claim 1, wherein said transducers include four ultrasonic sensors capable of receiving waves at least from a space above the seat, said ultrasonic sensors being arranged at corners of an approximate rhombus which surrounds the seat.

18. The vehicle of claim 1, wherein said transducers include a plurality of ultrasonic sensors capable of transmitting waves at least into a space above the seat and receiving waves at least from the space above the seat, each of said ultrasonic sensors being arranged at a different location, said ultrasonic sensors having different transmitting and receiving frequencies and being arranged in the vehicle such that sensors having adjacent transmitting and receiving frequencies are not within a direct ultrasonic field of each other.

19. The vehicle of claim 1, wherein at least one of said transducers is a capacitive sensor.

20. The vehicle of claim 1, wherein said transducers are selected from a group consisting of seat belt buckle sensors, seatbelt payout sensors, infrared sensors, inductive sensors and radar sensors.

21. The vehicle of claim 1, wherein at least one of said transducers comprises a weight sensor for measuring the weight applied onto the seat.

22. The vehicle of claim 1, wherein said transducers are selected from a reclining angle detecting sensor for detecting a tilt angle of the seat between a back portion of the seat and a seat portion of the seat, a seat position sensor for detecting the position of the seat relative to a fixed reference point in the vehicle and a heartbeat sensor for sensing a heartbeat of an occupying item of the seat.

23. The vehicle of claim 1, wherein said transducers include a force, pressure or strain gage arranged to measure the weight applied to the entire seat.

24. The vehicle of claim 23, wherein the seat includes a support structure for supporting the seat above a floor of a passenger compartment of the vehicle, said force, pressure or strain gage being attached to the support structure.

25. The vehicle of claim 1, wherein said transducers include a plurality of electromagnetic wave sensors capable of receiving waves at least from a space above the seat, each of said electromagnetic wave sensors being arranged at a different location.

26. The vehicle of claim 1, wherein said transducers include wave-receiving sensors capable of receiving waves modified by passing through a space above the seat.

27. The vehicle of claim 26, wherein at least one of said wave-receiving sensors is a capacitive sensor.

28. A method of developing a system for determining the occupancy state of a seat in the vehicle occupied by at least one occupying item, comprising the steps of:

mounting transducers in the vehicle;

forming at least one database comprising multiple data sets, each of the data sets representing a different occupancy state of the seat and being formed by receiving data from the transducers while the seat is in that occupancy state, and processing the data received from the transducers;

creating a trained combination neural network from the at least one database capable of producing an output indicative of the occupancy state of the seat upon inputting a data set representing an occupancy state of the seat; and inputting a data set representing the current occupancy state of the seat into the combination neural network to obtain the output indicative of the current occupancy state of the seat.

29. The method of claim 28, wherein the step of creating the combination neural network comprises the step of training a neural network to determine the type of the occupying item based on data from at least some of the transducers.

30. The method of claim 28, wherein the step of creating the combination neural network comprises the step of training a neural network to determine the size of the occupying item based on data from at least some of the transducers.

31. The method of claim 28, wherein the step of creating the combination neural network comprises the step of training a neural network to determine the position of the occupying item based on data from at least some of the transducers.

32. The method of claim 28, wherein the step of creating the combination neural network comprises the steps of training a first neural network to determine the type of the occupying item based on data from at least some of the transducers and training a second neural network to determine the size of the occupying item based on data from at least some of the transducers.

33. The method of claim 32, wherein the step of creating the combination neural network comprises the step of training a plurality of additional neural networks to determine the position of the occupying item for a respective, different size of occupying item based on data from at least some of the transducers.

34. The method of claim 33, wherein the step of creating the combination neural network further comprises the step of training the additional neural networks to consider the position of the occupying item at a prior time when determining the position for the current occupancy state.

35. The method of claim 28, wherein the step of creating the combination neural network comprises the steps of training a first neural network to identify the occupying item based on data from at least some of the transducers and training a second neural network to determine the position of the identified occupying item based on data from at least some of the transducers.

36. The method of claim 28, wherein the step of creating the combination neural network comprises the steps of training a first neural network to determine the current occupancy state of the seat based on data from at least some of the transducers and training a second neural network to determine whether the data set representing the current occupancy state of the seat and formed from data from the transducers is similar to a data set on which the first neural network is trained whereby the second neural network prevents unreasonable data sets from being input to the first neural network.

37. The method of claim 28, wherein the step of creating the combination neural network comprises the steps of training a first neural network to determine whether the occupying item is a child seat based on data from at least some of the transducers, and training a second neural network to determine the orientation of the child seat based on data from at least some of the transducers when the first neural network determines that the occupying item is a child seat.

38. The method of claim 37, wherein the step of creating the combination neural network further comprises the step of training a third neural network to determine the position of the child seat based on data from at least some of the transducers.

39. The method of claim 28, wherein the step of creating the combination neural network comprises the steps of training a plurality of neural networks to determine the occupancy state based on data from a respective set of the transducers whereby each set of transducers is different than other sets of transducers, further comprising the step of factoring the determination of the occupancy states by the plurality of neural networks in the determination of the occupancy state.

40. The method of claim 28, further comprising the step of:
pre-processing the data prior to processing the data to form the data sets.

41. The method of claim 40, wherein the pre-processing step comprises the step of using data created from features of the data in the data set.

42. The method of claim 28, further comprising the step of:
biasing the combination neural network toward a particular occupancy state thereby increasing the accuracy of identifying that occupancy state.

43. The method of claim 28, wherein the step of creating the combination neural network further comprises the step of training the combination neural network to consider the occupancy state at a prior time when determining the current occupancy state.

44. A method of developing a database for use in developing a system for determining the occupancy state of a vehicle seat by an occupying item, comprising the steps of:
mounting transducers in the vehicle;
providing the seat with an initial occupancy state;
receiving data from the transducers;
processing the data from the transducers to form a data set representative of the initial occupancy state of the vehicle seat;
changing the occupancy state of the seat and repeating the data collection process to form another data set;
collecting at least 1000 data sets into a first database, each data set representing a different occupancy state of the seat;
creating a trained combination neural network from the first database which correctly identifies the occupancy state of the seat for most of the data sets in the first database;
testing the combination neural network using a second database of data sets which were not used in the creation of the combination neural network;
identifying the occupancy states in the second database which were not correctly identified by the combination neural network;
collecting new data comprising similar occupancy states to the incorrectly identified states;
combining this new data with the first database;
creating a new combination neural network based on the combined database; and
repeating this process until the desired accuracy of the combination neural network is achieved.

45. The method of claim 44, wherein the step of creating the combination neural network comprises the step of training a neural network to determine the type of the occupying item based on data from at least some of the transducers.

46. The method of claim 44, wherein the step of creating the combination neural network comprises the step of training a neural network to determine the size of the occupying item based on data from at least some of the transducers.

47. The method of claim 44, wherein the step of creating the combination neural network comprises the step of training a neural network to determine the position of the occupying item based on data from at least some of the transducers.

48. The method of claim 44, wherein the step of creating the combination neural network comprises the steps of training a first neural network to determine the type of the occupying item based on data from at least some of the transducers and training a second neural network to determine the size of the occupying item based on data from at least some of the transducers.

49. The method of claim 48, wherein the step of creating the combination neural network comprises the step of training a plurality of additional neural networks to determine the position of the occupying item for a respective, different size of occupying item based on data from at least some of the transducers.

50. The method of claim 49, wherein the step of creating the combination neural network further comprises the step of training the additional neural networks to consider the position of the occupying item at a prior time when determining the position for the current occupancy state.

51. The method of claim 44, wherein the step of creating the combination neural network comprises the steps of training a first neural network to identify the occupying item based on data from at least some of the transducers and training a second neural network to determine the position of the identified occupying item based on data from at least some of the transducers.

52. The method of claim 44, wherein the step of creating the combination neural network comprises the steps of training a first neural network to determine the current occupancy state of the seat based on data from at least some of the transducers and training a second neural network to determine whether the data set representing the current occupancy state of the seat and formed from data from the transducers is similar to a data set on which the first neural network is trained whereby the second neural network prevents unreasonable data sets from being input to the first neural network.

53. The method of claim 44, wherein the step of creating the combination neural network comprises the steps of training a first neural network to determine whether the occupying item is a child seat based on data from at least some of the transducers, and training a second neural network to determine the orientation of the child seat based on data from at least some of the transducers when the first neural network determines that the occupying item is a child seat.

54. The method of claim 53, wherein the step of creating the combination neural network further comprises the step of training a third neural network to determine the position of the child seat based on data from at least some of the transducers.

55. The method of claim 44, wherein the step of creating the combination neural network comprises the steps of training a plurality of neural networks to determine the occupancy state of the seat based on data from a respective set of the transducers whereby each set of transducers is different than other sets of transducers, further comprising the step of factoring the determination of the occupancy states by the plurality of neural networks in the determination of the occupancy state.

56. The method of claim 44, wherein the step of creating the combination neural network comprises the step of training a plurality of neural networks to perform a respective, different function.

57. The method of claim 56, wherein the step of creating the combination neural network comprises the step of training the plurality of neural networks on different data sets of the first database.

58. The method of claim 44, further comprising the step of:
pre-processing the data prior to processing the data to form the data sets.

59. The method of claim 58, wherein the pre-processing step comprises the step of using data created from features of the data in the data set.

60. The method of claim 44, further comprising the step of:
biasing the combination neural network toward a particular occupancy state thereby increasing the accuracy of identifying that occupancy state.

61. The method of claim 44, further comprising the step of:
creating some of the occupancy states of the seat using live human beings.

62. The method of claim 44, further comprising the step of:
varying the environmental conditions inside the vehicle while data is being collected.

63. The method of claim 62, wherein the environmental conditions varying step comprises the step of creating thermal gradients within the passenger compartment.

64. The method of claim 44, wherein the varying occupancy states are created by automatically moving various vehicle complements such as the seat and seatback during the data collection process.

65. The method of claim 44, further comprising the step of:
validating proper functioning of the transducers and the data collection process by using a standard occupancy state of the seat and corresponding prerecorded data set, wherein a data set is periodically taken of the standard occupancy state and compared with the prerecorded data set.

66. The method of claim 44, wherein the step of creating the combination neural network the step of training the combination neural network to consider the occupancy state at a prior time when determining the current occupancy state.

67. A method of developing a system for determining the occupancy state of a vehicle seat in a passenger compartment of a vehicle, comprising the steps of:
mounting a set of transducers on the vehicle;
receiving data from the transducers;
processing the data from transducers to form a data set representative of the occupancy state of the vehicle;
forming a database comprising multiple data sets;
creating a trained combination neural network from the database capable of producing an output indicative of the occupancy state of the vehicle seat upon inputting a new data set;
developing a measure of system accuracy;
removing at least one of the transducers from the transducer set;
creating a new database containing data only from the reduced number of transducers;
creating a new combination neural network based on the new database;
testing the new combination neural network to determine the new system accuracy; and
continuing the process of removing transducers, combination neural network creation and testing until the minimum number of sensors is determined which produces a combination neural network having desired accuracy.

68. The method of claim 67, wherein the transducers are selected from a group consisting of ultrasonic transducers, optical sensors, capacitive sensors, weight sensors, seat position sensors, seatback position sensors, seat belt buckle sensors, seatbelt payout sensors, infrared sensors, inductive sensors and radar sensors.

69. A vehicle including a system for determining the occupancy state of a seat in the vehicle occupied by an occupying item, the system comprising:

a plurality of transducers arranged in the vehicle, each of said transducers providing data relating to the occupancy state of the seat; and a processing unit coupled to said transducers for receiving the data from said transducers and processing the data to obtain an output indicative of the current occupancy state of the seat, a trained combination neural network created from a plurality of data sets being resident in said processing unit, each of said data sets representing a different occupancy state of the seat and being formed from data from said transducers while the seat is in that occupancy state, said combination neural network providing the output indicative of the current occupancy state of the seat upon inputting a data set representing the current occupancy state of the seat and being formed from data from at least some of said transducers.

70. The vehicle of claim 69, wherein said combination neural network comprises at least one neural network trained to determine at least one of the type, size and position of the occupying item based on data from at least some of said transducers.

71. The vehicle of claim 69, wherein said combination neural network comprises a first neural network trained to identify the occupying item based on data from at least some of said transducers and a second neural network trained to determine the position of the occupying item based on data from at least some of said transducers.

72. The vehicle of claim 69, wherein said combination neural network comprises a first neural network trained to determine the current occupancy state of the seat based on data from at least some of said transducers and a second neural network trained to determine whether the data set representing the current occupancy state of the seat and formed from data from said transducers is similar to a data set on which said first neural network is trained whereby said second neural network prevents unreasonable data sets from being input to said first neural network.

73. The vehicle of claim 69, wherein said combination neural network comprises a first neural network trained to determine whether the occupying item is a child seat based on data from at least some of said transducers, a second neural network trained to determine the orientation of the child seat based on data from at least some of said transducers when said first neural network determines that the occupying item is a child seat.

74. The vehicle of claim 73, wherein said combination neural network comprises a third neural network trained to determine the position of the child seat based on data from at least some of said transducers.

75. The vehicle of claim 69, wherein said combination neural network comprises a plurality of neural networks each trained to determine the occupancy state of the seat based on data from a respective set of said transducers whereby each set of transducers is different than other sets of transducers, said processor means being arranged to factor the determination of the occupancy states by said plurality of neural networks in the determination of the occupancy state of the seat.

76. The vehicle of claim 69, wherein said transducers include a plurality of electromagnetic wave sensors capable of receiving waves at least from a space above the seat, each of said electromagnetic wave sensors being arranged at a different location.

77. The vehicle of claim 69, wherein said transducers include wave-receiving sensors capable of receiving waves modified by passing through a space above the seat.

78. The vehicle of claim 77, wherein at least one of said wave-receiving sensors is a capacitive sensor.

\* \* \* \* \*